United States Patent
Yang et al.

(10) Patent No.: US 12,452,480 B2
(45) Date of Patent: Oct. 21, 2025

(54) DISPLAY APPARATUS

(71) Applicants: VIDAA USA, INC., Suwanee, GA (US); VIDAA (NETHERLANDS) INTERNATIONAL HOLDINGS B.V., Duiven (NL)

(72) Inventors: Yican Yang, Qingdao (CN); Xiaona Tang, Qingdao (CN); Yuan Li, Qingdao (CN); Min Li, Qingdao (CN); Jianmin Kang, Qingdao (CN); Shuangzeng Li, Qingdao (CN); Shuai Li, Qingdao (CN); Xiaoyue Jing, Qingdao (CN); Bing Wu, Qingdao (CN); Xiaotao Zhang, Qingdao (CN); Yuqi Liu, Qingdao (CN)

(73) Assignees: VIDAA USA, INC., Suwanee, GA (US); VIDAA (NETHERLANDS) INTERNATIONAL HOLDINGS B.V., Duiven (NL)

( * ) Notice: Subject to any disclaimer, the term of this patent is extended or adjusted under 35 U.S.C. 154(b) by 64 days.

(21) Appl. No.: 18/263,164

(22) PCT Filed: Jan. 31, 2022

(86) PCT No.: PCT/US2022/014491
§ 371 (c)(1),
(2) Date: Jul. 27, 2023

(87) PCT Pub. No.: WO2022/165299
PCT Pub. Date: Aug. 4, 2022

(65) Prior Publication Data
US 2024/0107108 A1    Mar. 28, 2024

(30) Foreign Application Priority Data

Jan. 29, 2021 (CN) .......................... 202110126403.0
Feb. 5, 2021 (CN) .......................... 202110162220.4
(Continued)

(51) Int. Cl.
*H04N 21/431* (2011.01)
*H04N 21/482* (2011.01)

(52) U.S. Cl.
CPC ..... *H04N 21/4316* (2013.01); *H04N 21/4826* (2013.01)

(58) Field of Classification Search
CPC .. H04N 21/4316; H04N 21/4826; H04N 5/45; H04N 21/4263; H04N 21/43072;
(Continued)

(56) References Cited

U.S. PATENT DOCUMENTS 9,510,051 B1 * 11/2016 Bostick ............. H04N 21/4788
9,912,972 B2 * 3/2018 Kang ................. H04N 21/2368
(Continued)

FOREIGN PATENT DOCUMENTS

CN    101282467 A    10/2008
CN    102984275 A    3/2013
(Continued)

OTHER PUBLICATIONS

Chinese First Office Action, mailed Nov. 2, 2022, from China Patent App. No. 202110126403.0.
(Continued)

*Primary Examiner* — John R Schnurr
(74) *Attorney, Agent, or Firm* — ANOVA LAW GROUP, PLLC

(57) ABSTRACT

A display apparatus is disclosed The display apparatus includes a display, configured to present an image interface,
(Continued)

the image interface includes a render layer and a display layer superimposed: and a controller, configured to obtain a target video resource and one or more recommended video resource associated with the target video resource; control the display layer to present the target video resource and output audio of the target video resource; and control the render layer to present the one or more recommended video resource simultaneously.

12 Claims, 37 Drawing Sheets

(30) Foreign Application Priority Data

| | | |
|---|---|---|
| Feb. 22, 2021 | (CN) | 202110196553.9 |
| Mar. 9, 2021 | (CN) | 202110255546.1 |
| Mar. 17, 2021 | (CN) | 202110284803.4 |

(58) Field of Classification Search
CPC ............ H04N 21/439; H04N 21/4396; H04N 21/44222; H04N 21/466; H04N 21/47217
See application file for complete search history.

(56) References Cited

U.S. PATENT DOCUMENTS

| | | | |
|---|---|---|---|
| 2009/0153648 A1 | 6/2009 | Quennesson | |
| 2010/0077431 A1 | 3/2010 | Neufeld et al. | |
| 2010/0277485 A1 | 11/2010 | Zalewski | |
| 2011/0043696 A1* | 2/2011 | Onogi | H04N 5/45 348/E5.057 |
| 2014/0157318 A1* | 6/2014 | Carpenter, Jr. | H04N 21/4316 725/43 |
| 2014/0310743 A1 | 10/2014 | Des Jardins | |
| 2015/0074735 A1 | 3/2015 | Herigstad et al. | |
| 2015/0128184 A1* | 5/2015 | Tai | H04N 21/84 725/46 |
| 2015/0163537 A1* | 6/2015 | Sirpal | H04N 21/2187 725/37 |
| 2015/0373296 A1 | 12/2015 | Ushiyama | |
| 2016/0198214 A1* | 7/2016 | Levy | H04N 21/64322 725/43 |
| 2016/0345052 A1 | 11/2016 | Wang et al. | |
| 2017/0171495 A1* | 6/2017 | Shi | H04N 21/482 |
| 2017/0280088 A1* | 9/2017 | Park | H04N 21/422 |
| 2018/0041814 A1* | 2/2018 | Christie | H04N 21/4383 |
| 2019/0212900 A1 | 7/2019 | Wang | |
| 2020/0304863 A1* | 9/2020 | Domm | G06F 3/04886 |
| 2023/0031160 A1* | 2/2023 | Nashida | H04N 21/4668 |
| 2024/0267583 A1* | 8/2024 | Domm | G06F 21/36 |

FOREIGN PATENT DOCUMENTS

| | | |
|---|---|---|
| CN | 106060627 A | 10/2016 |
| CN | 107305531 A | 10/2017 |
| CN | 108460042 A | 8/2018 |
| CN | 108694241 A | 10/2018 |
| CN | 109451342 A | 3/2019 |
| CN | 109657165 A | 4/2019 |
| CN | 109857972 A | 6/2019 |
| CN | 111107418 A | 5/2020 |
| CN | 111107428 A | 5/2020 |
| CN | 111147770 A | 5/2020 |
| CN | 111200746 A | 5/2020 |
| CN | 111343490 A | 6/2020 |
| CN | 111711857 A | 9/2020 |
| CN | 111831433 A | 10/2020 |
| CN | 112040312 A | 12/2020 |
| CN | 112235626 A | 1/2021 |
| EP | 3197169 A1 | 7/2017 |
| EP | 3206407 A1 | 8/2017 |
| EP | 3522549 A1 | 8/2019 |
| JP | 2001136458 A | 5/2001 |

OTHER PUBLICATIONS

International Search Report and Written Opinion, mailed May 3, 2022, US ISA, PCT/US2022/014491.
Chinese First Office Action, mailed Sep. 21, 2023, from China Patent App. No. 202110162220.4, 11 pages.
Chinese First Office Action, mailed Sep. 21, 2023, from China Patent App. No. 202110255546.1, 21 pages.
Chinese First Office Action, mailed Aug. 17, 2023, from China Patent App. No. 202110284803.4, 18 pages.
Chinese Second Office Action, mailed Feb. 22, 2024, from China Patent App. No. 202110255546.1, 22 pages.
Chinese Decision of Rejection, mailed May 11, 2024, from China Patent App. No. 202110255546.1, 26 pages.
Chinese Second Office Action, mailed Oct. 28, 2023, from China Patent App. No. 202110284803.4, 16 pages.

* cited by examiner

100

DISPLAY APPARATUS

CROSS REFERENCE TO RELATED APPLICATIONS

This application is a US National Stage of International Application No. PCT/US2022/014491, filed on Jan. 31, 2022, which claims priorities to Chinese patent application No. 202110126403.0 filed on Jan. 29, 2021, No. 202110162220.4 filed on Feb. 5, 2021, No. 202110196553.9 filed on Feb. 22, 2021, No. 202110255546.1 filed on Mar. 9, 2021, and No. 202110284803.4 filed on Mar. 17, 2021, the contents of which are hereby incorporated by reference in their entireties.

FIELD

The disclosure relates to display technology, and particularly to a display apparatus and a method for playing a video resource.

BACKGROUND

A display apparatus generally has only a single device module for supporting play function, such as a display module. This kind of module may only control a display layer forming an image interface for video displaying. Because the display apparatus only has a single display layer, the display apparatus can only support playing of one path of video resource. That is, the display apparatus can only display a currently playing video content. If a user still wants to watch another video content at this time, the display apparatus needs to be controlled to exit a current playing page and then start to play another video content selected for view.

SUMMARY

In a first aspect, some embodiments of the disclosure provide a display apparatus, including: a display, configured to present an image interface, the image interface including a render layer and a display layer superimposed; and a controller, configured to obtain a target video resource and one or more recommended video resource associated with the target video resource; control the display layer to present the target video resource and output audio of the target video resource; and control the render layer to present the one or more recommended video resource simultaneously.

In a second aspect, some embodiments of the disclosure provide a method for playing a video resource, including: obtaining a target video resource and one or more recommended video resource associated with the target video resource; controlling a display layer of an image interface to present the target video resource and output audio of the target video resource; and controlling a render layer of the image interface to present the one or more recommended video resource simultaneously, the image interface being a content presented when a display presents a video resource.

In a third aspect, some embodiments of the disclosure provide a display apparatus, including: a display, configured to present a user interface; a user input interface, configured to receive an input signal; and a controller respectively in connection with the display and the user input interface, configured to: receive an instruction for suspending a preset application to suspend the preset application to a backend, and store a first hyperlink address last accessed by the preset application; and upon receiving an instruction for selecting a video control, modifying the first hyperlink address into a second hyperlink address corresponding to the video control, utilizing the second hyperlink address to launch the preset application suspended in the backend, and control the display to present a page corresponding to the second hyperlink address.

In a fourth aspect, some embodiments of the disclosure provide a method for displaying a page corresponding to a hyperlink address. The method includes: receiving an instruction for suspending a preset application to suspend the preset application to a backend, and storing a first hyperlink address previous accessed by the preset application; and upon receiving an instruction for selecting a video control, modifying the first hyperlink address into a second hyperlink address corresponding to the video control, utilizing the second hyperlink address to launch the preset application suspended in the backend, and controlling a display to present a page corresponding to the second hyperlink address.

In a fifth aspect, some embodiments of the disclosure provide a display apparatus, including: a display; and a controller, configured to: parse a webpage file corresponding to a user's browsing content to obtain a resource request queue, wherein resource requests in the resource request queue are used for obtaining resources for supporting webpage content displaying; place a current resource request corresponding to a user's current browsing content into a head of the resource request queue; and load corresponding resources sequentially starting from the head of the resource request queue according to all the resource requests.

In a sixth aspect, some embodiments of the disclosure provide a display apparatus, including: a display; and a controller, configured to: parse a webpage file corresponding to a user's browsing content to obtain a resource request queue, wherein resource requests in the resource request queue are used for obtaining resources for supporting webpage content displaying; in response to a current resource request corresponding to a user's current browsing content being a network resource request, place the network resource request into a head of the resource request queue; and load corresponding resources sequentially starting from the head of the resource request queue according to all the resource requests.

In a seventh aspect, some embodiments of the disclosure provide a method for loading a resource on a display apparatus, including: parsing a webpage file corresponding to a user's browsing content to obtain a resource request queue, wherein resource requests in the resource request queue are used for obtaining resources for supporting webpage content displaying; placing a current resource request corresponding to a user's current browsing content into a head of the resource request queue; and loading corresponding resources sequentially starting from the head of the resource request queue according to all the resource requests.

In an eighth aspect, some embodiments of the disclosure provide a method for loading a resource on a display apparatus, including: parsing a webpage file corresponding to a user's browsing content to obtain a resource request queue, wherein resource requests in the resource request queue are used for obtaining resources for supporting webpage content displaying; in response to a current resource request corresponding to a user's current browsing content being a network resource request, placing the network resource request into a head of the resource request queue; and loading corresponding resources sequentially starting from the head of the resource request queue according to all the resource requests.

In a ninth aspect, some embodiments of the disclosure provide a display apparatus, including: a display, configured to present a user interface; a user input interface, configured to receive an input signal; and a controller, in connection with the display and the user input interface respectively, and configured to: receive an instruction for moving a virtual mouse through a key of a control device, and obtain a current position of the virtual mouse; determine a final position of the virtual mouse after moving according to the current position of the virtual mouse; according to the current position and the final position, determine an interpolation point quantity in a moving path of the virtual mouse, and calculate a single moving distance of the virtual mouse; calculate a single moving interval time of the virtual mouse according to a preset report interval time of the key of the control device and the interpolation point quantity; and move the virtual mouse to the final position by utilizing the single moving distance and the single moving interval time.

In a tenth aspect, some embodiments of the disclosure provide a virtual mouse moving method, including: receiving an instruction for moving a virtual mouse through a key of a control device, and obtaining a current position of the virtual mouse; determining a final position of the virtual mouse after moving according to the current position of the virtual mouse; according to the current position and the final position, determining an interpolation point quantity in a moving path of the virtual mouse, and calculating a single moving distance of the virtual mouse; calculating a single moving interval time according to a preset report interval time of the key of the control device and the interpolation point quantity; and move the virtual mouse to the final position by utilizing the single moving distance and the single moving interval time.

In an eleventh aspect, some embodiments of the disclosure provide a display apparatus, including: a display; and a controller, configured to: obtain a preset picture cache value of a target application and an original cache value of a target browser for running the target application, wherein the preset picture cache value is configured for indicating a size of a picture resource required to be cached during running of the target application, and the original cache value is configured for indicating a size of a cache space used when the target browser runs the target application; in a case that the preset picture cache value is greater than the original cache value, expand the cache space for the target browser, so that a size of a target cache space expanded from an original cache space is the same as the preset picture cache value; and control the target browser to utilize the target cache space to cache the picture resource of the target application when running the target application.

In a twelfth aspect, some embodiments of the disclosure provide a method for dynamically processing a picture cache space, including: obtaining a preset picture cache value of a target application and an original cache value of a target browser for running the target application, wherein the preset picture cache value is configured for indicating a size of a picture resource required to be cached during running of the target application, and the original cache value is configured for indicating a size of a cache space used when the target browser runs the target application; in a case that the preset picture cache value is greater than the original cache value, expanding the cache space for the target browser, so that a size of a target cache space expanded from an original cache space is the same as the preset picture cache value; and controlling the target browser to utilize the target cache space to cache the picture resource of the target application when running the target application.

DETAILED DESCRIPTION OF EMBODIMENTS

In order to make the objective, implementations of the disclosure more clear, the implementations of the disclosure will be described clearly and completely with reference to the drawings in embodiments of the disclosure. Obviously, the described embodiments are only part of embodiments of the disclosure, but not all embodiments.

Figure 1:
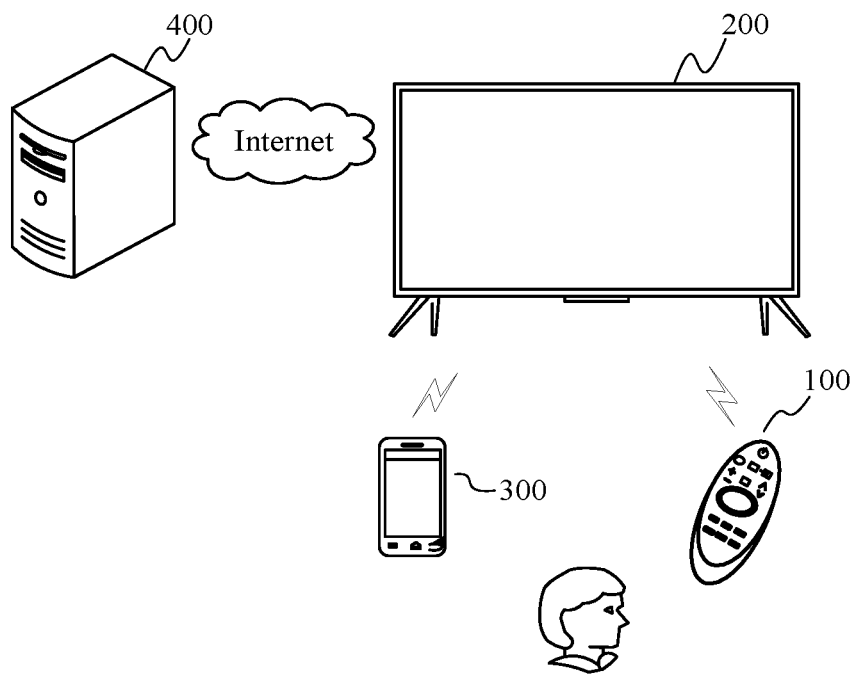
FIG. 1 is a schematic diagram of a use scenario of a display apparatus according to some embodiments.

FIG. 1 is a schematic diagram of a use scenario of a display apparatus according to some embodiments. As shown in FIG. 1, the display apparatus 200 is further in data communication with a server 400, and a user may operate the display apparatus 200 through an intelligent device 300 or a control device 100.

In some embodiments, the control device 100 may be a remote controller. Communication of the remote controller and the display apparatus include at least one of infrared protocol communication or Bluetooth protocol communication, or other short-distance communication modes, and the display apparatus 200 is controlled in a wireless or wired mode. The user may input a command through a button on the remote controller, voice input, control panel input or the like to control the display apparatus 200.

In some embodiments, the intelligent device 300 may include any one of a mobile terminal, a tablet computer, a computer, a notebook computer, an AR/VR device, or the like.

In some embodiments, the intelligent device 300 may also be used to control the display apparatus 200. For example, an application running on the intelligent device is used to control the display apparatus 200.

In some embodiments, the intelligent device 300 and the display apparatus may also be used for data communication.

In some embodiments, the display apparatus 200 may further be controlled by other approaches except for the control device 100 and the intelligent device 300. For example, the display apparatus 200 may directly receive voice command from the user through a module for obtaining a voice command in the display apparatus 200, or may receive the voice command from the user through a voice control device outside the display apparatus 200.

In some embodiments, the display apparatus 200 is further in data communication with the server 400. The display apparatus 200 may be allowed to be in communication connection through a local area network (LAN), a wireless local area network (WLAN) and other networks. The server 400 may provide various contents and interactions for the display apparatus 200. The server 400 may be one or more clusters, and may include one or more kinds of servers.

Figure 2:
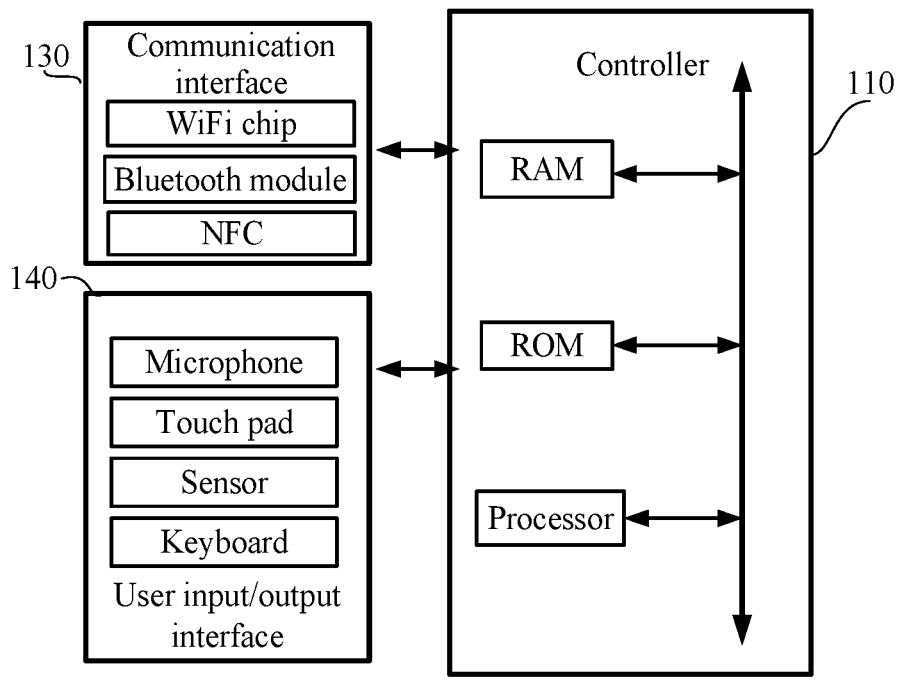
FIG. 2 is a block diagram of hardware configuration of a control device 100 according to some embodiments.

FIG. 2 is a block diagram of hardware configuration of the control device 100 according to some embodiments. As shown in FIG. 2, the control device 100 includes a controller 110, a communication interface 130, a user input/output interface 140, a memory and a power supply. The control device 100 may receive an operation command from the user, converts the operation command into an instruction which can be recognized and responded by the display apparatus 200, and plays an interaction intermediary role between the user and the display apparatus 200.

In some embodiments, the communication interface 130 is configured to communicate with the outside, and includes at least one of a WIFI chip, a Bluetooth module, an NFC or an alternative module.

In some embodiments, the user input/output interface 140 includes at least one of a microphone, a touch pad, a sensor, a keyboard or an alternative module.

Figure 3:
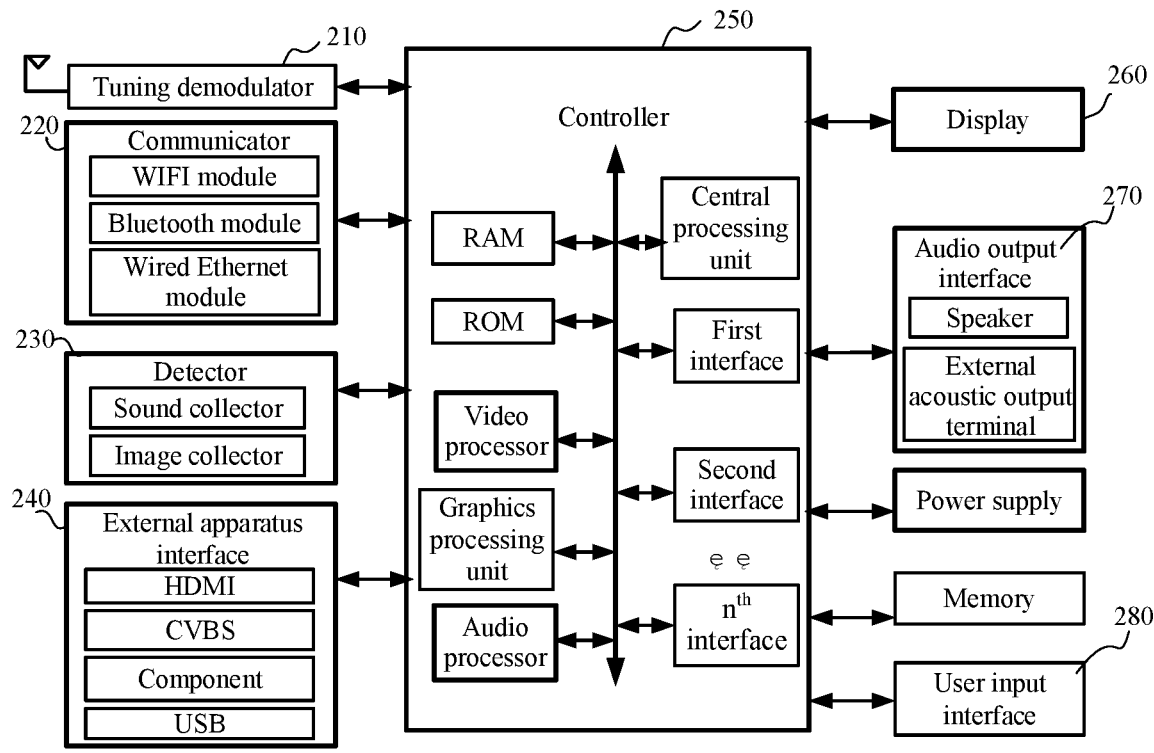
FIG. 3 is a block diagram of hardware configuration of a display apparatus 200 according to some embodiments.

FIG. 3 is a block diagram of hardware configuration of the display apparatus 200 according to some embodiments.

In some embodiments, the display apparatus 200 includes at least one of a tuning demodulator 210, a communicator 220, a detector 230, an external apparatus interface 240, a controller 250, a display 260, an audio output interface 270, a memory, a power supply, or a user input interface.

In some embodiments, the controller includes a central processing unit, a video processor, an audio processor, a graphics processing unit, an RAM, an ROM, and a first interface to an $n^{th}$ interface for user input/output.

In some embodiments, the display 260 includes a panel component for displaying images, a driving component for driving image display, components for receiving image signals output from the controller and displaying video contents, image contents and a menu manipulation interface, and a user interface UI, etc.

In some embodiments, the display 260 may be at least one of a liquid crystal display, an OLED display, or a projection display, and may also be a projection apparatus and a projection screen.

In some embodiments, the communicator 220 is a component configured to communicate with an external device or server according to various communication protocol types. For example, the communicator may include at least one of a WIFI module, a Bluetooth module, a wired Ethernet module, and other network communication protocol chips or near field communication protocol chips, or an infrared receiver. The display apparatus 200 may establish sending and receiving of a control signal and a data signal with the control device 100 or the server 400 through the communicator 220.

In some embodiments, the user input interface may be configured to receive a control signal from the control device 100 (such as an infrared remote controller).

In some embodiments, the detector 230 is configured to collect a signal from external environment or a signal for interacting with the outside. For example, the detector 230 includes an optical receiver, and a sensor configured to collect an ambient light intensity. Or, the detector 230 includes an image collector, such as a camera, which may be configured to collect external environment images, user attributes or user interaction gestures. Or, the detector 230 includes a sound collector, such as a microphone, for receiving external sound.

In some embodiments, the external apparatus interface 240 may include but not limit to: any one or more interfaces of a high definition multimedia interface (HDMI), an analog or data high-definition component input interface (component), a composite video input interface (CVBS), a USB input interface (USB), and an RGB port. It may also be a composite input/output interface formed by the above more interfaces.

In some embodiments, the tuning demodulator 210 is configured to receive a broadcast television signal in a wired or wireless mode, and demodulate an audio and video signal, such as an EPG data signal, from a plurality of wireless or cable broadcast television signals.

In some embodiments, the controller 250 and the tuning demodulator 210 may be located in different individual devices. That is, the tuning demodulator 210 may also be in an external device where the controller 250 is located, such as an external set top box.

In some embodiments, the controller 250 is configured to control work of the display apparatus and responds to operations from the user through various software control programs stored on the memory. The controller 250 controls an overall operation of the display apparatus 200. For example, in response to receiving a user command for selecting a UI object presented on the display 260, the controller 250 may execute an operation relevant to an object selected by the user command.

In some embodiments, the object may be any one of optional objects, such as a hyperlink, an icon or other control available for operation. The operation relevant to the selected object includes: an operation of displaying a page linked to a hyperlink, a file, an image and the like, or an operation of launching an application corresponding to the icon.

In some embodiments, the controller includes at least one of a central processing unit (CPU), a video processor, an audio processor, a graphics processing unit (GPU), an random access memory (RAM), a read-only memory (ROM), a first interface to an $n^{th}$ interface for inputting/outputting, a communication bus or the like.

The CPU is configured to run an operation system and an application stored in the memory, and run various applications, data and contents according to various interaction instructions received externally, to finally present and play various audio and video contents. The CPU may include a plurality of processors. For example, the CPU includes a main processor and one or more sub-processors.

In some embodiments, the graphic processing unit is configured to generate various graphic objects, such as at least one of an icon, an operation menu, a graphic for receiving user's operation command or the like. The graphic processing unit includes an arithmetic unit, configured to perform computation by receiving various interaction commands from the user and then display various objects according to a display attribute; and further includes a renderer, configured to render various objects obtained based on the arithmetic unit, and the rendered objects are for display on the screen.

In some embodiments, the video processor is configured to perform video processing for a video signal received from outside according to a standard encoding and decoding protocol of the received signal to obtain a signal for directly being playing on the display apparatus 200.

In some embodiments, the video processor includes at least one of a demultiplexing module, a video decoding module, an image synthesis module, a frame rate conversion module, a display formatting module, or the like.

In some embodiments, the audio processor is configured to receive an external audio signal and perform processing according to a standard encoding and decoding protocol of the received signal to obtain a sound signal for being played in a speaker.

In some embodiments, the user may input a user command through a graphical user interface (GUI) shown on the display 260, and then the user input interface receives the user input command through the graphical user interface (GUI). Or, the user may input the user command through a specific sound or gesture, and then the user input interface recognizes the sound or gesture through a sensor to receive the user input command.

In some embodiments, the user input interface 280 is an interface (such as a physical key on a display apparatus, or others) capable of receiving control input.

In some embodiments, a system of the display apparatus may include a kernel, a command parser (shell), a file system and one or more applications. The kernel, the shell and the file system together constitute a basic operation system structure, and allow the user to manage a file, running applications and use the system.

After being powered on, the kernel is started to activate a kernel space, hardware abstraction layer, initialize hardware parameters and the like, and run and maintain a virtual memory, a scheduler, and signal and inter-process communication (IPC). After the kernel is started, the shell and the user applications are loaded. The applications are compiled into machine codes after being launched, to form a progress.

Figure 4:
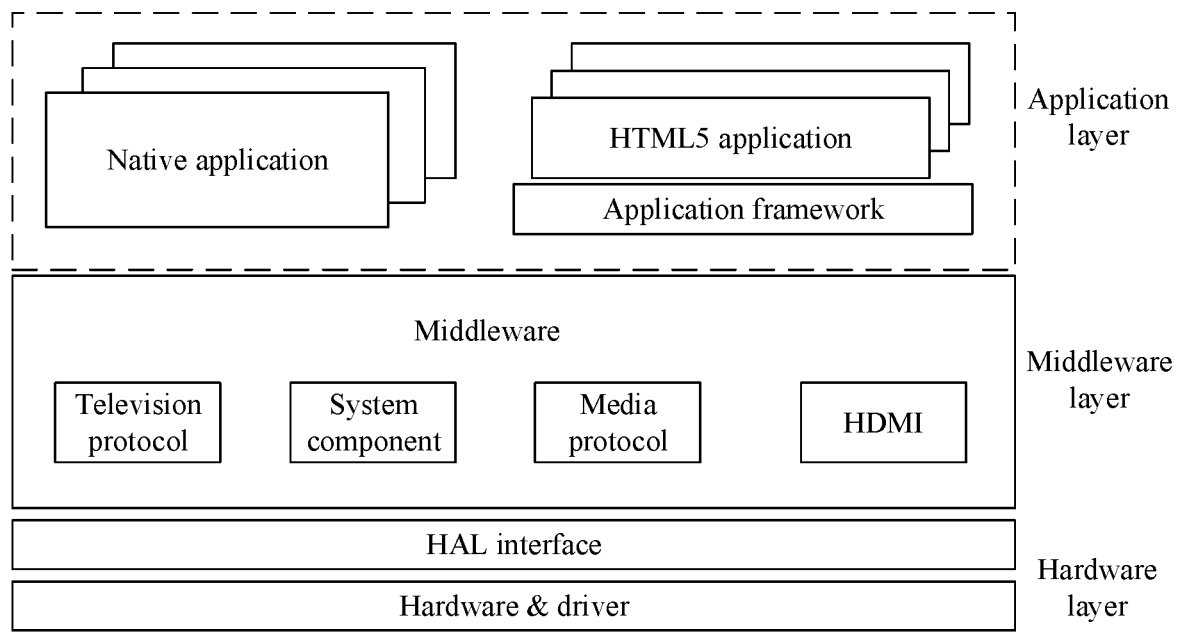
FIG. 4 is a software configuration diagram in a display apparatus 200 according to some embodiments.

As shown in FIG. 4, the system of the display apparatus is divided into three layers, an application layer, a middleware layer and a hardware layer from top to bottom respectively.

The application layer mainly includes commonly used applications on a television, and an application framework. The commonly used applications are mainly applications developed based on a browser, such as HTML5 APPs; and a native application (native APPs).

The application framework is a complete program model, and has all basic functions required by standard application software, such as file access and data exchange, etc., and use interfaces (a toolbar, status bar, a menu and a dialog box) of these functions.

The native application (native APPs) may support online or offline operations, message push or local resource access.

The middleware layer includes middleware such as various television protocols, a multimedia protocol and a system component. The middleware may use a basic service (function) provided by system software, to link various components of an application system on a network or different applications, which allows for resource sharing and function sharing.

The hardware layer mainly includes an HAL interface, hardware and a driver. The HAL interface is a uniform interface for connecting with all television chips, and specific logic processings are achieved by respective chips. The driver mainly includes: an audio driver, a panel driver, a Bluetooth driver, a camera driver, a WIFI driver, a USB driver, an HDMI driver, a sensor driver (such as fingerprint sensor, a temperature sensor, a pressure sensor and the like), a power driver and the like.

The display apparatus 200 generally has only a single device module supporting a playing function, such as a display module. This kind of module may only control a display layer forming an image interface for video displaying. Because the display apparatus 200 only has a single display layer, the display apparatus 200 can only support playing of one path of video resource. That is, the display apparatus 200 can only display a currently playing video content. If a user still wants to watch another video content at this time, the display apparatus 200 needs to be controlled to exit a current playing page and then start to play another video content selected for view.

In the above approach, the two video contents selected by the user for view can only be played one by one and cannot be presented simultaneously; consequently, the display contents cannot meet the demands of the user, resulting in negative view experience.

In view of the above issue, an embodiment of the disclosure provides a method for playing two paths of video resources and a display apparatus 200. While a video watched by a user is being played, another recommended video content may further be presented on a screen for the user to serve as preview content, therefore, the user watches two paths of videos conveniently, and a view experience of the user is improved.

As mentioned in the above embodiments, the display apparatus 200 in the embodiments of the disclosure has a controller 250. The controller 250 may obtain a plurality of video resources, and control a display layer and a render layer which constitute an image interface to display a video resource in the display layer and the render layer each respectively, thereby realizing displaying of the plurality of video resources on the display 260.

Figure 5:
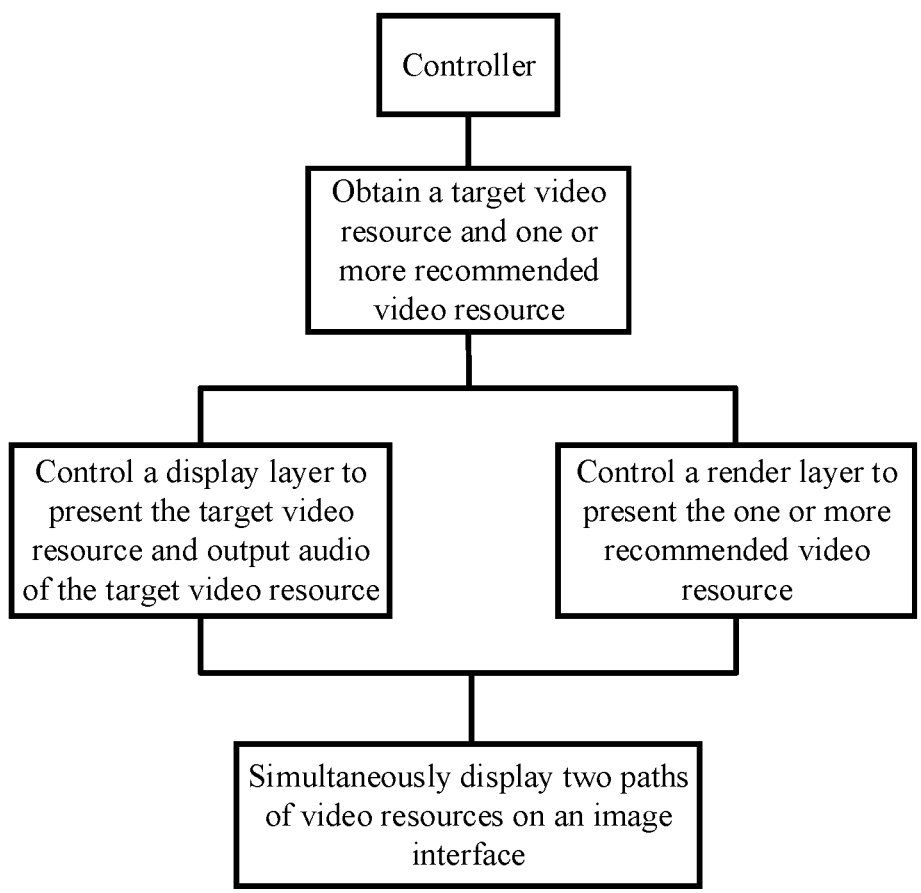
FIG. 5 is a first control flow diagram of a controller 250 according to some embodiments.

FIG. 5 is a first control flow diagram of the controller 250 according to some embodiments.

As shown in FIG. 5, the controller 250 of the display apparatus 200 in embodiments of the disclosure may obtain a target video resource that the user wants to watch according to needs. Moreover, a recommended video resource associated with the target video resource is obtained while obtaining the target video resource. For example, the target video resource is a second episode of a teleplay XX, and the recommended video resource associated with the target video resource may be a first episode, a third episode, a fourth episode and the like of the teleplay XX.

Figure 6:
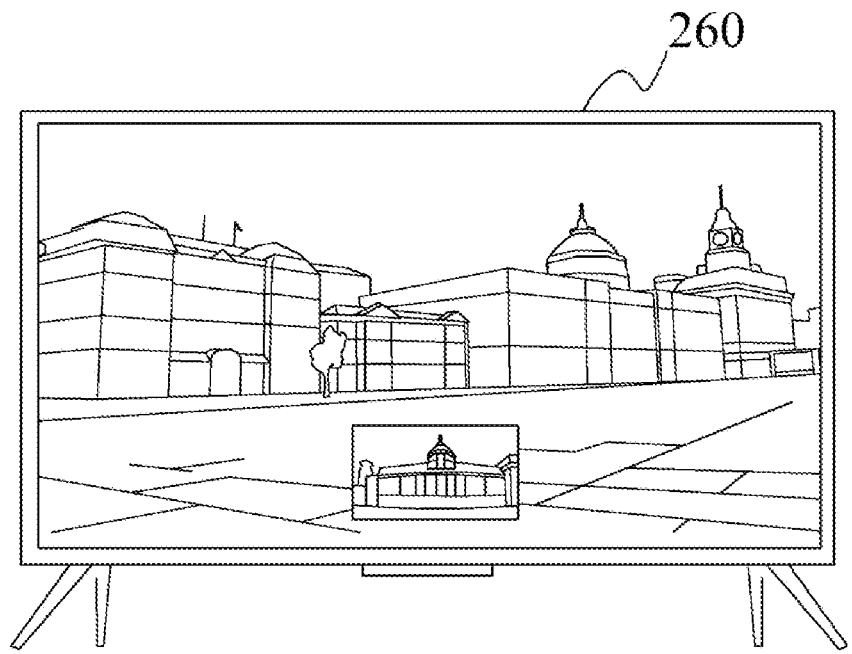
FIG. 6 is a first schematic diagram of an image interface according to some embodiments.

Then, the controller 250 may divide at least one video preview area in a small window form on the image interface on the display 260. FIG. 6 is a schematic diagram of the image interface according to some embodiments. As shown in FIG. 6, the image interface includes one video preview area, and the video preview area may be presented in a small window form, to avoid blocking the content presented in full screen. The video preview area correspondingly shows one video resource, which may be the target video resource or the recommended video resource.

After the video preview area is created or divided, the controller 250 controls the display layer to present the target video resource and output an audio content of the target video resource, and controls the render layer to present the recommended video resource simultaneously. Because any one of the target video resource and the recommended video resource may be presented in the video preview area, a content of the video preview area may be presented in the display layer or the render layer, which may be configured according to user's needs. For example, the display layer is controlled to present the target video resource in full screen and play the corresponding audio content, and the render layer is controlled to present the recommended video resource in the video preview area simultaneously. Or, the display layer is controlled to present the target video resource in the video preview area and play the corresponding audio content, and the render layer is controlled to present the recommended video resource in full screen simultaneously. No matter what the case, the video resource presented in the video preview area is generally superimposed on a video resource played in full screen.

When the target video resource and the recommended video resource are presented on the image interface simultaneously, in order to avoid mutual influence between audio contents of the two video resources, the recommended video resource generally serving as a preview content only shows a dynamic video content and does not output an audio content, and the controller 250 only controls audio output of the target video resource presented in the display layer. Therefore, in embodiments of the disclosure, the target video resource is played fully both with image presentation and audio output, while the recommended video resource is merely presented without audio output.

As shown in FIG. 6, one video preview area may be created on the image interface. But in some cases, if there are many obtained recommended video resources associated with the target video resource, the quantity of the video preview areas may also be increased accordingly.

Figure 7:
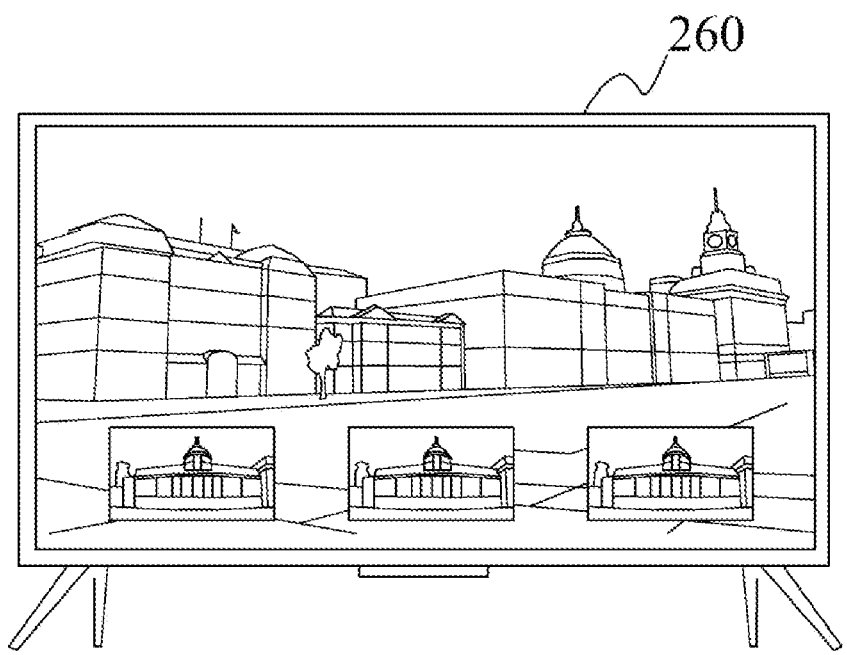
FIG. 7 is a second schematic diagram of an image interface according to some embodiments.

FIG. 7 is a second schematic diagram of the image interface according to some embodiments. As shown in FIG. 7, the plurality of, for example, the three video preview areas may be created on the image interface. At this time, each of the video preview areas may still present any one of the target video resource and the recommended video resource. Similarly, the content presented in the video preview area may be presented on the display layer or presented on the render layer, which may be configured according to user's needs.

However, the display layer cannot be modified, while the render layer (OSD layer) may be edited or modified. Therefore, only one video resource can be presented on the display layer, while the plurality of recommended video resources may be presented simultaneously on the render layer. On the image interface as shown in FIG. 7, the controller 250 may control the display layer to present the target video resource in full screen and output an audio of the target video resource, and control the three video preview areas to respectively present the recommended video resources simultaneously. Or, the controller 250 controls the display layer to present the target video resource in one video preview area and outputs the audio of the target video resource, and controls the render layer to present the recommended video resource in full screen and also present the other recommended video resources in the remaining two video preview areas simultaneously. Similarly, no matter what the case, the video resources presented in the video preview areas are generally superimposed on the video resource played in full screen.

It can be seen that the display apparatus 200 in the embodiments of the disclosure may present one video resource on the display layer, and present the other video resource on the render layer simultaneously, and the other video resource may be a recommend content associated with the target video resource on the display layer. The video preview area is further disposed on the image interface of the display apparatus 200, and the video preview area does not shield the content of the full-screen video resource. In this way, the user can simultaneously watch two paths of video resources on the display apparatus 200, to meet a requirement of previewing other video content while watching a current video, thereby improving view experience for the user.

In some embodiments, the target video resource may be a video signal requested by the controller 250 from a cloud server, and the server also carries some relevant recommended video resources while returning the target video resource.

In some embodiments, when the user normally watches the target video resource, the video preview area is generally hidden, that is, the video preview area is not superimposed on the target video resource played in full screen. When the user wants to watch the recommended video resource, the video preview area may appear by inputting a preview instruction and the like to the display apparatus 200. But when the user does not want to watch the video preview area any more, an exit instruction and the like may be input to the display apparatus 200, so that the video preview area will disappear.

Figure 8:
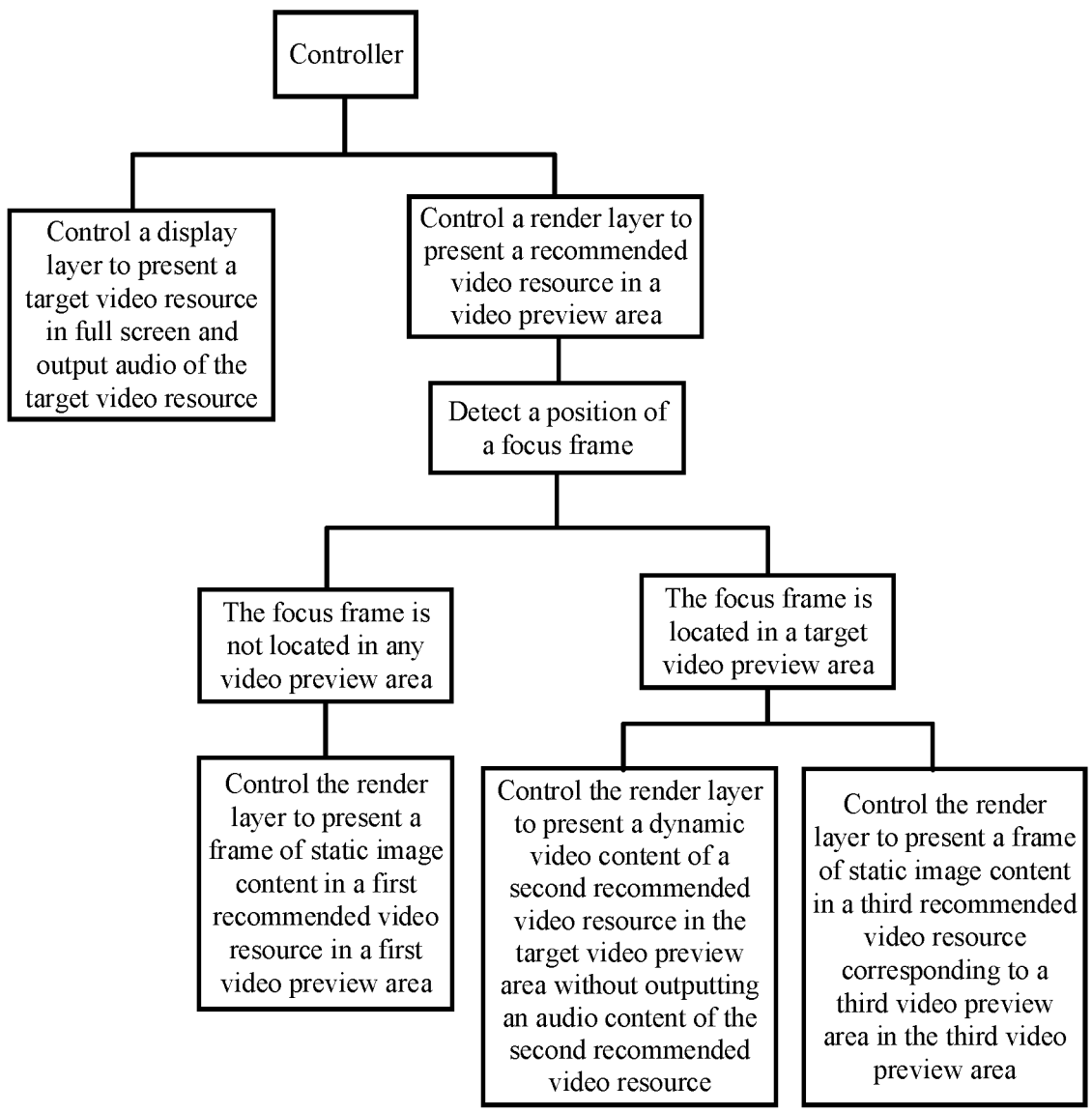
FIG. 8 is a second control flow diagram of a controller 250 according to some embodiments.

FIG. 8 is a second control flow diagram of the controller 250 according to some embodiments.

As mentioned in the above embodiments, the target video resource may be presented in full screen or presented in the video preview area. Then, in a case where the controller 250 controls the display layer to present the target video resource in full screen and controls to output the audio of the target video resource, the controller 250 further needs to control the render layer to present the recommended video resource in the video preview area. In some embodiments, the quantity of the video preview areas is equal to the quantity of the recommended video resources. When the video preview area is presented, the user may select the recommended video resource in a target video preview area for view by selecting a focus frame on the display 260.

Therefore, in some embodiments, as shown in FIG. 8, the controller 250 is further configured to detect the position of the focus frame. In a case where the focus frame is not located in any video preview area, the render layer is controlled to present a certain frame of static image content in the recommended video resource, with a video preview area presenting a frame of static image content in its corresponding video resource, that is, all the recommended video resources are controlled to be located in a static state.

In a case where the focus frame is located in a video preview area, that is, a target video preview area is selected, the controller 250 controls the render layer to only present dynamic video content of the recommended video resource in the target video preview area without outputting the audio content. Meanwhile, the controller 250 controls the render layer to present a certain frame of static image content in each of the recommended video resources corresponding to others video preview area in the other video preview areas except for the selected preview area, that is, only the recommended video resource in the selected target video preview area is dynamically played, while the recommended video resources in other video preview areas are still in the static state.

It can be seen that in the control flow as shown in FIG. 8, in order to not disturb watching of the content presented in the target video preview area for the user, the controller 250 controls contents in other video preview areas to be static. In this way, only the selected content is dynamically played, the user can also see the selected recommended video resource more visually and conveniently, thereby improving user's view experience. The content presented during the static state may be a certain frame of static image in the video resource.

As for the case as mentioned in the above embodiments, only when the user moves the focus frame to the target video preview area, the dynamic video content of the recommended video resource is presented in the target video preview area without outputting the audio content. But in some embodiments, after the user moves the focus frame and inputs a confirmation command to the display apparatus 200, it is understood that the user needs to watch the recommended video resource in the target video preview area in full screen. At this time, the controller 250 controls full-screen displaying of the recommended video resource in the target video preview area, and meanwhile outputs its corresponding audio content. And, the display layer or the render layer may present the recommended video resource in full screen.

For example, the display layer currently plays a content of a first episode of a teleplay YYY in full screen, while the video preview area respectively displays a static image of an second episode associated with the first episode, a static image of a third episode associated with the first episode, and a static image of a fourth episode associated with the first episode. When the user controls the focus frame to move to a video preview area of the third episode, the video preview area displays the dynamic content of the third episode and does not output the corresponding audio content, and meanwhile, video preview areas of the second episode and the fourth episode still present the static images. After the user inputs a confirmation command for the third episode, the display 260 may present a video content of the third episode in full screen and meanwhile play the corresponding audio content.

As mentioned in the above embodiments, after the user selects the target video preview area and confirms the selection, the controller 250 may control the display layer to display the recommended video resource in the target video preview area in full screen, and may also control the render layer to present the recommended video resource in the target video preview area in full screen. Meanwhile, above the recommended video resource played in full screen, the user may further continue to activate the video preview area to display other recommended video resources. Moreover, the corresponding audio content is also output while displaying the recommended video resource in full screen.

Figure 9:
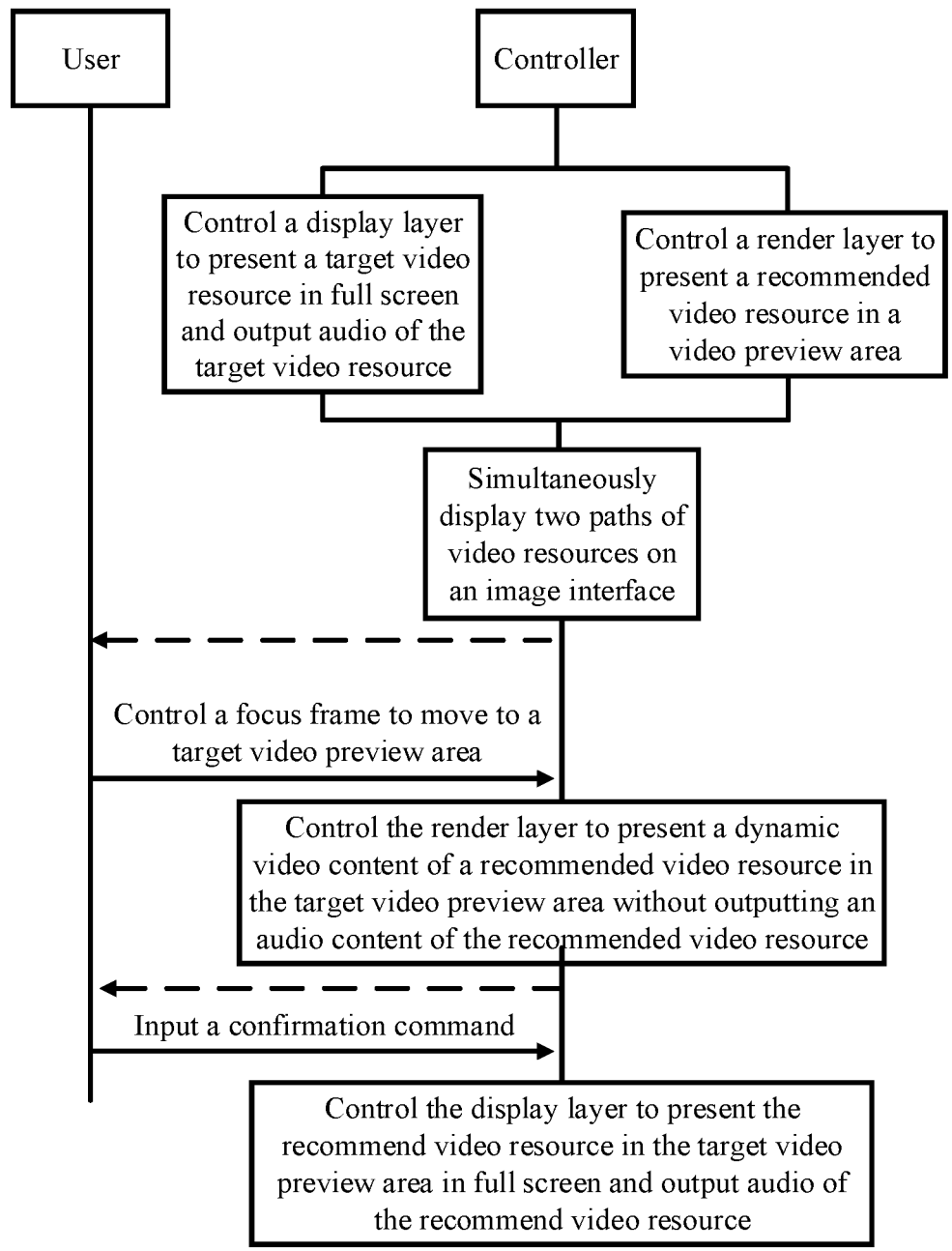
FIG. 9 is a third control flow diagram of a controller 250 according to some embodiments.

FIG. 9 is a third control flow diagram of the controller 250 according to some embodiments.

In some embodiments, as shown in FIG. 9, the controller 250 may continue to control the display layer to present the recommended video resource in the target video preview area in full screen and output the corresponding audio content. At this time, the recommended video resource to be presented may be regarded as the target video resource in the aforementioned embodiments, while the remaining video resources including the target video resource in the aforementioned embodiments are regarded as the recommended video resources, and the controller 250 continues to control the render layer to display the recommended video resources in the current video preview areas.

Figure 10:
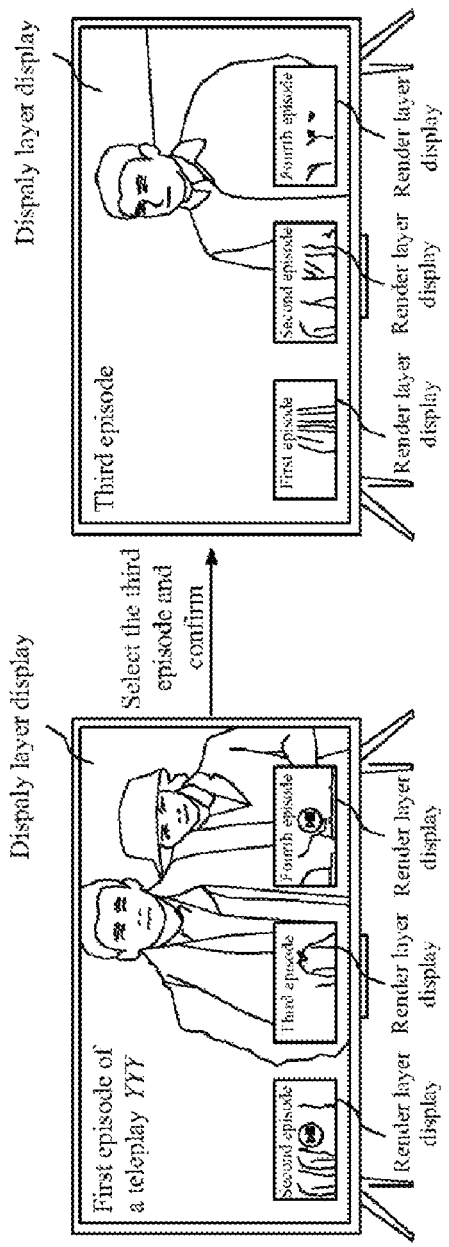
FIG. 10 is a first schematic display diagram of a video resource according to some embodiments.

FIG. 10 is a first schematic display diagram of the video resource according to some embodiments. As shown in FIG. 10, the user selects the video content of the third episode in the teleplay YYY in the target video preview area and confirms the selection, then the controller 250 controls the display layer to display the dynamic video content of the third episode in full screen, and meanwhile outputs the corresponding audio content. When the user reselects to watch a preview content, the controller 250 controls the render layer to display the video resources of the remaining first episode, second episode and fourth episode in all the video preview areas, and determines the video preview area on which the render layer only displays the dynamic content of the video resources according to the position of the focus frame. The video content of the third episode serving as the recommended video resource previously serves as the current target video resource, while the audio content of the first episode serving as the target video resource previously has served as the current recommended video resource.

Figure 11:
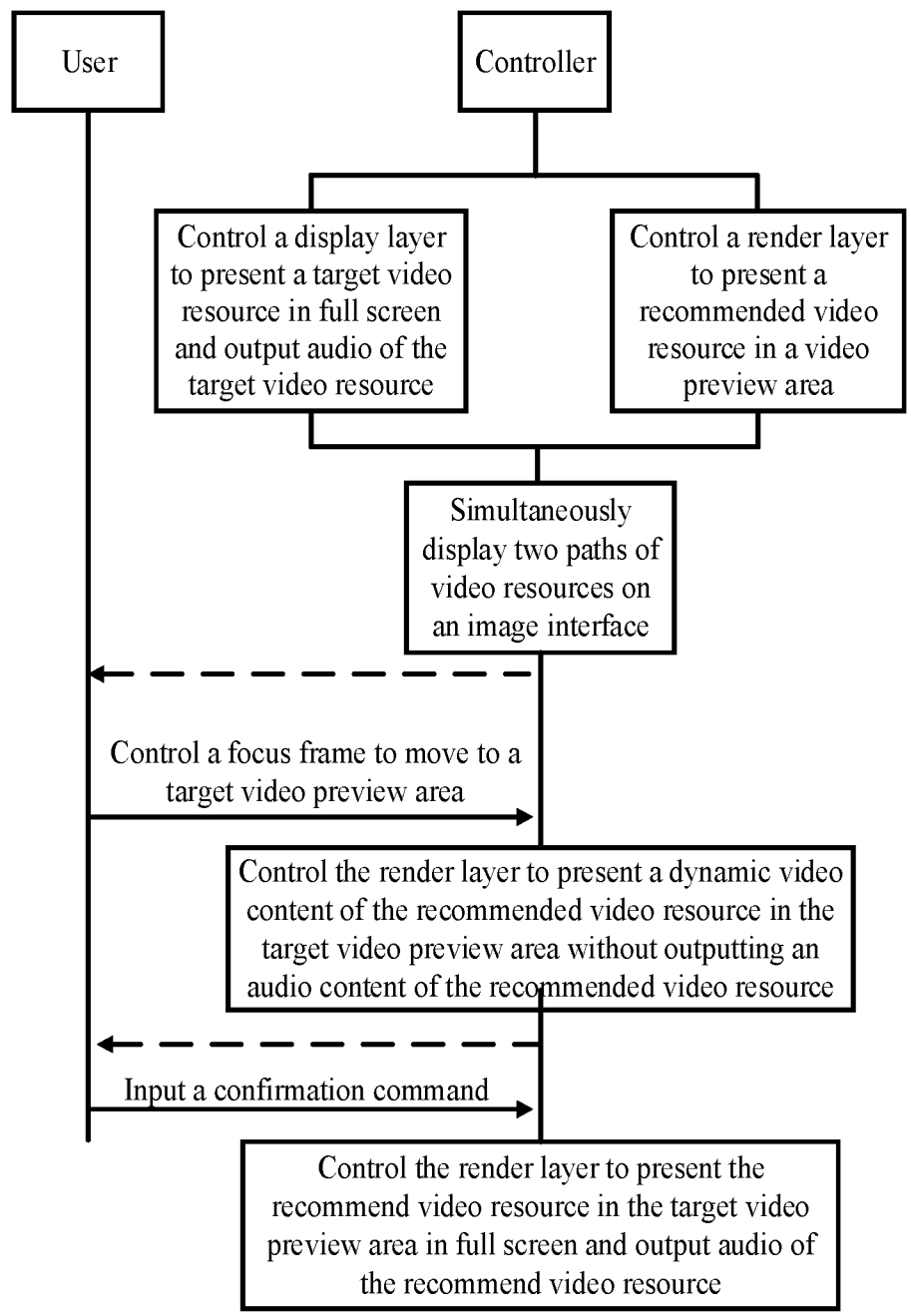
FIG. 11 is a fourth control flow diagram of a controller 250 according to some embodiments.

FIG. 11 is a fourth control flow diagram of the controller 250 according to some embodiments.

In some embodiments, as shown in FIG. 11, the controller 250 may continue to control the render layer to display the recommended video resource in the target video preview area in full screen and output the corresponding audio content. Because the display layer can only play one video resource at a time, the controller 250 may continue to control the display layer to display one recommended video resource in one video preview area, and continue to control the render layer to display other recommended video resources in other video preview areas. It should be noted that only the recommended video resource presented on the display layer is the dynamic video content, while the recommended video resources in other video preview areas presented on the render layer are only the certain frames of static images.

In addition, in a case where the controller 250 controls the render layer to display the recommended video resource in the target video preview area in full screen and outputs the corresponding audio, the controller 250 further controls the display layer to display the video resource in a video preview area according to the position of the focus frame controlled by the user, while the remaining video preview areas located outside of the focus frame display the static images through the render layer.

Figure 12:
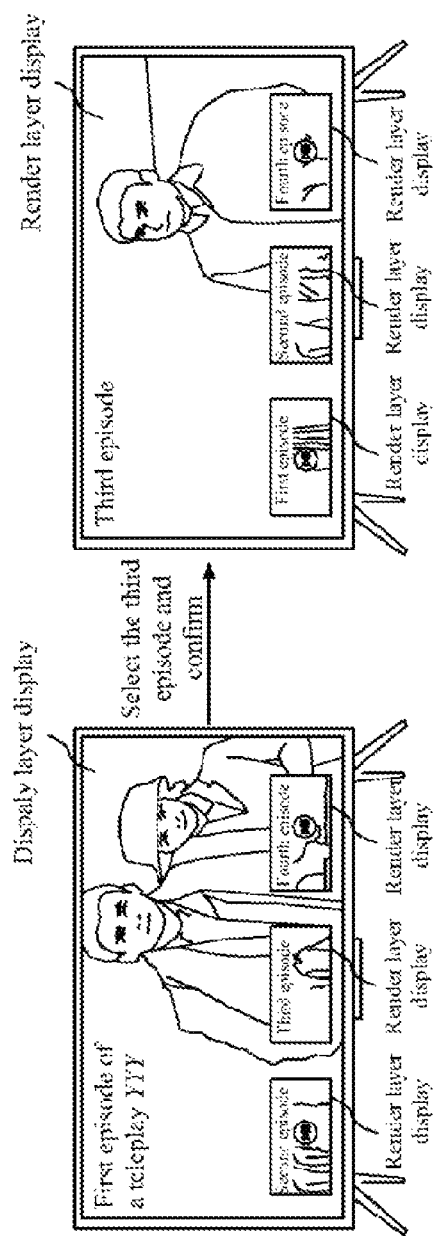
FIG. 12 is a second schematic display diagram of a video resource according to some embodiments.

For example, FIG. 12 is a second schematic display diagram of the video resource according to some embodiments. As shown in FIG. 12, the user selects the video content of the third episode in the teleplay YYY in the target video preview area and confirms the selection, then the controller 250 controls the render layer to display the video content of the third episode in full screen, and meanwhile outputs the corresponding audio content. When the user reselects to watch the preview content, if the focus frame is located in a second video preview area, the controller 250 controls the display layer to display the dynamic video content of the second episode in the second video preview area without outputting the corresponding audio content thereof. Meanwhile, the controller 250 continues to control the render layer to display the static image of the first episode in the first video preview area and display the static image of the fourth episode in a third video preview area. The video content of the third episode serving as the recommended video resource previously serves as the current target video resource, while the audio content of the first episode serving as the target video resource previously has served as the current recommended video resource.

It can be known from the above that the full-screen video resource may be presented by the display layer or the render layer, while the target video resource may also be presented between the display layer and the render layer alternatively. No matter what the case, two paths of dynamic video resources may be played simultaneously on the display apparatus 200, and playing of the two paths of videos will not affect each other, thereby meeting user's view needs.

Figure 13:
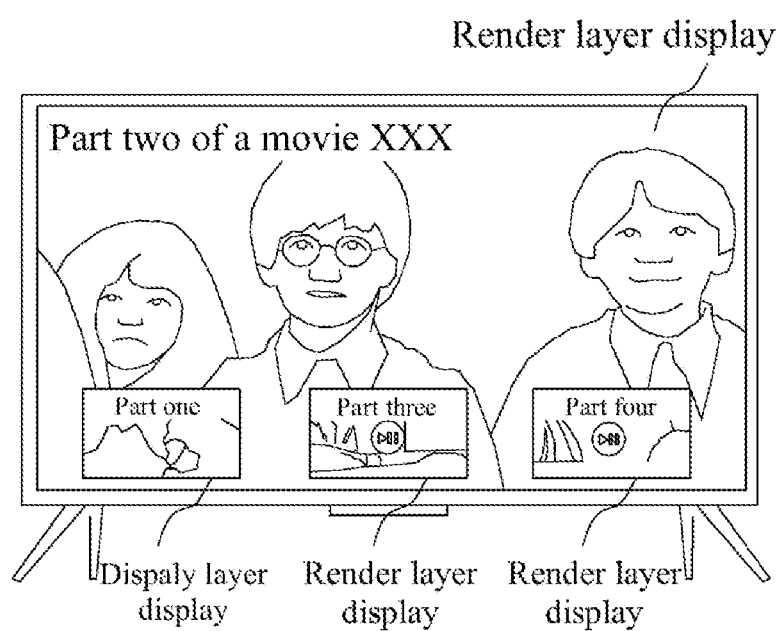
FIG. 13 is a third schematic diagram of an image interface according to some embodiments.

FIG. 13 is a third schematic diagram of the image interface according to some embodiments.

In some embodiments, the display layer may further directly display the target video resource obtained by the controller 250 in one video preview area and meanwhile output the corresponding audio content. At this time, the controller 250 may control the render layer to display the dynamic video content of the certain recommended video resource in full screen without outputting the audio content according to user's needs or a predetermined setting of the display apparatus 200. In this case, the video resource presented in the certain video preview area by the display layer may be regarded as the target video resource, while the video resources in other video preview areas and the video resource presented in full screen may all be regarded as the recommended video resources. It can be seen that the display apparatus 200 may display the two paths of dynamic video contents simultaneously at this time.

For example, as shown in FIG. 13, the user wants to watch a movie XXXX, and then video resources related to the movie XXXX and obtained by the controller 250 may include a part one, part two, part three, part four, and the like of the movie XXXX. If the controller 250 controls the display layer to display a dynamic video content of part one of the movie XXXX in the first video preview area and outputs the corresponding audio content, the part one is the target video resource, and the remaining parts, part two, part three and part four, are the recommended video resources. The controller 250 may control the render layer to display a dynamic video content of part two in full screen without outputting the audio content, and meanwhile controls the render layer to only display a certain frame of static image content in part three video and a certain frame of static image content in part four video respectively in the second and third video preview areas. At this time, the display apparatus 200 may also display the video content of part two while displaying the video content of part one of the movie XXXX, thereby meeting the requirement that the user previews the video content of part two in advance.

Figure 14:
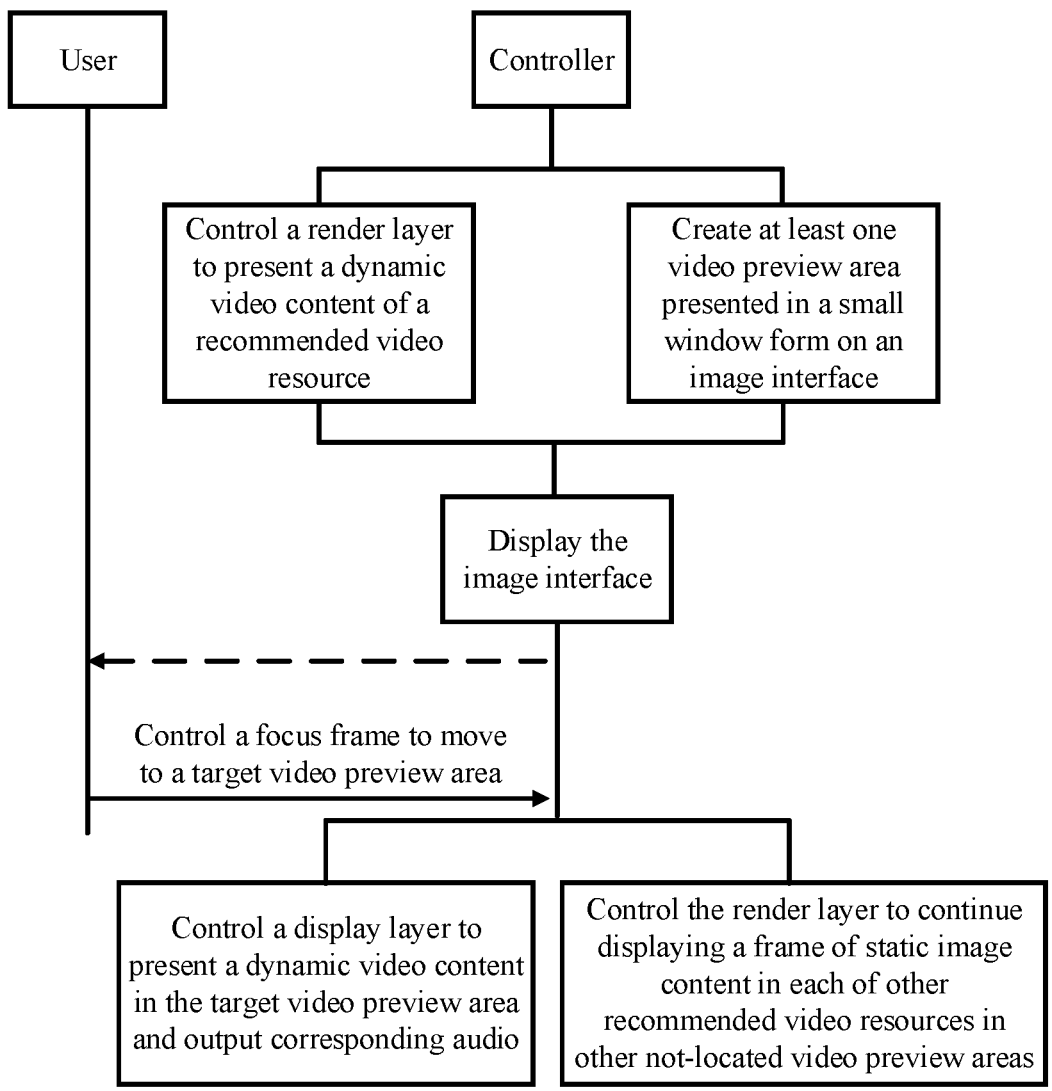
FIG. 14 is a fifth control flow diagram of a controller 250 according to some embodiments.

FIG. 14 is a fifth control flow diagram of the controller 250 according to some embodiments.

In the above embodiments, which video preview area displays the target video resource may be determined according to the position of the focus frame controlled by the user. Then, as shown in FIG. 14, the controller 250 detects the position of the focus frame on the display 260 in a case that the render layer only displays the dynamic video content of one recommended video resource in full screen without outputting the audio content. Moreover, in a case that the focus frame is located in a video preview area, the video preview area is determined as the target video preview area, the display layer is controlled to display the dynamic video content of the corresponding video resource in the target video preview area and output the corresponding audio. At this time, the video resource presented in the target video preview area is the target video resource.

Meanwhile, the controller 250 controls the render layer to continue displaying the certain frame of static image content in each of other recommended video resources in other video preview areas outside of the focus frame. Moreover, the target video resource and other recommended video resources in the above embodiments are all shown on the recommended video resource presented in full screen in a superimposed mode, as shown in FIG. 13.

But in some embodiments, after the user moves the focus frame and inputs a confirmation command into the display apparatus 200, it is understood that the user needs to watch the target video resource in the current target video preview area, and the controller 250 controls full-screen displaying of the target video resource in the target video preview area, and meanwhile outputs its corresponding audio content. At this time, either the display layer or the render layer may display the target video resource in full screen.

Moreover, in some embodiments, above the target video resource presented in full screen, the user may further continue to activate the video preview area to display other recommended video resources.

If the controller 250 continues to control the display layer to display the target video resource in the target video preview area in full screen, when the user needs to preview the video content again, the controller 250 needs to continue to control the render layer to display the recommended video resource in the current video preview area.

Figure 15:
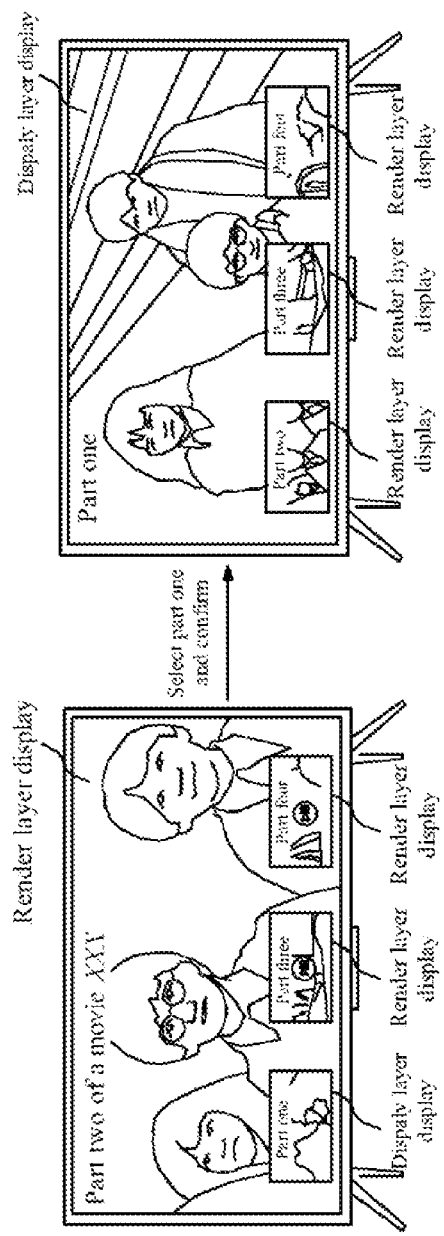
FIG. 15 is a third schematic display diagram of a video resource according to some embodiments.

For example, FIG. 15 is a third schematic display diagram of the video resource according to some embodiments. As shown in FIG. 15, the user selects the part one of the movie XXXX in the video preview area by landing the focus frame on it and confirming, and then the controller 250 will control the display layer to display the target video resource in full screen and output its corresponding audio content. Moreover, when the user needs to watch the video preview area again, the render layer is controlled to display static images from part two, part three and part four in all the video preview areas, and determine which video preview area the render layer displays the dynamic content of the video resource according to the position of the focus frame.

Or, if the controller 250 continues to control the render layer to display the target video resource in the target video preview area in full screen and output the corresponding audio content, when the user needs to preview the video content again, because the display layer can only play one video resource at a time, the controller 250 controls the display layer to display one recommended video resource in one video preview area without outputting the corresponding audio content, and continue to control the render layer to display other recommended video resources in other video preview areas. Similarly, only the recommended video resource presented on the display layer is the dynamic video content, while the recommended video resources in other video preview areas presented on the render layer are only the certain frames of static images.

In addition, in a case that the controller 250 controls the render layer to display the recommended video resource in the target video preview area in full screen, the controller 250 further controls the display layer to display the dynamic content of the video resource in a video preview area according to the position of the focus frame controlled by the user, while the remaining video preview areas outside of the focus frame display the static images through the render layer.

Figure 16:
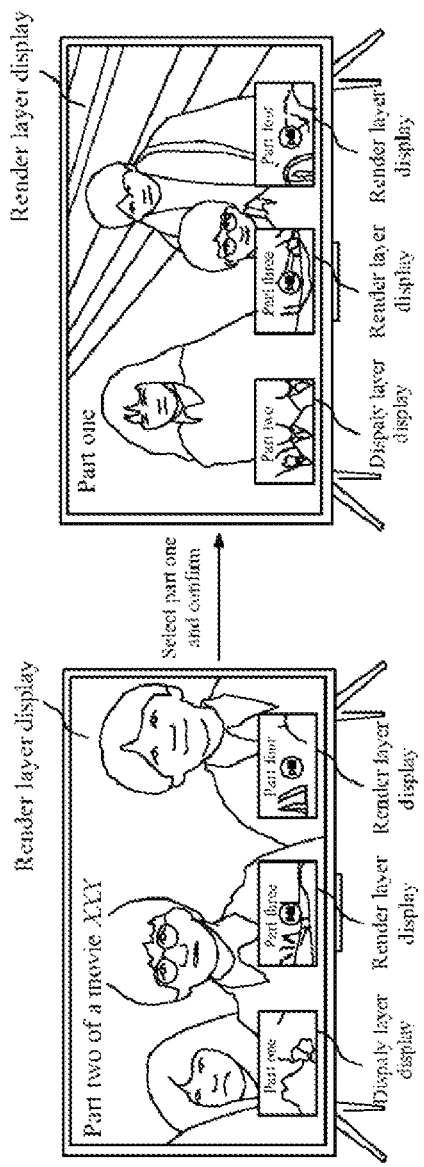
FIG. 16 is a fourth schematic display diagram of a video resource according to some embodiments.

For example, FIG. 16 is a fourth schematic display diagram of the video resource according to some embodiments. As shown in FIG. 16, the user selects the part one of the movie XXXX in the video preview area by landing the focus frame on it and confirming, and then the controller 250 may control the render layer to display the target video resource in full screen and output the corresponding audio content. Moreover, when the user needs to watch the video preview area again, if the position of the focus frame is located in the first video preview area, the controller 250 controls the display layer to display the dynamic video contents of part two of the movie XXXX in the first video preview area without outputting the audio content, and meanwhile, the controller 250 controls the render layer to respectively display the static images of part three and part four in the second and third video preview areas.

Whether the controller 250 controls the display layer to display the target video resource selected by the user in full screen and output the corresponding audio content, or controls the render layer to display the target video resource in full screen and outputs the corresponding audio content, when the user activates the video preview area again, a display method of the recommended video resource may refer to the above embodiments, which omits here.

It can be seen that in a case that the render layer directly displays the recommended video resource obtained by the controller 250 in full screen, the display apparatus 200 in embodiments of the disclosure may also realize simultaneously playing two paths of dynamic video resources, and playing of the two paths of videos does not affect each other, thereby satisfying user's needs.

Figure 17:
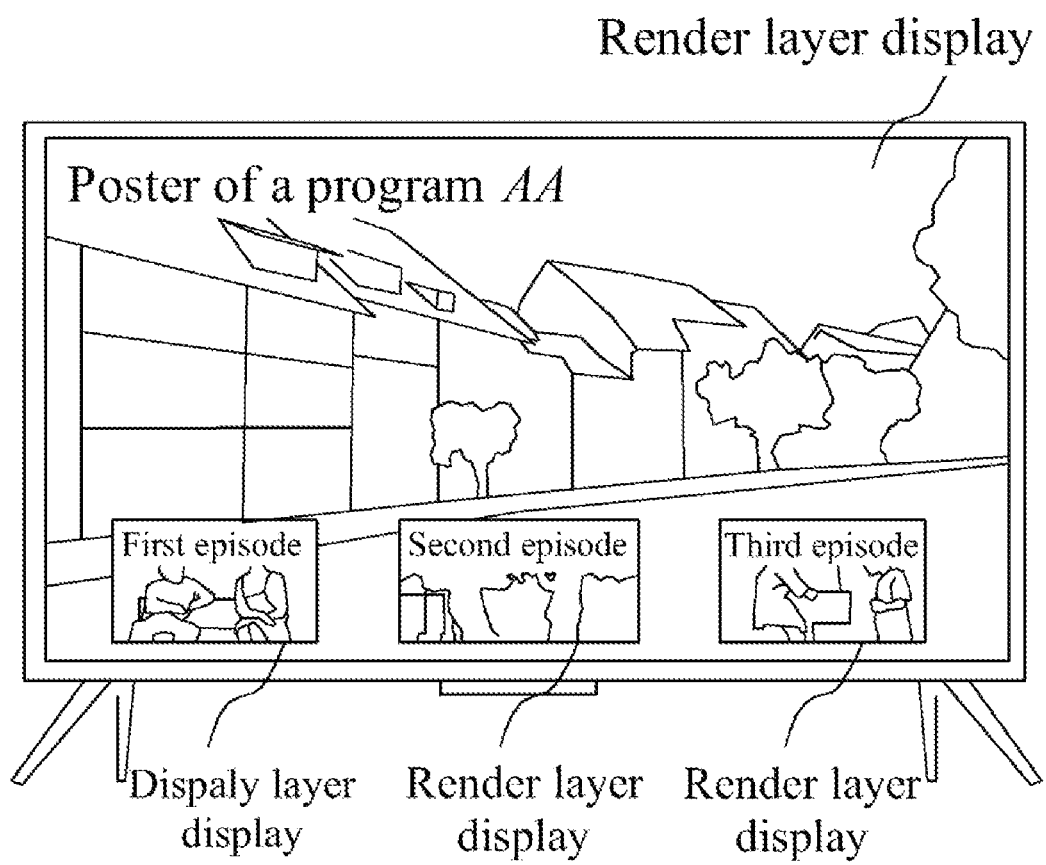
FIG. 17 is a fourth schematic diagram of an image interface according to some embodiments.

FIG. 17 is a fourth schematic diagram of the image interface according to some embodiments.

In some embodiments, when the controller 250 requests the target video resource from a server, the server sends the target video resource, the recommended video resource, and a recommended image of the target video resource, such as a poster image, together to the controller 250. In this case, the controller 250 may control the render layer to display the recommended image in full screen, controls the display layer to display the target video resource in one video preview area and output the corresponding audio, and meanwhile, controls the render layer to continue to display the recommended video resources in other video preview areas. Similarly, the target video resource and the recommended video resource on the image interface are all presented on the recommended image in a superimposed mode.

For example, as shown in FIG. 17, the user wants to watch a program AA, and then video resources related to the program AA and obtained by the controller 250 may include a first episode, a second episode, a third episode, a show poster and the like of the program AA. The controller 250 may control the render layer to display the poster image of the program AA in full screen, if the controller 250 controls the display layer to display a dynamic video content of the first episode of the program AA in the first video preview area and outputs the corresponding audio content, the first episode is the target video resource, and other second episode and the third episode are the recommended video resources and are also presented on the render layer.

In addition, the controller 250 further controls the display layer to display the video resource in a video preview area according to the position of the focus frame controlled by the user. The video resource presented on the display layer may be regarded as the target video resource, while the video resource presented on the render layer may be regarded as the recommended video resource. Similarly, only the target video resource presented on the display layer may output the audio content while displaying, while the recommended video resource can only display a silent static image or dynamic image through the render layer.

Figure 18:
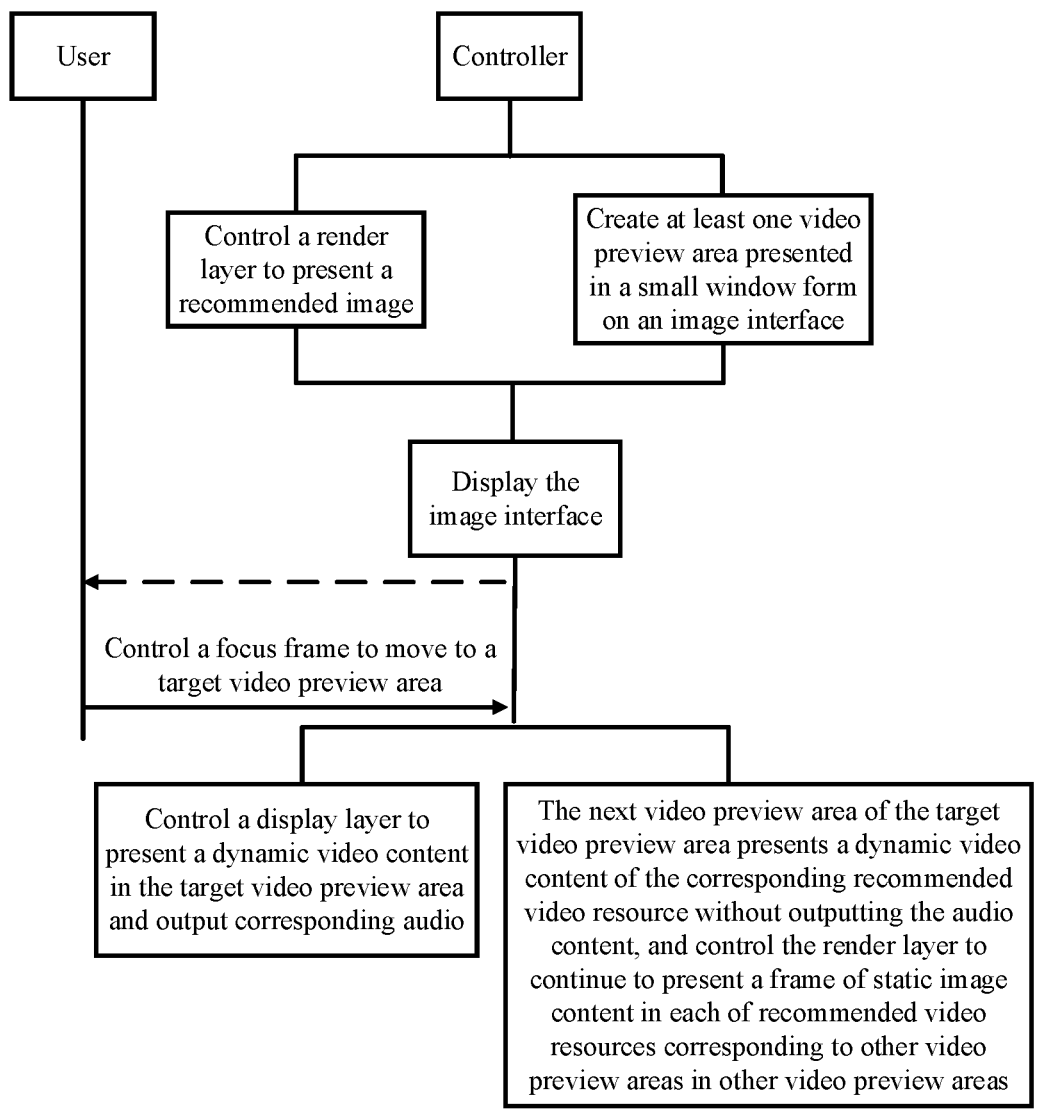
FIG. 18 is a sixth control flow diagram of a controller 250 according to some embodiments.

FIG. 18 is a sixth control flow diagram of the controller 250 according to some embodiments.

In some embodiments, in a case that the render layer displays the recommended image in full screen, as shown in FIG. 18, the controller 250 further detects the position of the focus frame on the display. In a case that the focus frame is located in a certain video preview area, the video preview area is determined as the target video preview area, and then the controller 250 controls the display layer to display the dynamic video content of the video resource in the target video preview area and output the corresponding audio content. Meanwhile, the controller 250 controls the render layer only displays the dynamic video content of the corresponding recommended video resource in the next video preview area of the target video preview area without outputting the audio content, and control the render layer to continue to only display the certain frame of static image content in each of the corresponding recommended video resources in the other video preview areas.

Figure 19:
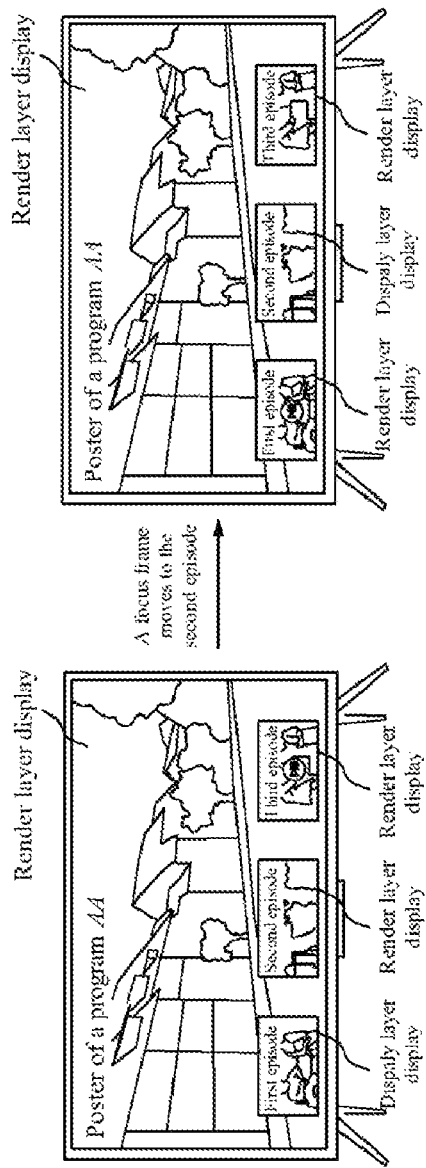
FIG. 19 is a fifth schematic display diagram of a video resource according to some embodiments.

For example, FIG. 19 is a fifth schematic display diagram of the video resource according to some embodiments. As shown in FIG. 19, the user controls the focus frame to land on the first video preview area, then the first episode of video content of the program AA is the target video resource, and the controller 250 controls the display layer to display a dynamic video content of the first episode in the video preview area and outputs the corresponding audio content. Meanwhile, the controller 250 controls the render layer to only display a dynamic video content of the second episode in the second video preview area without outputting the corresponding audio content, and the controller 250 controls the render layer to continue to display a static image of the third episode in the third video preview area. Then if the user controls the focus frame to land on the second video preview area, then the second episode of video content of the program AA is the target video resource, and the controller 250 needs to control the display layer to display the dynamic video content of the second episode in the second video preview area and outputs the corresponding audio content. Meanwhile, the controller 250 controls the render layer to only display the dynamic video content of the third episode in the third video preview area without outputting the audio content, and the controller 250 controls the render layer to continue to display a static image of the first episode in the first video preview area.

In some embodiments, in a case that the focus frame is located in the target video preview area, the controller 250 may also detect whether the user inputs a confirmation command. In a case that the user inputs the confirmation command, the render layer or the display layer is controlled to display the dynamic video content of the target video resource in the target video preview area in full screen and outputs the corresponding audio content. The approach of controlling the render layer to display the target video resource in full screen or controlling the display layer to display the target video resource may refer to the above embodiments, which is not repeated here.

It can be seen that in a case that the render layer directly displays the recommended image obtained by the controller 250 in full screen, the display apparatus 200 in embodiments of the disclosure may also realize simultaneously playing the two paths of dynamic video resources, and playing of the two paths of videos does not affect each other, thereby meeting user's demands.

In addition, in some embodiments, screen size of the display 260 is limited, and therefore, the quantity of video preview areas being presented is also limited. When the size of the video preview area is set to be larger, the less video preview area may be disposed. While when the size of the video preview area is set to be smaller, the more video preview area may be disposed. The quantity of the video preview areas presented on the image interface listed in the above embodiments is only an example. In other embodiments, the quantity of the video preview areas may be configured according to user's needs.

Moreover, in some embodiments, the controller 250 may also only obtain the target video resource that the user wants to watch and cannot obtain the associated recommended video resource. In this case, the controller 250 may prompt the user that there is no recommended content currently when the user activates the video preview area.

Figure 20:
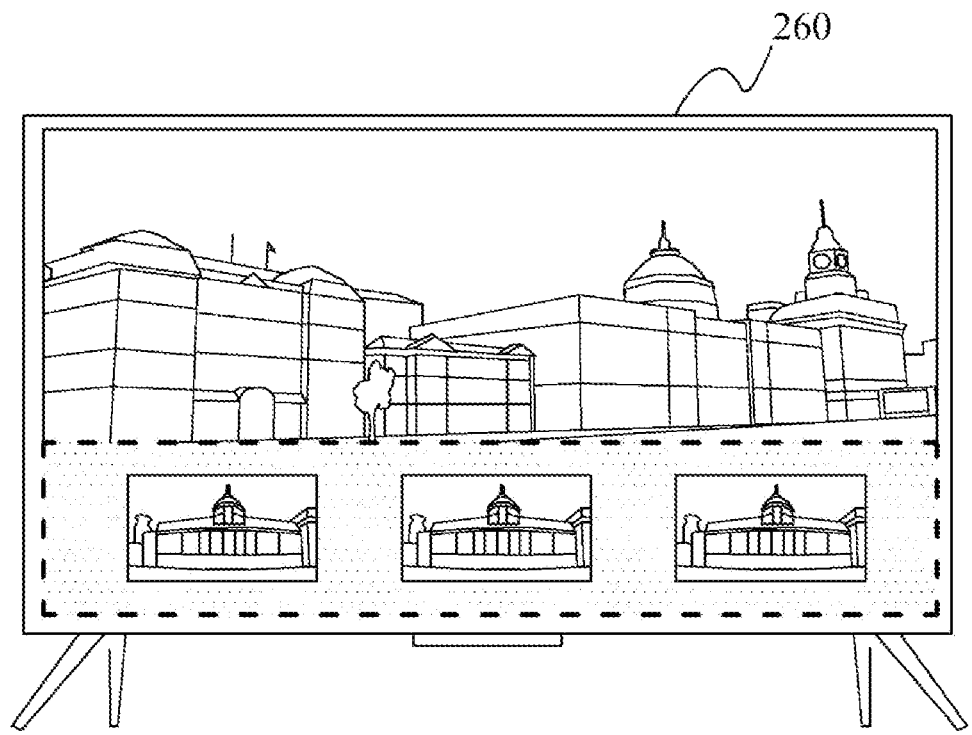
FIG. 20 is a first schematic diagram of video preview areas according to some embodiments.
Figure 21:
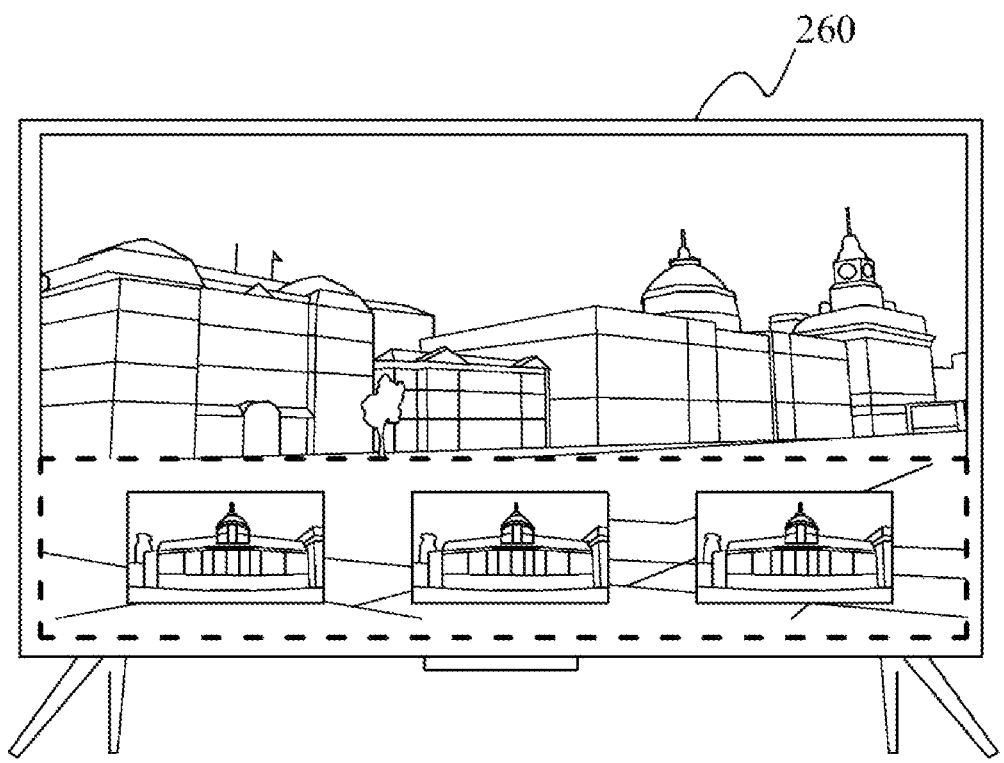
FIG. 21 is a second schematic diagram of video preview areas according to some embodiments.

FIG. 20 is a first schematic diagram of the video preview areas according to some embodiments. FIG. 21 is a second schematic diagram of the video preview areas according to some embodiments.

In some embodiments, transparency of an area where all the video preview areas are located may also be adjusted. As shown in FIG. 20, the area within a dashed box may be regarded as the area where the video preview areas are located. Transparency of other areas except for the video preview areas for displaying the video resources in the dashed box may be set to be 0%, as shown in FIG. 20, the dashed box completely shield a content presented on a lower layer in full screen form. While as shown in FIG. 21, the transparency of other areas except for the video preview areas within the dashed box may be set to be 0-100%, and then in this case, the other areas except for the video preview areas within the dashed box do not completely shield the content presented in the lower layer in full screen. In other embodiments, the transparency of the area in the video preview area may also be set to other values according to user's demands.

Figure 22C:
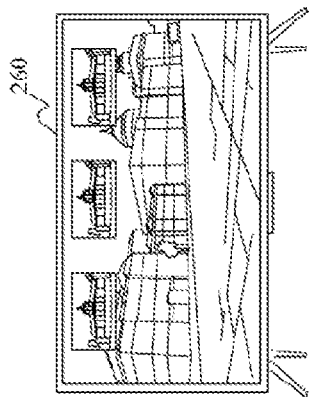
FIG. 22C is a seventh schematic diagram of an image interface according to some embodiments.
Figure 22B:
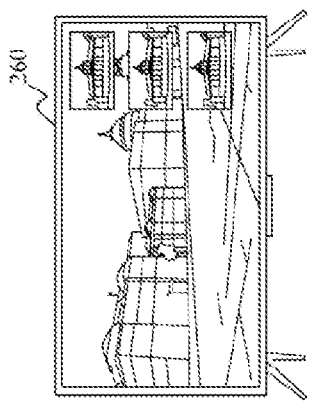
FIG. 22B is a sixth schematic diagram of an image interface according to some embodiments.
Figure 22A:
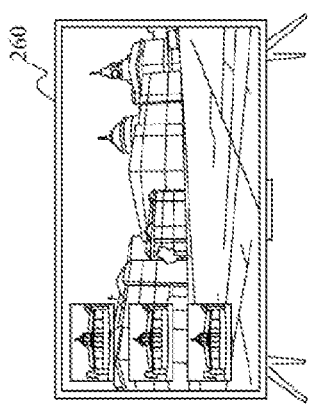
FIG. 22A is a fifth schematic diagram of an image interface according to some embodiments.

FIG. 22A, FIG. 22B and FIG. 22C are respectively a fifth schematic diagram, a sixth schematic diagram and a seventh schematic diagram of the image interface according to some embodiments.

In some embodiments, as shown in FIG. 22A, FIG. 22B and FIG. 22C, assuming that the main part of the full-screen display content should not be blocked, the video preview areas may also be vertically arranged and presented on a left side or right side of the image interface, or horizontally arranged and presented on an upper portion of the image interface. The case that the video preview areas on the image interface listed in the above embodiments are located at a bottom of the image interface is only an example. In other embodiments, the positions of the video preview areas may be configured according to user's needs.

In addition, it should be noted that in embodiments of the disclosure, the render layer, namely an OSD layer, may include a plurality of sublayers, such as OSD1, OSD2 and OSD3, and thus the controller 250 may control the render layer to display the full-screen content and display the contents in the plurality of video preview areas simultaneously.

It can be known from the above that the display apparatus 200 in embodiments of the disclosure may display another recommended video content on the screen for the user as the preview content while playing one video watched by the user, so that the user watches the two paths of videos conveniently. The image interface of the video resource in the display apparatus 200 may include the render layer and the display layer mutually superimposed. Because the display layer can only play one video, the render layer is controlled to play the other video resource, thus contents of two paths of played video resources may be presented on the image interface, and the purpose of playing the two paths of video resources on the display apparatus 200 is also achieved. It can be seen that the user may simultaneously watch the two normally played video contents on the display apparatus 200, thereby improving user's view experience.

Figure 23:
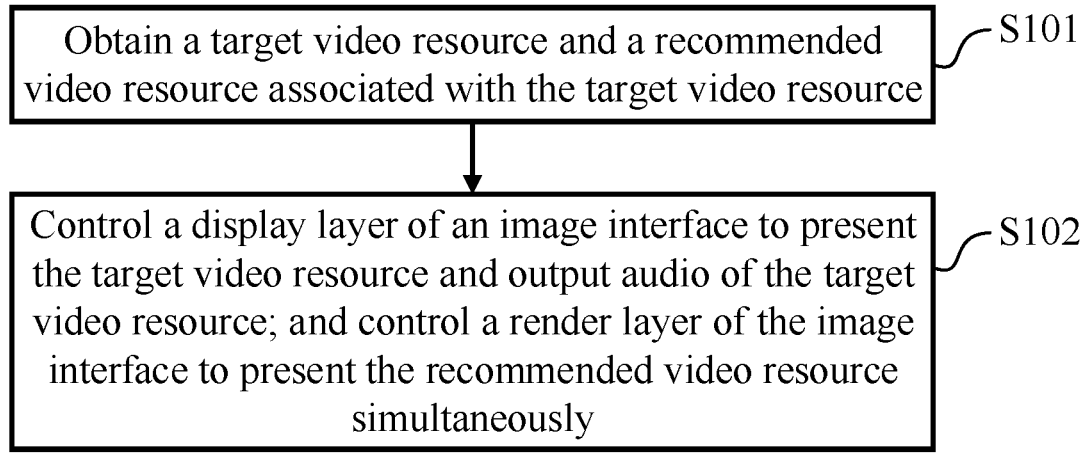
FIG. 23 is a flow diagram of a method for playing two paths of video resources according to some embodiments.

FIG. 23 is a flow diagram of a method for playing two paths of video resources according to some embodiments.

The method for playing two paths of video resources in the embodiments of the disclosure may be applied to the controller 250 in the above embodiments or a component or a module with a control function. As shown in FIG. 23, the method may include following steps.

Step S101, a target video resource and a recommended video resource associated with the target video resource are obtained.

Step S102, a display layer of an image interface is controlled to display the target video resource and output audio of the target video resource, and a render layer of the image interface is controlled to present the recommended video resource simultaneously. The image interface is a content presented when a display shows a video resource.

In some embodiments, the method further includes: at least one video preview area presented in a small window form is created on the image interface; in a case that the display layer is controlled to display the target video resource in full screen and output audio of the target video resource, a position of a focus frame on the display is detected; in a case that the focus frame is not located in any video preview area, the render layer is controlled to present a frame of static image content in the recommended video resource in the video preview area; in a case that the focus frame is located in a target video preview area, the render layer is controlled to present a dynamic video content of the recommended video resource in the target video preview area without outputting a corresponding audio content; and the render layer is controlled to present the frame of static image content in the recommended video resource in another video preview area simultaneously, where the recommended video resources are presented on the target video resource in a superimposed mode.

In some embodiments, the method further includes: in a case that the focus frame is located in the target video preview area, whether a user inputs a confirmation command is detected; in a case that the user inputs the confirmation command, the display layer is controlled to present the recommended video resource in the target video preview area in full screen and output the corresponding audio; and the render layer is controlled to present a current recommended video resource in a current video preview area simultaneously.

In some embodiments, the method further includes: in a case that the focus frame is located in the target video preview area, whether the user inputs the confirmation command is detected; in a case that the user inputs the confirmation command, the render layer is controlled to present the recommended video resource in the target video preview area in full screen and output the corresponding audio; and the display layer is controlled to present a dynamic video content of a recommended video resource in a current video preview area without outputting an audio content, and the render layer is controlled to continue to present a frame of static image content in the corresponding recommended video resource in the another video preview area simultaneously.

In some embodiments, the method further includes: at least one video preview area presented in the small window form is created on the image interface; in a case that the render layer is controlled to present a dynamic video content of a recommended video resource in full screen without outputting the corresponding audio, the position of the focus frame on the display is detected; in a case that the focus frame is located in a target video preview area, the display layer is controlled to present the dynamic video content of the target video resource in the target video preview area and output a corresponding audio; and the render layer is controlled to continue to present a frame of static image content in the corresponding recommended video resource in the another video preview area simultaneously, where the target video resource and the recommended video resource corresponding to the another video preview area are presented on the recommended video resource presented in full screen in a superimposed mode.

In some embodiments, the method further includes: in a case that the focus frame is located in the target video preview area, whether the user inputs the confirmation command is determined; in response to the user inputting the confirmation command, the display layer is controlled to show the target video resource in the target video preview area in full screen and output the corresponding audio; and the render layer is controlled to show the current recommended video resource in the current video preview area simultaneously.

In some embodiments, the method further includes: in a case that the focus frame is located in the target video preview area, whether the user inputs the confirmation command is determined; in a case that the user inputs the confirmation command, the render layer is controlled to show the target video resource in the target video preview area in full screen and output the corresponding audio; and the display layer is controlled to show the dynamic video content of a recommended video resource in a current video preview area without outputting the audio content, and the render layer is controlled to continue to display a frame of static image content in the corresponding recommended video resource in the other video preview area simultaneously.

In some embodiments, the method further includes: a recommended image of the target video resource is obtained while obtaining the target video resource and the recommended video resource associated with the target video resource; at least one video preview area presented in the small window form is created on the image interface; in a case that the render layer is controlled to display the recommended image in full screen, the position of the focus frame on the display is detected; in a case that the focus frame is located in a target video preview area, the display layer is controlled to present the target video resource in the target video preview area and output the corresponding audio; and the render layer is controlled to present the dynamic video content of the recommended video resource in the next video preview area of the target video preview area without outputting the audio content, and the render layer is controlled to continue to present a frame of static image content in the corresponding recommended video resource in the another video preview area simultaneously, where the target video resource and the recommended video resources are superimposed on the recommended image.

Because the method for playing two paths of video resources in embodiments of the disclosure may be applied to the controller 250 in the above embodiments respectively, other contents related to the method for playing two paths of video resources may refer to the above embodiments.

A traditional digital signal television program may be watched on the display apparatus, and a network video may further be played through the display apparatus, thereby meeting various requirements of the user. However, the user finds that there is a flicker problem when watching a certain video on the display apparatus, causing bad user experience.

In some embodiments, a display apparatus platform may have a video application built-in, such as a YouTube video application, and the video may be played through the YouTube video application. The YouTube video application needs to be certified by Google. The Google requires using a browser to serve as a carrier of the video application. For example, the browser may be a cobalt browser, and therefore, the display apparatus utilizes the video application with the browser as the carrier to play the video.

The above flicker problem may occur because after the certain video in the YouTube video application is played, the video application exits from a frontend to a backend, the browser records a hyperlink address of a last access page of the video application, namely, a hyperlink address of the video. In this case, if the user clicks a control of another video on the YouTube video application from another page, for example, clicks the control from a homepage on the display apparatus, then a system in the display apparatus firstly launches the video application, pulls the video application from the backend to the frontend, displays a page corresponding to the last accessed hyperlink address recorded when the video application exits to the backend last time, and then jumps to a video corresponding to the currently-clicked control. In this process, the page corresponding to the previous accessed hyperlink address may approximately stay on the display for about 40 ms, the user can perceive the obvious flicker visually, affecting user's view experience.

Figure 24:
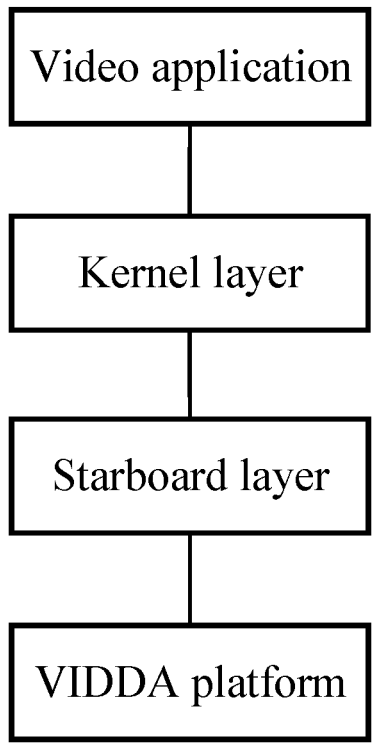
FIG. 24 is a schematic connection diagram of a system, a starboard layer, a kernel layer and a video application according to some embodiments.

In some embodiments, the browser may be a cobalt browser, and the cobalt browser is divided into two parts of a kernel layer and a starboard layer. Codes of the kernel layer are mainly provided and issued by the Google, and are completely provided by the Google in a cloud self-upgrade; and the starboard layer is a part, connecting with the system in the display apparatus, with a kernel of the cobalt browser, and can be edited and controlled by the system. As shown in FIG. 24, the system on the display apparatus is a VIDAA platform, and the VIDAA platform is connected with the video application through the starboard layer and the kernel layer.

Figure 25:
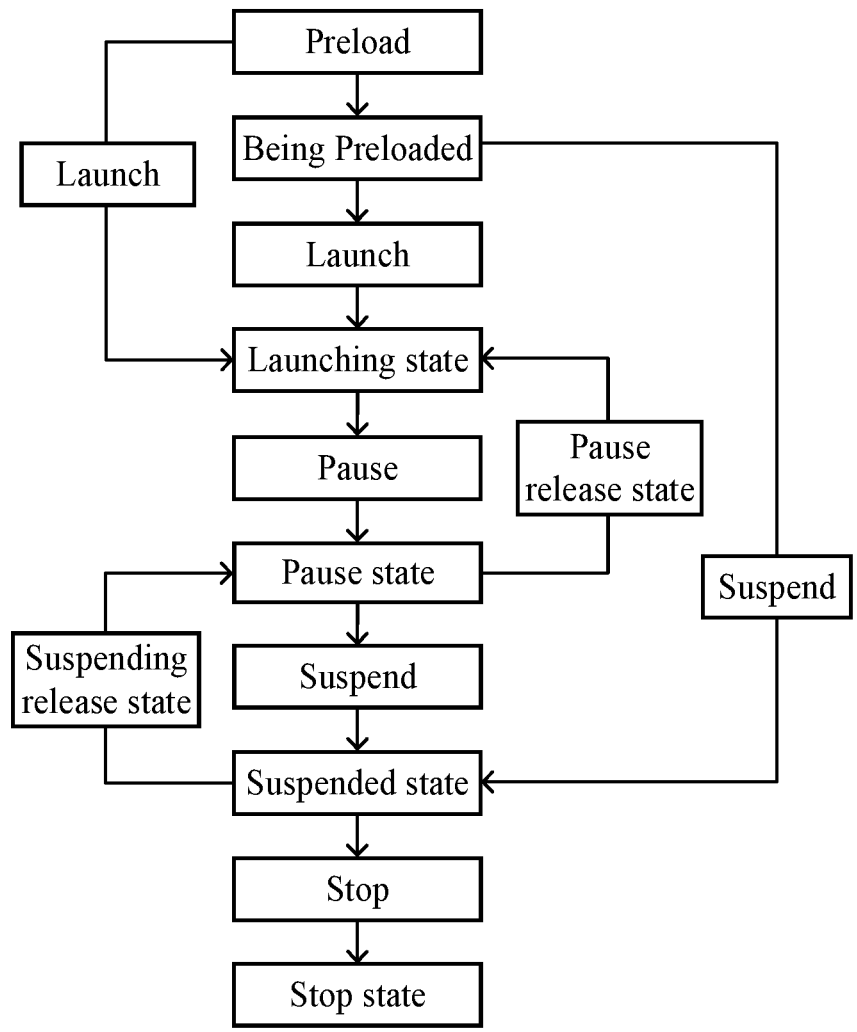
FIG. 25 is a schematic diagram of a life cycle of a video application according to some embodiments.

An overall process of a life cycle of the video application on the browser, as shown in FIG. 25, includes: preloading, being preloaded, launching, changed into a launch state, pause after receiving a pause instruction, changed into a pause state, suspending after receiving a suspending instruction, changed into a suspended state, stopping after receiving a stop instruction, and changed into a stopping state. In addition, when in the suspended state, the suspended state may be released and changed into the pause state; and when in the pause state, the pause state may be released and changed into the launching state. When the user clicks a certain video control on the video application from the other page, this process mostly involves a launching state that the video application may be operated at the frontend at will and an invisible suspended state that the video application is run at the backend and cannot be operated.

Figure 26:
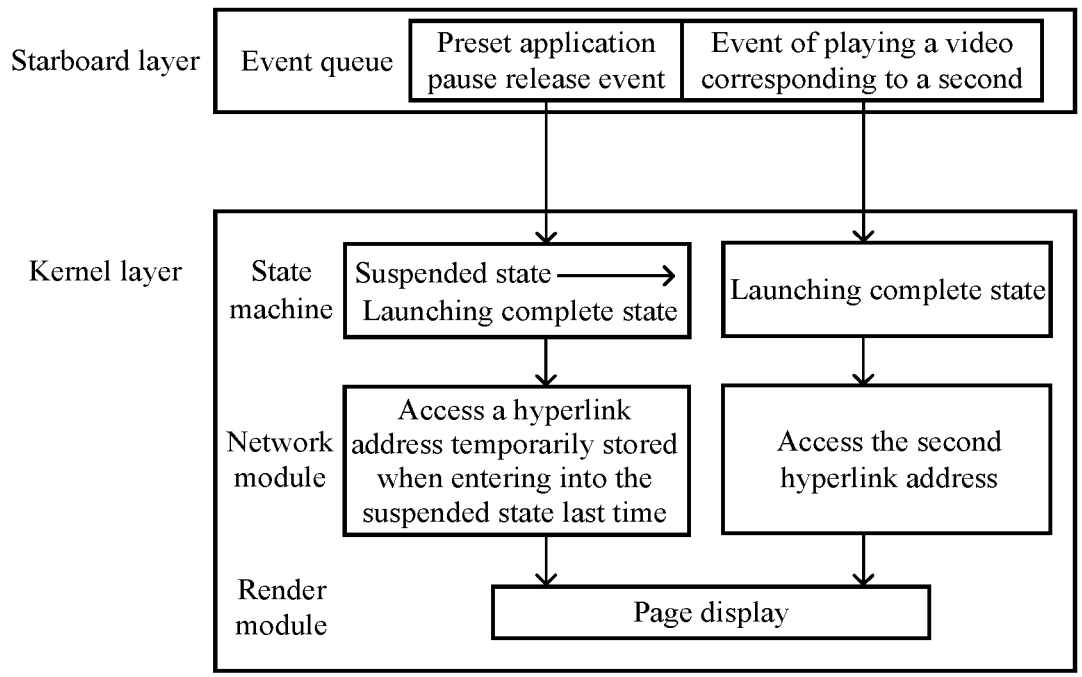
FIG. 26 is a flow diagram of displaying a page corresponding to a hyperlink address in a related art according to some embodiments.

When the user clicks a video control on the video application from the other page, according to the cobalt browser logic, in order to skip to the hyperlink address corresponding to the video control, a preset application pause release event and an event of playing a media resource video corresponding to the hyperlink address need to be executed. In the related art, as shown in FIG. 26, a flow is to firstly issue a pause state release event, and then place an event of playing the video corresponding to the hyperlink address to an event queue, that is, the YouTube video application is launched firstly, and then skip to the video corresponding to the hyperlink address. The cobalt browser processes the pause state release event, so that the YouTube video application enters into the launching complete state, and the hyperlink address temporarily stored last time when entering into the suspended state to serve as a hyperlink address launched when entering into the launching complete state this time. The cobalt browser processes the event of playing the video corresponding to the hyperlink address, so that the YouTube video application skips to a hyperlink address corresponding to the currently selected video control. It can be found that there are two times of page refresh in the overall process through the above description. That is, before skipping to the hyperlink address corresponding to the currently-selected video control, a page displays the video corresponding to the hyperlink address temporarily stored last time when entering into the suspended state, thereby causing the page flicker problem.

Figure 27:
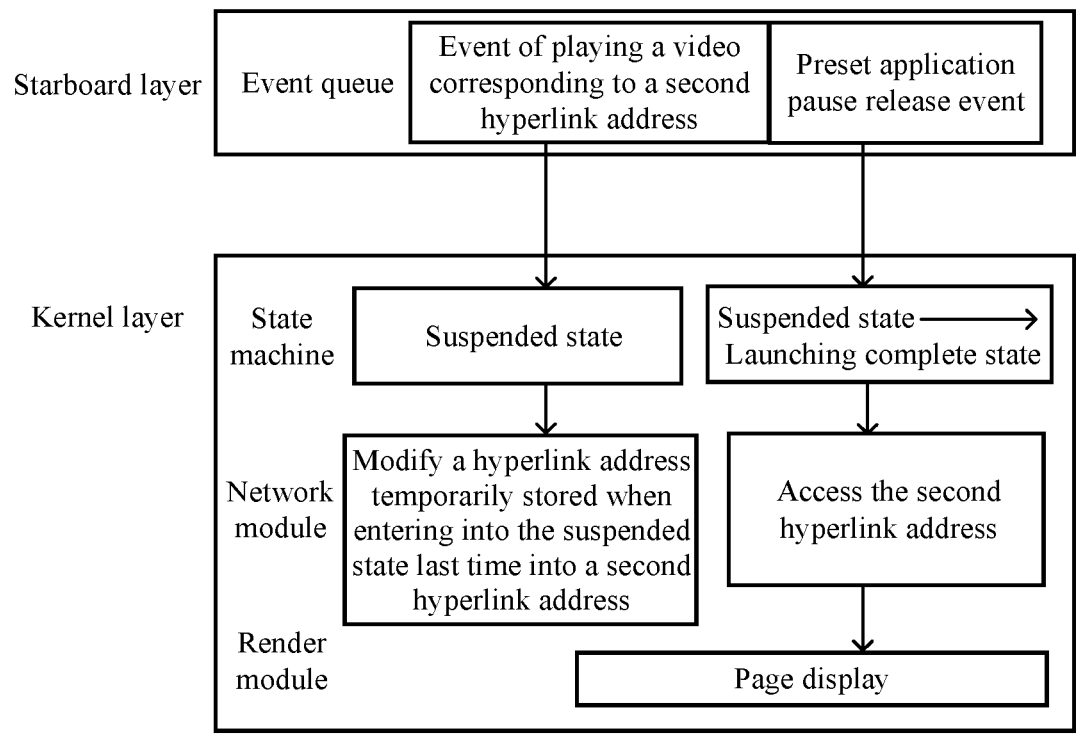
FIG. 27 is a flow diagram of displaying a page corresponding to a hyperlink address according to some embodiments.

The embodiments of the disclosure adopts a reversal design thought, as shown in FIG. 27, the order of the event queue is adjusted into firstly issuing the event of playing the video corresponding to the hyperlink address and then issuing the pause state release event, that is, the hyperlink address is firstly issued, and then the YouTube video application is launched. Specific steps include the following: when the YouTube video application is in the suspended state, the hyperlink address corresponding to the currently selected video control is injected into the cobalt browser firstly to replace the hyperlink address temporarily stored last time when entering into the suspended state, then the pause state release event is injected into the cobalt browser to enter into the launching complete state. In this way, the hyperlink address carried and launched this time is the hyperlink address corresponding to the currently selected video control injected firstly. There is only one page refreshing in the overall process, thereby avoiding the page flicker problem.

An embodiment of the disclosure provides a method for displaying a page corresponding to a hyperlink address. The method includes following steps.

An instruction for suspending a preset application is received to suspend the preset application to a backend, and a first hyperlink address last accessed by the preset application is stored. For example, when playing a video, a display apparatus may use a specific key on a control device to suspend the preset application from a frontend to the backend. If the played video is ZZZ, the first hyperlink address is a hyperlink address of ZZZ.

An instruction for selecting a video control is received to modify the first hyperlink address into a second hyperlink address corresponding to the video control, the second hyperlink address is utilized to launch the preset application suspended in the backend, and a display is controlled to present a page corresponding to the second hyperlink address. Operation of selecting the video control in embodiments of the disclosure may be achieved on another page. For example, the other page may be a homepage. A plurality of video controls may be presented on the homepage, and a user selects a certain video control through the control device. It should be noted that the video control needs to be played through the preset application. The preset application is suspended to the backend, when the preset application is pulled to the frontend again, the second hyperlink address is directly utilized to replace the first hyperlink address to launch the preset application, in this way, the page flicker problem in the related art is avoided.

In some embodiments, the step of suspending the preset application to the backend includes: setting a state of the preset application to be a suspended state at the backend.

In some embodiments, the modifying the first hyperlink address into the second hyperlink address corresponding to the video control, utilizing the second hyperlink address to launch the preset application suspended at the backend, and controlling the display to show the page corresponding to the second hyperlink address, includes the following steps.

An event of playing a video corresponding to the second hyperlink address and an event of preset application pause release are sequentially added to an event queue; when the state of the preset application is the suspended state, the first hyperlink address is modified into the second hyperlink address corresponding to the video control currently selected.

A state of the preset application is changed from the suspended state into a launching state, the second hyperlink address is utilized to launch the preset application suspended at the backend, and the display is controlled to show the page corresponding to the second hyperlink address.

The sequentially adding the event of playing the video corresponding to the second hyperlink address and the event of preset application pause release to the event queue; when the state of the preset application is the suspended state, modifying the first hyperlink address into the second hyperlink address corresponding to the video control; and changing the state of the preset application from the suspended state into the launching state, utilizing the second hyperlink address to launch the preset application suspended at the backend, and controlling the display to show the page corresponding to the second hyperlink address.

The starboard layer sequentially adds the event of playing the video corresponding to the second hyperlink address and the event of preset application pause release to the event queue.

When the state of the preset application is the suspended state, the kernel layer modifies the first hyperlink address into the second hyperlink address corresponding to the video control; and changes the state of the preset application from the suspended state into the launching state, utilizes the second hyperlink address to launch the preset application suspended on the backend, and controls the display to show the page corresponding to the second hyperlink address.

Cobalt is a single webpage and single process lightweight browser. When the display apparatus 200 uses the browser to load resources, loading needs to be performed sequentially according to an order of all the resources. A system UI page of the current display apparatus 200 is generally presented through a system local webpage loaded by the cobalt browser. Because the cobalt browser is a single webpage application, a plurality of UI applications at the frontend of the display apparatus 200 are run on the same cobalt browser by different modules, and therefore, resource loading of all application modules are mutually coupled and mutually influenced.

Taking loading a picture as an example, the cobalt browser cannot distinguish a current picture request comes from which UI application, consequently, regardless of any UI application, as long as the user browses the picture, even if the user only quickly browses the picture and exits before successful loading, the picture may be queued to be loaded in the cobalt browser. Especially when a network connection is poor and the user quickly browses a lot of pictures, when the user stays at a certain picture resource for waiting, the picture cannot be rendered and presented for a long time, causing poor user experience.

In view of the above issue, picture cache of the browser is generally increased, the browsed pictures are all stored in a memory, and the pictures may be directly read from the memory without downloading again during next loading. Or a local disk saving mechanism is added, the pictures browsed in certain important applications are loaded into a platform disk, and the pictures are read from a disk into the memory during next loading, thereby saving a time of downloading from a network again.

However, the above two schemes are limited, space of the disk and the memory are not endless, and too much cached picture contents may cause a great pressure on the system, thereby affecting system stability and hardware life. Moreover, the above schemes can only save a loading speed of the pictures not browsed for the first time, and a problem that a speed for loading the pictures for the first time is low still cannot be solved.

In view of the above, an embodiment of the disclosure provides a method for loading a resource on a display apparatus and the display apparatus 200. A current resource request corresponding to a user current browsing content may be placed at a head of a resource request queue, so that a controller loads a resource at the head of the queue firstly. In this way, even if there are many resources waiting for being loaded, it can also be ensured that the controller loads the user current browsing content firstly, thereby increasing a resource loading speed of the display apparatus, and ensuring a better experience for users.

As mentioned in above embodiments, the display apparatus 200 in embodiments of the disclosure has a controller 250. The controller 250 may control a browser (such as the above cobalt browser) on the display apparatus 200 to perform a series of resource loading operations, for example, may control the browser to obtain a network resource from a server 400, or control the browser to load a local resource from a local memory.

A UI on the display apparatus 200 may be regarded as a local webpage on the display apparatus, and the webpage may provide some contents for user's browsing, such as a recommended movie resource picture. A presented content on the UI is usually generated by obtaining corresponding resources, such as a JS file, an HTML file and a picture resource, through the browser on the display apparatus 200 and then utilizing these resources to generate the content.

Figure 28:
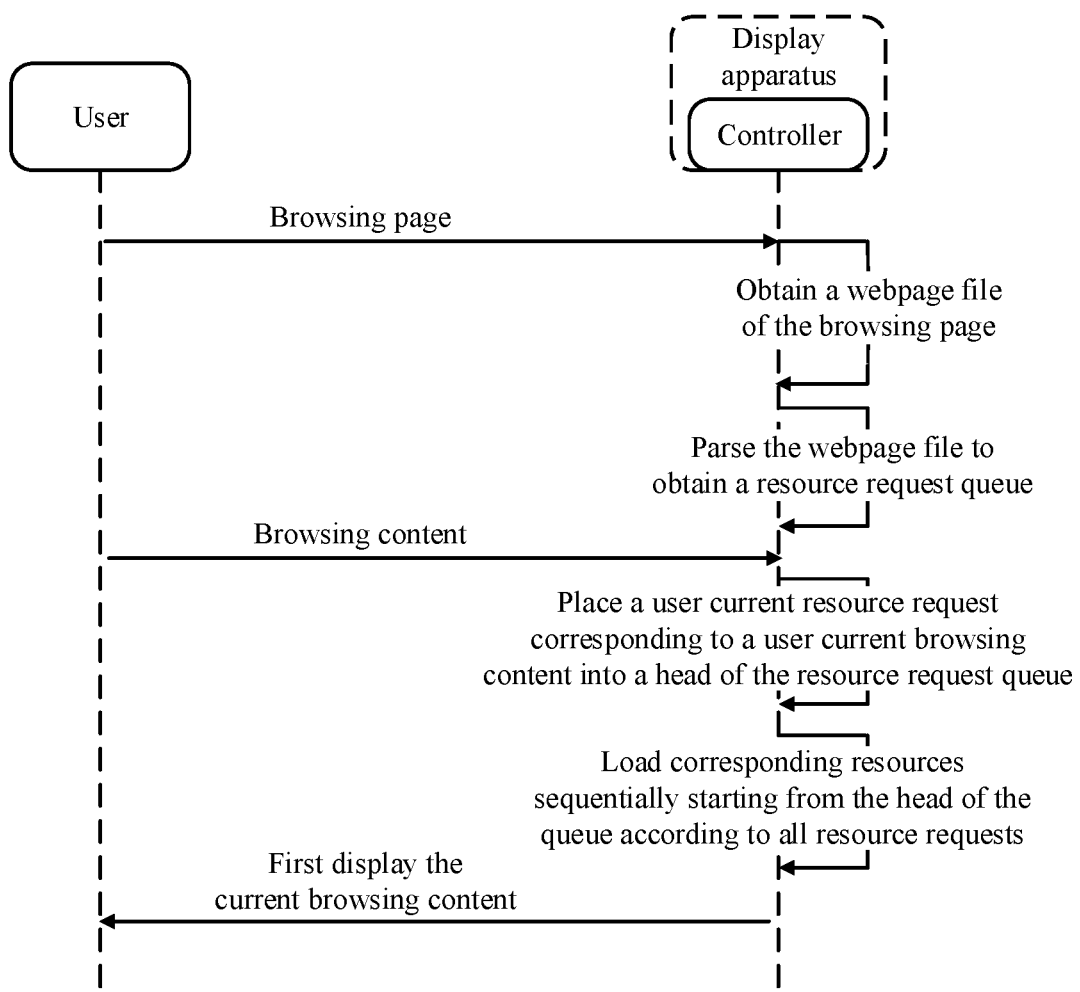
FIG. 28 is a seventh control flow diagram of a controller 250 according to some embodiments.

FIG. 28 is a seventh control flow diagram of the controller 250 according to some embodiments.

As shown in FIG. 28, when the user browses the content at the local webpage of the display apparatus 200, the controller 250 obtains a webpage file of a browsing page, and the browsing page may be a page in a certain application or a page for displaying different resources on the display apparatus 200. That is, the local webpage may be the page provided by a certain application in the display apparatus 200, or the page provided by the display apparatus 200.

The webpage file may contain a loading order of all the resources, and the loading order may be a display order of all contents on the local webpage from top to bottom, or a display order from left to right, and the like. Because the controller 250 needs to request the resource from the memory or the server 400, and the loading order of the resource may be understood as a resource request order.

The controller 250 parses the webpage file after obtaining the webpage file, to obtain a resource request queue corresponding to the webpage file, and the corresponding resource requests are sequentially arranged based on the resource loading order in the resource request queue.

In embodiments of the disclosure, the resource request queue may be a first in first out queue. That is, the resource request stored first is processed first. Generally, when the user normally browses the content, the controller 250 may sequentially process all the resource requests from the head of the queue according to an order of the resource request queue, and a resource request entering later is placed at a tail of the resource request queue and is waited to be processed. In embodiments of the disclosure, in order to ensure that the user current browsing content is quickly presented, as shown in FIG. 28, the controller 250 needs to place the current resource request corresponding to the user current browsing content into the head of the resource request queue. In this way, the controller 250 may first process the current resource request in the head of the queue, load the corresponding resources, and display the content currently required to be browsed by the user.

In embodiments of the disclosure, the controller 250 may detect a position of a focus frame on the local webpage, and takes a content selected by the focus frame as the content currently selected to be browsed by the user.

Or, in some embodiments, the controller 250 may detect a time that the focus frame stays at a certain area when the user moves the focus frame, and then determines the user current browsing content according to the staying time of the focus frame. For example, when the staying time of the focus frame is greater than or equal to a certain threshold, a selected content of the focus frame at the current position may be determined as the user current browsing content.

It can be known from the above that according to the display apparatus 200 in the embodiments of the disclosure, the controller 250 may obtain the resource request queue by parsing the webpage file corresponding to the user's browsing content; then, the controller 250 places the current resource request corresponding to the user current browsing content into the head of the resource request queue; and the controller 250 loads the corresponding resources starting from the head of the resource request queue sequentially according to all the resource requests. In this way, even if there are many resources waiting for being loaded, it can also be ensured that the controller 250 loads the user current browsing content firstly, thereby increasing a resource loading speed of the display apparatus 200, and ensuring a better browsing experience for the user.

Generally, some memory spaces are set in the display apparatus 200 to cache some resources corresponding to contents browsed by the user, and these resources cached in the local memory are called local resources. When the certain resource has been cached in the local memory of the display apparatus 200 and the resource needs to be loaded when the user browses the local webpage, the controller 250 may directly load from the local memory.

While in some case, some resources are not cached in the local memory, for example, resources required to be obtained when the user browses the certain content for the first time, or some real-time resources which only can be obtained from the server 400. As for the resources not cached in the local memory, the controller 250 needs to obtain and load from the server 400, and these resources obtained from the server 400 are called network resources.

It can be seen that in some embodiments, the controller 250 further needs to detect a type of the current resource request, and obtains the corresponding resources from the different positions according to different types and loads.

Figure 29:
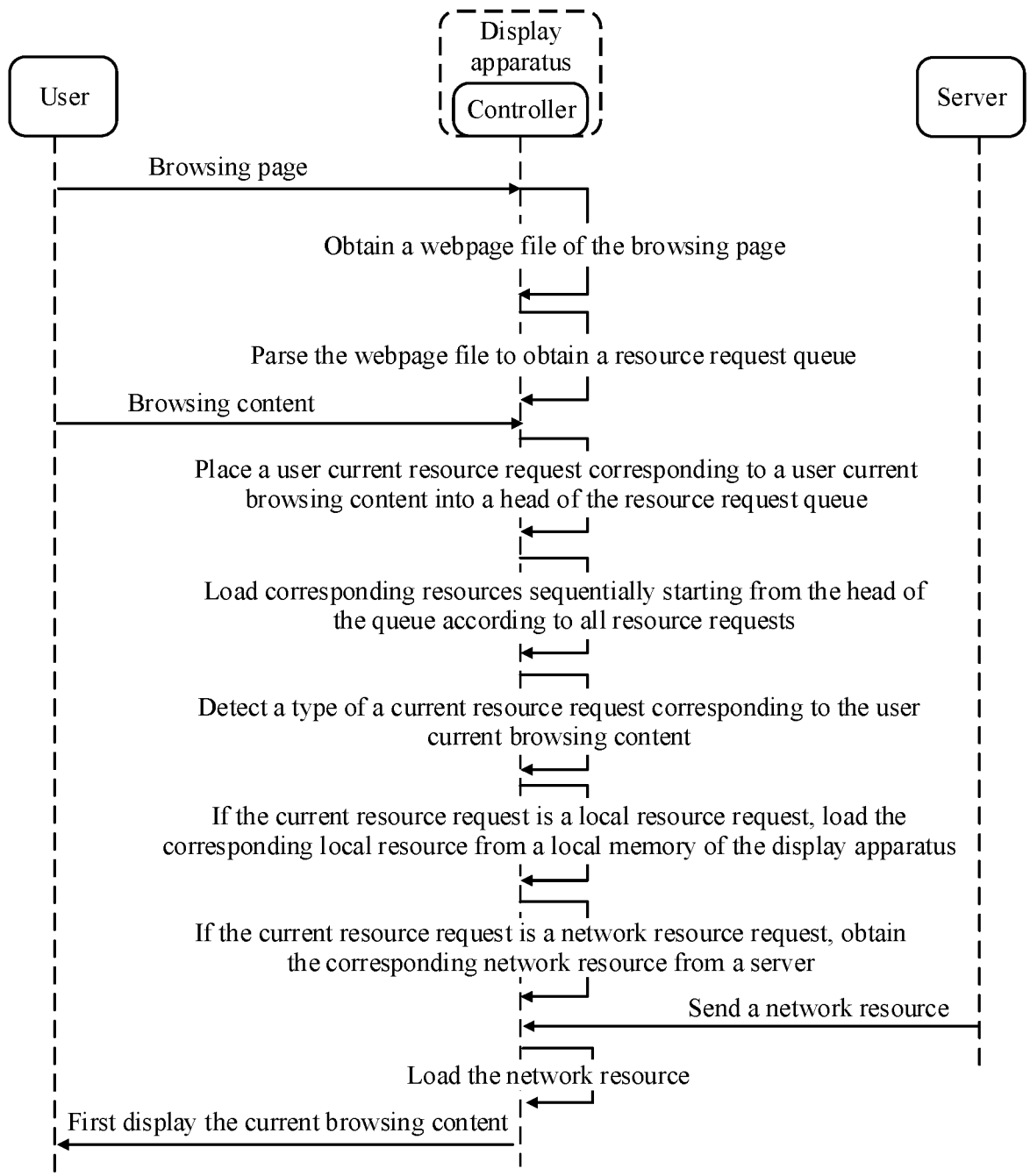
FIG. 29 is an eighth control flow diagram of a controller 250 according to some embodiments.

FIG. 29 is an eighth control flow diagram of the controller 250 according to some embodiments.

As shown in FIG. 29, in some embodiments, after obtaining the resource request queue, the controller 250 may continue to detect the type of the current resource request corresponding to the user current browsing content.

In a case that the current resource request is a local resource request, the controller 250 loads the corresponding local resource from the local memory of the display apparatus 200. In a case that the current resource request is a network resource request, the controller 250 obtains the corresponding network resource from the server 400 according to the network resource request and loads. Finally, no matter whether the loaded resource is the network resource, the controller 250 utilizes the resource to display the user current browsing content.

It should be noted that there are generally some loading modules, network modules and the like in the browser. The controller 250 may further implement operations such as resource loading and network connection by these modules. For example, the controller 250 controls the network module to establish connection with the server 400, controls the network module to send the network resource request to the server 400, and controls the network module to receive the network resource returned from the server 400. Or the controller 250 controls the loading module to sequentially process the resource requests in the resource request queue, and load the corresponding local resource or network resource.

In embodiments of the disclosure, an execution process of the controller 250 may be described by taking a picture resource as an example.

Figure 30:
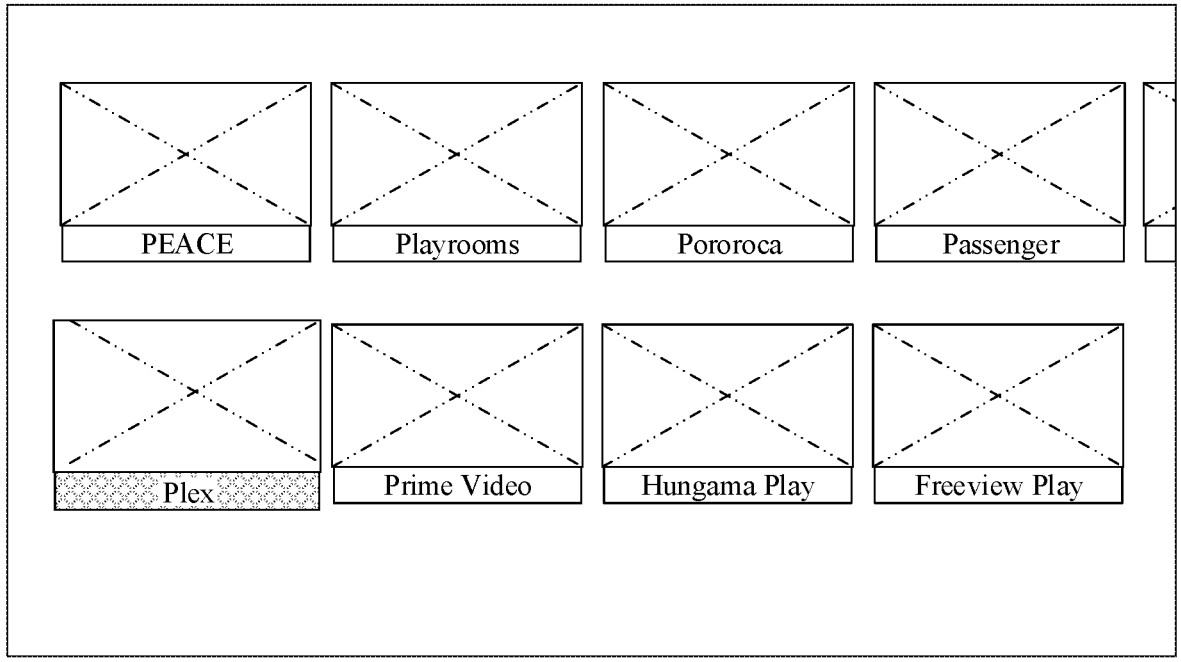
FIG. 30 is a schematic display diagram of a picture resource in an application A according to some embodiments.
Figure 31:
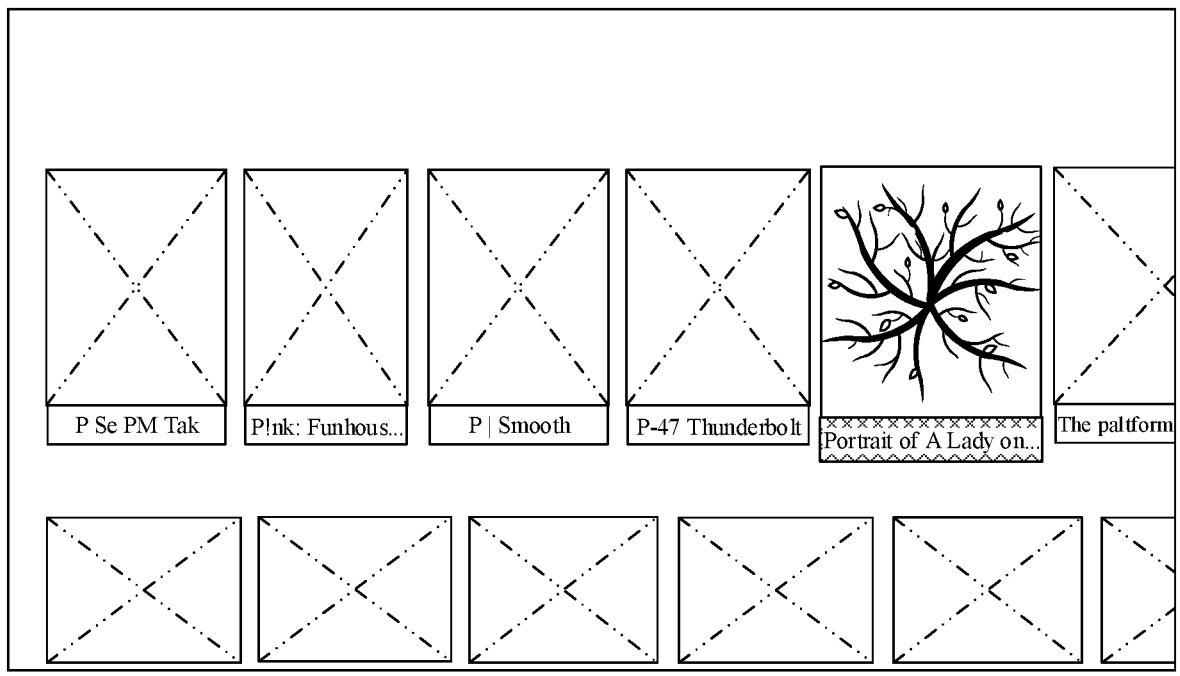
FIG. 31 is a schematic display diagram of a picture resource in an application B according to some embodiments.

FIG. 30 is a schematic display diagram of a picture resource in an application A according to some embodiments. FIG. 31 is a schematic display diagram of a picture resource in an application B according to some embodiments.

The application A displays presentation information of all movie and television programs in a picture form, such as a poster or a plot screenshot. When the user launches the application A, a picture on a page of the application A may be not completely presented, and needs a certain time for loading, and then a display page of the application A seen by the user at the very beginning is as shown in FIG. 30. At this time, there are dot-and-dash reticles at all the picture resources, and all the picture resources are in a state of waiting for loading. But when the user launches the application A, the application A sends the picture resource request to the controller 250 one after another, the controller 250 may parse the resource request order of all the picture resources on an interface of the application A from a webpage file corresponding to the application A, to form the resource request queue. The controller 250 may sequentially process all the resource requests starting from the head of the resource request queue and then display the corresponding picture resources on the interface of the application A. If the user launches the application B after quickly browsing the application A and not waiting for all pictures in the application A being loaded, at this time, all the picture resource requests corresponding to the application A still wait for being processed in the resource request queue, and the picture resource requests of the application B are also added into the resource request in sequence. The controller 250 continuously detects a picture area that the user currently browses in a process that the user browses the application A or the application B. As shown in FIG. 31, if the user selects to browse a content of a fifth picture area in the application B, the controller 250 places a resource request for requesting the fifth picture into the head of the resource request queue, then prioritizing the resource request at the head of the queue for processing, obtains the corresponding picture resource from the server 400 and loads to the fifth picture area on the page of the application B, and the presented content is as shown in FIG. 31.

When the controller 250 processes the resource request at the head of the queue, other resource requests in the resource request queue are delayed for being processed, and are in a waiting state currently.

Figure 32:
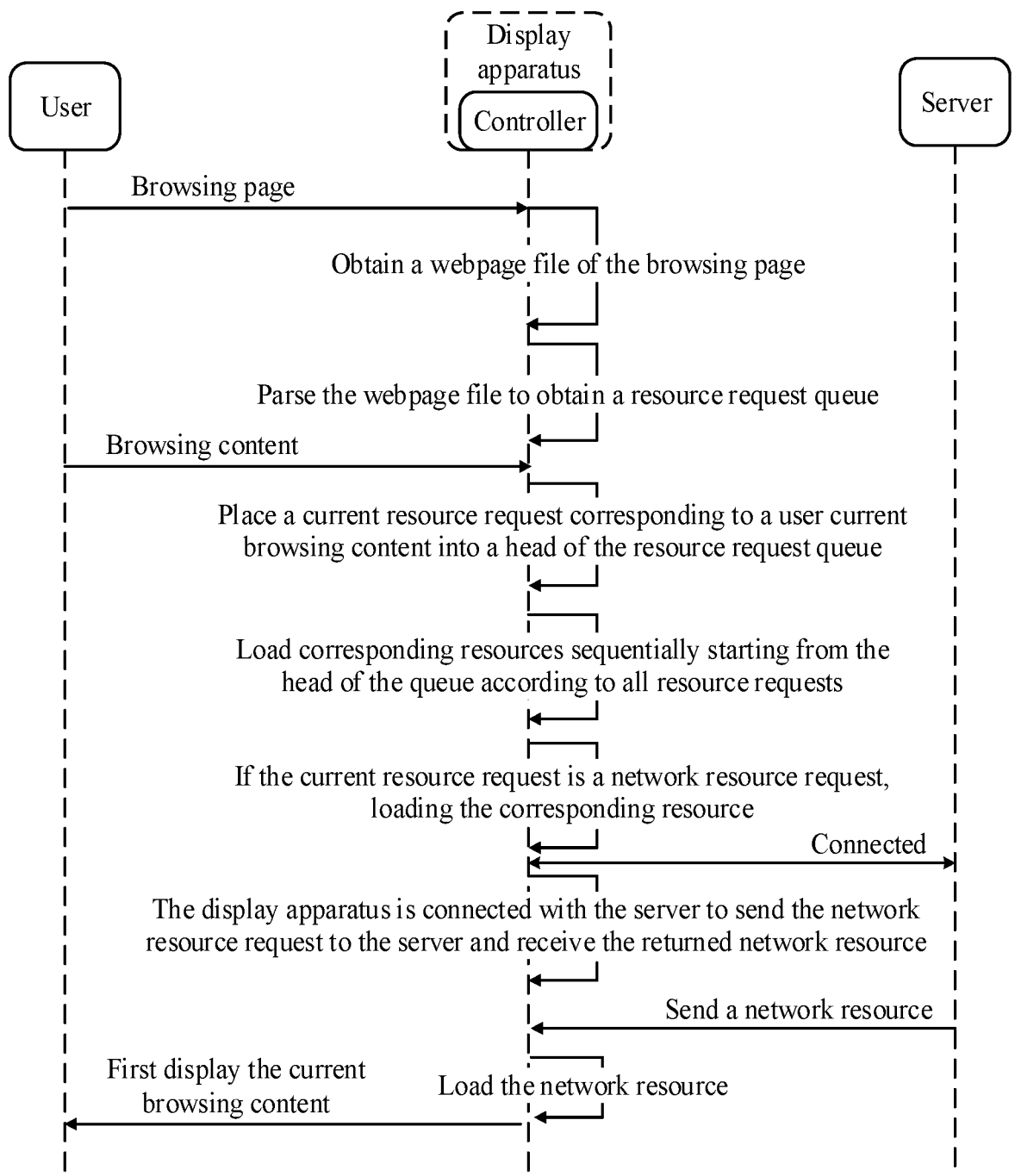
FIG. 32 is a ninth control flow diagram of a controller 250 according to some embodiments.

FIG. 32 is a ninth control flow diagram of the controller 250 according to some embodiments.

As shown in FIG. 32, in some embodiments, in a case that the controller 250 detects that the current resource request corresponding to the user current browsing content is the network resource request, whether the display apparatus 200 is connected with the server further needs to be detected, this is because the network resource needs to be obtained from the server 400, and a premise of communicating with the server 400 is that the connection is established between the display apparatus 200 and the server 400.

Moreover, the controller 250 sends the network resource request to the server 400 in a case that the display apparatus 200 is connected with the server 400; and then receives the corresponding network resource from the server 400 and obtained according to the network resource request. Finally, the controller 250 utilizes the network resource to display the user current browsing content.

It can be known from the above that according to the display apparatus 200 in embodiments of the disclosure, the controller 250 may control an operation of resource loading of the browser. When the user browses the content on the display apparatus 200, the page providing the content sends the resource request to the browser, and the browser sequentially loads the resources according to the resource request and displays the resources on the page. Because the controller 250 may control the load operation of the browser, the controller 250 may receive the resource request and load the resource according to the resource request. Moreover, the current resource request corresponding to the user current browsing content is placed to the head of the resource request queue, to be first processed by the controller 250. In this way, even if there are many resources waiting for being loaded, it can also be ensured that the controller 250 loads the user current browsing content firstly, thereby increasing the resource loading speed for the display apparatus, and ensuring better view experience for the user.

In addition, in some cases, if the user browses too fast, even if the browsed contents are not needed to be watched by the user, the corresponding resource requests are also waited in the resource request queue, thereby causing a case that the resources corresponding to the content currently required to be browsed by the user cannot be loaded immediately and can only wait. No matter whether the resource request corresponding to the user current browsing content is the network resource request, the controller 250 in embodiments of the disclosure may place the resource request at the head of the resource request queue to be prioritized, thus the user current browsing content is also loaded first, and the user does not need to waste too much time to wait for the resources be loaded.

Figure 33:
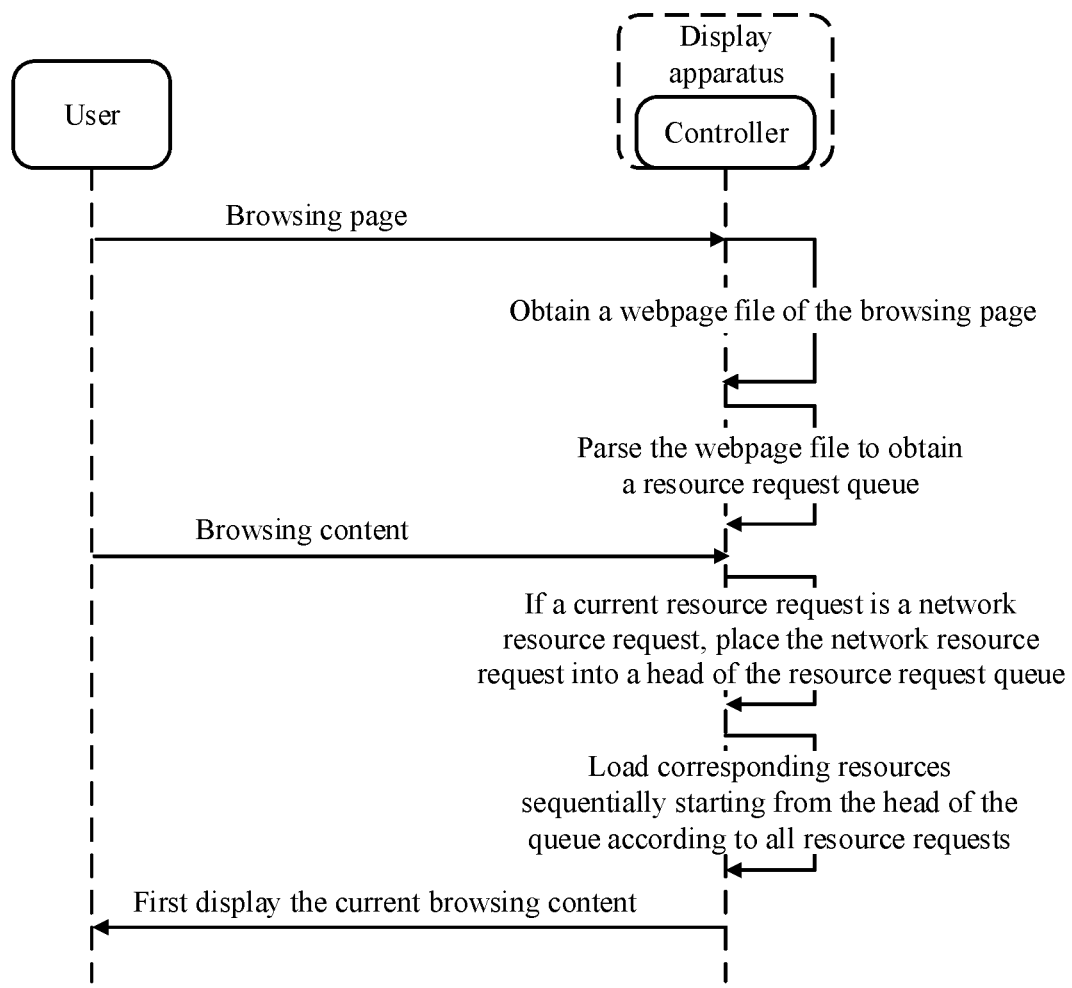
FIG. 33 is a tenth control flow diagram of a controller 250 according to some embodiments.

FIG. 33 is a tenth control flow diagram of the controller 250 according to some embodiments.

As mentioned in the above embodiments, the network resource needs to be obtained by the controller 250 from the server 400 through the network connection, while the local resource needs to be directly obtained by the controller 250 from the local memory. Compared with the network resource, the local resource is obtained more quickly. When the content being browsed by the user can be presented only by requesting the network resource, if the network resource request is in the back part of the resource request queue, then the network resource needs to be loaded after waiting the front resource request to be processed, and before loading the network resource, the controller 250 further needs to establish a communication connection with the server 400 to mutually communicate and the like, therefore, the time that the controller 250 processes the network resource request is long. In a similar way, the time for the controller 250 to obtain the network resource is also long.

Based on this, an embodiment of the disclosure further provides another display apparatus 200. A shown in FIG. 33, a controller 250 may firstly parse a webpage file corresponding to the user browsing content to obtain a resource request queue; and if it is detected that a current resource request corresponding to the user current browsing content is a network resource request, the network resource request is placed at a head of the resource request queue to be prioritized by the controller 250. In this way, the network resource corresponding to the user current browsing content is not delayed to be processed, the current browsing content can also be presented immediately, and a user does not need to waste too much time to wait for loading. Because an obtaining speed of a local resource is high, loading may still be performed according to an order in the resource request queue.

Still taking a picture resource as an example, if the user launches an application B after quickly browsing an application A and not waiting for all pictures in the application A being loaded, at this time, all picture resource requests corresponding to the application A still wait for being processed in the resource request queue, and picture resource requests of the application B are also added into the resource request queue in sequence. If the user selects a content of a third picture area in the application B and the controller 250 detects that a resource request corresponding to the picture area is a network resource request, the controller 250 places the network resource request into the head of the resource request queue, and then first processes the network resource request at the head of the queue. After the network resource request is processed, the controller 250 continues to sequentially process all the resource requests according to an original order in the resource request queue.

It should be noted that when the controller 250 processes the network resource request at the head of the current queue, if the user selects to browse a new picture area again and a resource request corresponding to the new picture area is also the network resource request, the controller 250 may still store the new network resource request into the head of the current resource request queue. At this time, the current network resource request being processed by the controller 250 may be regarded as transferred from the resource request queue into another processing queue, therefore, the current network resource being processed and the newly-stored network resource request do not affect each other, and are both located at the position of the head of each queue when being stored in the corresponding resource request queue.

In some embodiments, in a case that the controller 250 detects that the current resource request corresponding to the user current browsing content is a network resource request, whether the display apparatus 200 is connected with the server is detected, this is because the network resource needs to be obtained from the server 400, and a premise of communicating with the server 400 is that the connection is established between the display apparatus 200 and the server 400.

Moreover, the controller 250 sends the network resource request to the server 400 in a case that the display apparatus 200 is connected with the server 400; and then receives the corresponding network resource returned from the server 400 and obtained according to the network resource request. Finally, the controller 250 utilizes the network resource to display the user current browsing content.

The difference of this display apparatus 200 in embodiments of the disclosure and the previous display apparatus 200 lies in that the controller 250 of this display apparatus 200 only needs to place the network resource request into the head of the resource request queue in a case that the current resource quest is the network resource request. In this way, a loading speed of the network resource can be increased. Other contents related to this display apparatus 200 are the same as the contents of embodiments of the previous display apparatus 200, which is not repeated here.

According to another display apparatus 200 in embodiments of the disclosure, a controller 250 may place a network resource request at a head of a resource request queue to be prioritized by a controller 250 in a case that a resource request corresponding to a user current browsing content is a network resource request. In this way, it may be ensured that the controller loads the user current browsing content firstly, thereby increasing a network resource loading speed of the display apparatus 200, and ensuring a better experience for the user.

Figure 34:
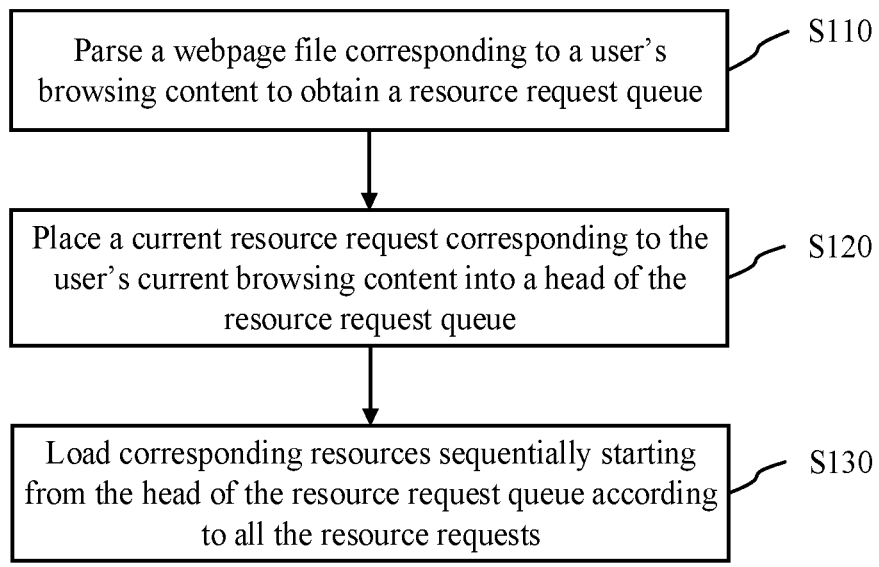
FIG. 34 is a flow diagram of a method for loading a resource on a display apparatus according to some embodiments.

FIG. 34 is a flow diagram of a method for loading a resource on a display apparatus according to some embodiments.

The method for loading a resource on the display apparatus in embodiments of the disclosure may be applied to the controller 250 of the display apparatus 200 in the above embodiments. As shown in FIG. 34, the method may include following steps.

Step S110, a webpage file corresponding to a user's browsing content is parsed to obtain a resource request queue.

Resource requests in the resource request queue are used for obtaining resources for webpage content displaying.

Step S120, a current resource request corresponding to the user's current browsing content is placed into a head of the resource request queue.

Step S130, corresponding resources are loaded sequentially starting from the head of the resource request queue according to all the resource requests.

In some embodiments, the method further includes: detecting a type of the current resource request corresponding to the user's current browsing content; in response to the current resource request being a network resource request, sending the network resource request to a server 400; receiving a network resource returned from the server 400 and obtained according to the network resource request; and loading the network resource.

In some embodiments, the method further includes: in response to the current resource request being the network resource request, detecting whether the display apparatus 200 is connected with the server 400; and in response to the display apparatus 200 being connected with the server 400, sending the network resource request to the server 400.

In some embodiments, the method further includes: in response to the current resource request being a local resource request, loading a corresponding local resource from a local memory of the display apparatus 200.

Figure 35:
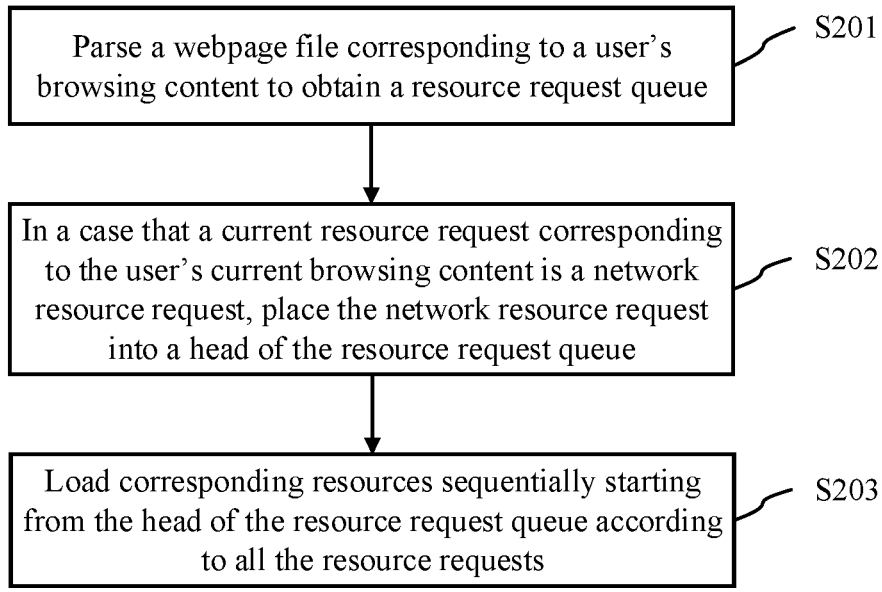
FIG. 35 is a flow diagram of another method for loading a resource on a display apparatus according to some embodiments.

FIG. 35 is a flow diagram of a method for loading a resource on another display apparatus according to some embodiments.

The method for loading a resource on the display apparatus in embodiments of the disclosure may also be applied to the controller 250 of the display apparatus 200 in the above embodiments. As shown in FIG. 35, the method may include following steps.

Step S201, parsing a webpage file corresponding to a user's browsing content to obtain a resource request queue.

All resource requests in the resource request queue respectively obtain all resources for webpage content displaying.

Step S202, in response to a current resource request corresponding to a user's current browsing content being a network resource request, placing the network resource request into a head of the resource request queue.

Step S203, loading corresponding resources sequentially starting from the head of the resource request queue according to all the resource requests.

In some embodiments, the method further includes: in response to the current resource request being a network resource request, sending the network resource request to a server 400; receiving a network resource obtained according to the network resource request from a server; and loading the network resource.

In some embodiments, the method further includes: in response to the current resource request being the network resource request, detecting whether the display apparatus 200 is connected with the server 400; and in response to the display apparatus 200 being connected with the server 400, sending the network resource request to the server 400.

Because the method for loading a resource on the display apparatus in embodiments of the disclosure may be applied to the controller 250 in the above embodiments, other contents related to the method for loading a resource on the display apparatus in embodiments of the disclosure may refer to the above embodiments, which are not repeated here.

A browser is a conventional application supported by a system of a display apparatus, and many display apparatuses preset a browser application in the system. Due to a screen size of the display apparatus, the experience of utilizing the browser on the display apparatus for browsing is better than that of a portable device such as a mobile phone or a notebook computer. For example, the browsing experience may embody in the aspects that a user reads a text, watches a picture or plays a video on the display apparatus. However, operation on the display apparatus by using the browser is not as convenient as portable devices. Different from a touch screen operation for the mobile phone and a mouse operation for the computer, when the browser on the display apparatus is utilized to browse a page, operation and control are generally performed through direction keys on a control device.

In embodiments of the disclosure, the browser on the display apparatus includes a work mode and a virtual mouse mode. In order to keep operation consistence of the browser on the display apparatus and a browser on the portable device, the work mode is generally switched into the virtual mouse mode when browsing a conventional page. In the virtual mouse mode, a mouse similar to the browser of the computer appears on a display, and is called a virtual mouse herein. A user may control moving of the virtual mouse on the display through the direction keys on the control device, and achieves a clicking function through a confirm key or other shortcut keys.

Figure 36:
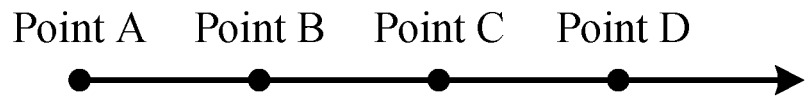
FIG. 36 is a schematic diagram for moving a virtual mouse according to some embodiments.

The function requirement of the control device determines that it cannot report a key event frequently, to avoid misrecognition of continuous key pressing event and the like. There is generally an interval time of about 100 ms between two key events, thereby leading to that the key event can only be reported once every 100 ms in a process of long pressing the direction key, the corresponding virtual mouse moves in a hop mode on the display, causing poor experience for the user. In addition, when the virtual mouse moves in the hop mode on the display, it is difficult for the user to judge an occasion of loosening the direction key conveniently, and thus a plurality of repeated adjustments is required to position the virtual mouse to a target position, thereby wasting user's time. For example, as shown in FIG. 36, in the related art, when the user long presses a right direction key, the virtual mouse moves from a point A to a point B, from the point B to a point C, and from the point C to a point D in a hop mode. In this process, when the user hopes the virtual mouse to stop at the point C, the user needs to seize a moment that the virtual mouse skips to the point C at this time. However, because the virtual mouse moves in the hop mode, a moment that the user selects to loosen the key is difficult to seize, therefore a plurality of adjustments are required.

Figure 37:
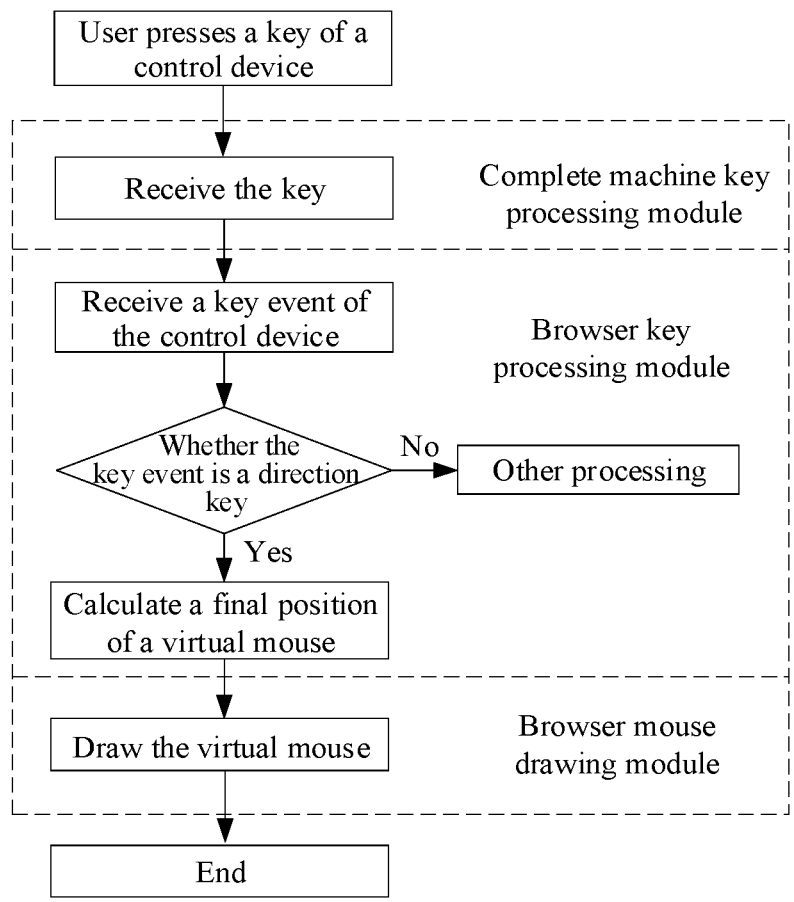
FIG. 37 is a flow diagram of a method for moving a virtual mouse in a related art according to some embodiments.

In the related art, a moving function of the virtual mouse in the browser on the display apparatus needs to be jointly achieved by a browser key processing module and a browser mouse drawing module. As shown in FIG. 37, the browser key processing module works with a key processing module, and configured to receive the key event, and determine whether the key event corresponds to the direction key according to the key event, and corresponding processing is performed if the key event does not correspond to the direction key; and if the key event corresponds to the direction key, a final position of the virtual mouse is calculated and sent to the browser mouse drawing module. The browser mouse drawing module draws the virtual mouse according to the final position. It can be seen in FIG. 37 that, if each key event corresponds to the direction key, the browser key processing module converts the key event into one-time move of the virtual mouse. It should be noted that the number of times and a time interval of the mouse move are consistent with the number of times and a time interval of the key event report.

In order to intuitively sense a move distance and frequency of the virtual mouse, a scenario is preset here: a size of the display apparatus is 65 inch, namely, a width of the display apparatus is about 144 cm, an report interval of the key when the control device is long pressed is 100 ms, and the user hopes to moves the virtual mouse from a left side to a right side of the display within 3 s. According to the scheme in the related art, the total number of move times of the virtual mouse is 30, a single move distance is 4.8 cm, and the time interval of two adjacent moving is 100 ms. Because the single move distance and the time interval of two adjacent moving are both large, the virtual mouse is in a continuous hop state on a screen.

Figure 38:
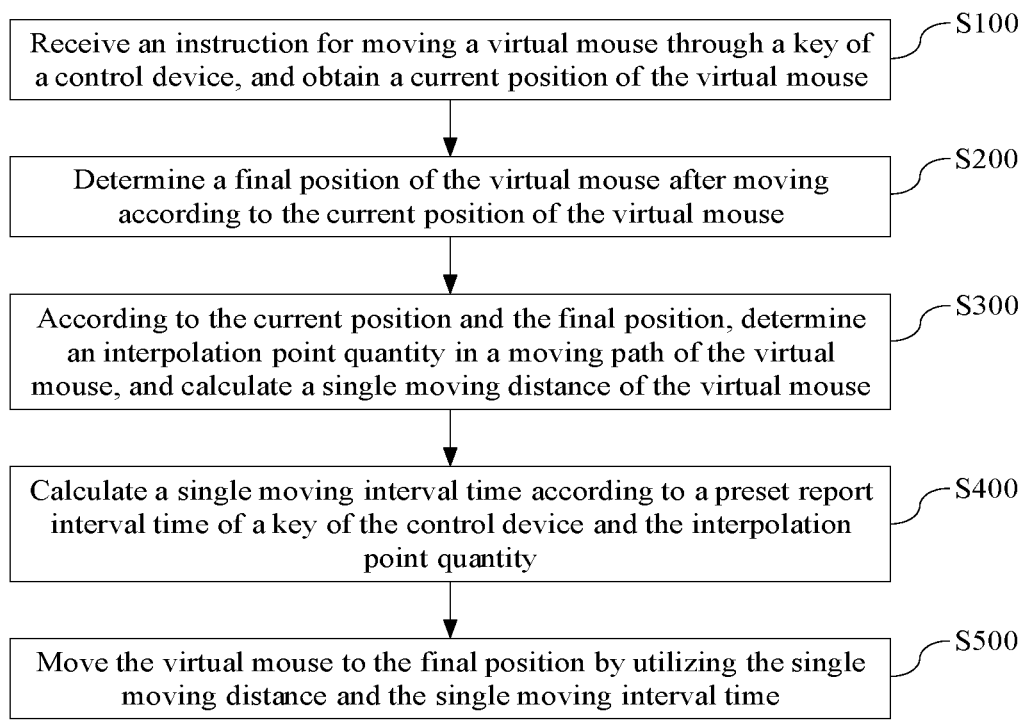
FIG. 38 is a flow diagram of a method for moving a virtual mouse according to some embodiments.

In order to avoid the above problem, an embodiment of the disclosure provides a method for moving a virtual mouse. As shown in FIG. 38, the method includes following steps.

S100, receiving an instruction for moving a virtual mouse through a key of a control device, obtaining a current position of the virtual mouse.

In embodiments of the disclosure, the user presses the key on the control device to move the virtual mouse. In some embodiments, a browser key processing module works together with a key processing module, and configured to receive a key event, and determine whether the key event is from a direction key according to the key event, and corresponding processing is performed if the key event is not from the direction key. For example, other keys may be a confirm key, and at this time, processing is performed according to a content corresponding to the confirm key. If the key event is the direction key, a current position of the virtual mouse is obtained.

It should be noted that when the user long presses the key on the control device and reports one-time key event at an interval of a preset report interval time, embodiments of the disclosure is directed to a method for moving a virtual mouse after the one-time key event occurs. In addition, when the user short presses the key on the control device, the key event is only reported for one time, and at this time, embodiments of the disclosure moves the virtual mouse for the key event.

In embodiments of the disclosure, the current position may be indicated in a coordinate form. For example, taking a bottom left corner of the display as an original point, the current position of the virtual mouse may be (100 px, 100 px).

In some embodiments, S200, a final position of the virtual mouse after moving is determined according to the current position of the virtual mouse. In embodiments of the disclosure, the final position is a position where the virtual mouse is located after the key event is reported for one time. In some embodiment, the virtual mouse moves to a corresponding direction by 100 px after the key event is reported for one time. For example, the key pressed by the user is a right key, the current position (x1, y1) of the virtual mouse is (100 px, 100 px), and after calculation, the final position (x2, y2) of the virtual mouse after moving is (200 px, 100 px).

Figure 39:
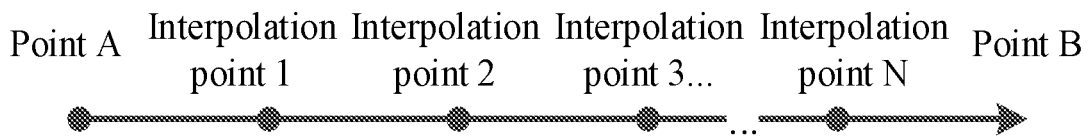
FIG. 39 is a schematic diagram of a point A, a point B and an interpolation point according to some embodiments.

S300, according to the current position and the final position, an interpolation point quantity in a moving path of the virtual mouse is determined, and a single moving distance of the virtual mouse is calculated. In embodiments of the disclosure, the moving path of the virtual mouse takes the current position as a starting point, and takes the final position as an end point. A path from the current position to the final position is divided into a plurality of segments by utilizing interpolation points, so that the virtual mouse passes through the above interpolation points one by one when moving from the current position to the final position. In this way, the virtual mouse does not move from the current position to the final position in a hop mode, but reaches the final position after passing through the interpolation points. In this way, when the user watches the virtual mouse through the display, a user experience is improved, the virtual mouse smoothly moves from the current position to the final position at a short distance rather than long-distance hop move. Because the virtual mouse does not move to the final position in the hop mode, the user can intuitively distinguish the position where the virtual mouse is located. When the direction key is long pressed, the user can seize the moment of loosening the key, thereby improving an accuracy of moving the virtual mouse to a target position. For example, as shown in FIG. 39, the plurality of interpolation points may be uniformly disposed between the current position point A and the final position point B.

In some embodiments, the step of determining the interpolation point quantity in the moving path of the virtual mouse according to the current position and the final position includes following steps.

The current position and the final position are respectively determined through an abscissa and an ordinate. The current position includes a first abscissa x1 and a first ordinate y1, and the final position includes a second abscissa x2 and a second ordinate y2. For example, the current position is (100 px, 100 px), the final position is (200 px, 100 px), where the first abscissa is 100 px, the first ordinate is 100 px, the second abscissa is 200 px, and the second ordinate is 100 px.

A transverse moving distance is determined according to the first abscissa and the second abscissa. In some embodiments, the second abscissa x2 minus the first abscissa x1 is the transverse moving distance. For example, the first abscissa is 100 px, the second abscissa is 200 px, and the transverse moving distance=200 px−100 px=100 px.

A longitudinal moving distance is determined according to the first ordinate and the second ordinate. In some embodiments, the second ordinate y2 minus the first ordinate y1 is the longitudinal moving distance. For example, the first ordinate is 100 px, the second ordinate is 100 px, and the longitudinal moving distance=100 px−100 px=0.

A quantity of interpolation points is determined according to the transverse moving distance, the longitudinal moving distance and a preset moving reference value. In embodiments of the disclosure, the preset moving reference value is a distance between the interpolation points. For example, the preset moving reference value may be 20 px.

In some embodiments, the step of determining the quantity of interpolation points according to the transverse moving distance, the longitudinal moving distance and the preset moving reference value, includes following steps.

The transverse moving distance (x2-x1) is divided by the preset moving reference value DIS and then minus 1 to obtain a transverse interpolation point quantity Dx. For example, the transverse moving distance is 100 px, the preset moving reference value is 20 px, and the transverse interpolation point quantity=100/20−1=4.

The longitudinal moving distance (y2-y1) is divided by the preset moving reference value DIS and then minus 1 to obtain a longitudinal interpolation point quantity Dy. For example, the longitudinal moving distance is 0 px, the preset moving reference value is 20 px, and the longitudinal interpolation point quantity=0/20−1=−1.

A magnitude of the transverse interpolation point quantity and a magnitude of the longitudinal interpolation point quantity are compared, and the transverse interpolation point quantity or the longitudinal interpolation point quantity with a large numerical value serves as the to-be-determined interpolation point quantity max (Dx, Dy). For example, the transverse interpolation point quantity is 4, and the longitudinal interpolation point quantity is −1. After the transverse interpolation point quantity and the longitudinal interpolation point quantity are compared, the transverse interpolation point quantity 4 serves as the to-be-determined interpolation point quantity.

The interpolation point quantity D in the moving path of the virtual mouse is determined according to the interpolation point quantity and a preset interpolation point quantity threshold range. In embodiments of the disclosure, in order to avoid a problem caused by too large or too small of the interpolation point quantity, the preset interpolation point quantity threshold range is set. For example, the preset interpolation point quantity threshold range is 2 to 8. When the interpolation point quantity is too small, the problem of hop move cannot be solved. When the interpolation point quantity is too large, constant jump of the virtual mouse in a unit time also affects the user's determination of the virtual mouse position, and a pressure is brought to the display apparatus. Therefore, when the interpolation point quantity is within the preset interpolation point quantity threshold range, the interpolation point quantity is determined as the interpolation point quantity in the moving path of the virtual mouse. For example, the preset interpolation point quantity threshold range is 2 to 8, the interpolation point quantity is 4, in this case, it is determined that the interpolation point quantity in the moving path of the virtual mouse is 4.

In some other embodiments, if the interpolation point quantity is not within the preset interpolation point quantity threshold range, it is determined that the quantity, nearest to the interpolation point quantity, within the preset interpolation point quantity threshold range is the interpolation point quantity in the moving path of the virtual mouse. For example, when the interpolation point quantity is 1, the preset interpolation point quantity threshold range is 2 to 8, the interpolation point quantity is not within the preset interpolation point quantity threshold range, and thus within the interpolation point quantity threshold range, the quantity closet to the interpolation point quantity is the interpolation point quantity in the moving path of the virtual mouse. That is, it is determined that the interpolation point quantity in the moving path of the virtual mouse is 2.

In some embodiments, the step of calculating the single moving distance of the virtual mouse includes: the single moving distance includes a transverse single moving distance and a longitudinal single moving distance; the transverse moving distance (x2-x1) is divided by the number of moving times to obtain the transverse single moving distance Sx; and the longitudinal moving distance (y2-y1) is divided by the number of moving times to obtain the longitudinal single moving distance Sy, where the number of moving times is the interpolation point quantity D plus one. For example, the transverse moving distance is 100 px, the longitudinal moving distance is 0 px, the interpolation point quantity is 4, thus the number of moving times=4+1=5, the transverse single moving distance is 100/5=20 px, and the longitudinal single moving distance is 0/5=0 px.

In some embodiments, S400, a single moving interval time is calculated according to a preset report interval time of a key on the control device and the interpolation point quantity. In embodiments of the disclosure, the preset report interval time Tp may be 100 ms. When the interpolation point quantity is 4, the single moving interval time T may be Tp/(D+1)=100/(4+1)=20 ms.

S500, the virtual mouse is moved to the final position by utilizing the single moving distance and the single moving interval time. According to embodiments of the disclosure, the virtual mouse is moved once at an interval of the single moving interval time, and a distance that the virtual mouse moves each time is the single moving distance. For example, the single moving interval time is 20 ms, the transverse single moving distance is 20 px, the longitudinal single moving distance is 0 px, and thus the virtual mouse transversely moves by 20 px and longitudinally moves by 0 px every 20 ms.

In some embodiments, the step of moving the virtual mouse to the final position by utilizing the single moving distance and the single moving interval time includes following steps.

A timer with an interval being the single moving interval time is started, the timer is triggered, and the number of triggering times is recorded. At this time, the number of triggering times is 1. In embodiments of the disclosure, a time interval between two times of moving of the virtual mouse is the single moving interval time, for example, may be 20 ms. The timer may be triggered at an interval of the single moving interval time to perform the next step. For example, the timer may be triggered every 20 ms.

A target point position is calculated according to the current position and the single moving distance. For example, the current position is (100 px, 100 px), the transverse single moving distance is 20 px, the longitudinal single moving distance is 0 px, and at this time, the target point position is (100 px+20 px, 100 px).

The virtual mouse is moved to the target point position; if the number of triggering times is smaller than the interpolation point quantity plus one, then when the timer is triggered, the number of triggering times plus one, the target point position is determined as the current position, and the step of calculating the target point position according to the current position and the single moving distance is repeatedly executed until the number of triggering times is equal to the interpolation point quantity plus one.

In embodiments of the disclosure, the number of moving times of the virtual mouse moving to the final position is the interpolation point quantity plus one. For example, the interpolation point quantity is 4, and the number of moving times is 5. When the number of triggering times is smaller than the number of moving times, it means that the virtual mouse does not move to the final position, at this time, the timer is waiting for being triggered again. At the same time that the number of triggering times is increased by 1, the target point position is determined as the current position, and the step of calculating the target point position according to the current position and the single moving distance is repeatedly executed. If the number of triggering times is smaller than the interpolation point quantity plus one, the above step is repeated. If the number of triggering times is equal to the interpolation point quantity plus one, it means that the virtual mouse has moved to the final position, at this time, the above step is not repeated. According to embodiments of the disclosure, whether the virtual mouse has reached the final position is determined by comparing the number of triggering times with the number of moving times.

In some other embodiments, whether the virtual mouse has reached the final position may be determined by directly determining whether the target point position is the final position. The step of moving the virtual mouse to the final position by utilizing the single moving distance and the single moving interval time includes following steps.

A timer with an interval being the single moving interval time is started, and the timer is triggered.

A target point position is calculated according to the current position and the single moving distance.

The virtual mouse is moved to the target point position; if the target point position is not the final position, then when the timer is triggered, the target point position is determined as the current position, and the step of calculating the target point position according to the current position and the single moving distance is repeatedly executed until the target point position is the final position.

In some other embodiments, whether the virtual mouse reaches the final position may further be determined through the number of triggering times.

A timer with an interval being the single moving interval time T is started, the timer is triggered, and the number of triggering times N is recorded.

A target point position is calculated according to the current position, the single moving distance, and the number of triggering times. For example, the current position is (100 px, 100 px), the transverse single moving distance is 20 px, the longitudinal single moving distance is 0 px, the number of triggering times is 1, and thus the target point position is $(x1+sx*N, y1+sy*N)=(100+1*20, 100+1*0)$; and when the number of triggering times is 2, the target point position is $(x1+sx*N, y1+sy*N)=(100+2*20, 100+2*0)$.

The virtual mouse is moved to the target point position; if the number of triggering times is smaller than the interpolation point quantity plus one, then when the timer is triggered, the number of triggering times plus one, and the step of calculating the target point position according to the current position, the single moving distance and the number of triggering times is repeatedly executed until the target point position is the final position. For example, when the number of triggering times is 1, the number of triggering times increased by one, that is, the number of triggering times is changed into 2. If the number of triggering times is 2, the step of calculating the target point position according to the current position, the single moving distance and the number of triggering times is repeatedly executed.

Embodiments of the disclosure provide a method for moving a virtual mouse. When a browser works at a virtual mouse mode and receives a key event, one-time key input is converted into continuous multiple-time short-interval and short-distance virtual mouse moving according to a key report time interval and a moving distance of this time, and hopping of the position of the virtual mouse caused by the excessively long key report interval is avoided. In order not to affect the moving speed of the virtual mouse, the moving process looks more continuous, so that the user determines intuitively the moment of loosening the key more easily, thereby optimizing an operation experience for the user.

The preset scenario mentioned above is listed one more time: a size of the display is 65 inch (a width of the display is about 144 cm), an report interval of the key when the control device is long pressed is 100 ms, and the user hopes to moves the virtual mouse from a left side to a right side of the display within 3 s. According to the method in embodiments of the disclosure, if each key pressing is converted into five-time mouse moving, the total number of moving times is 150, a single moving distance is 0.96 cm, and the time interval of two adjacent moving is 20 ms. Compared with the related art, a hopping moving amplitude and the moving time interval of the virtual mouse are both substantially reduced (4.8 cm→0.96 cm, 100 ms→20 ms), and a moving smoothness is improved greatly. If more intermediate points are inserted, the number of moving times of the mouse is more, the time interval is shorter, and the smoothness is further improved.

In the above embodiments, according to the virtual mouse moving method and the display apparatus, in order not to affect the moving speed of the virtual mouse in embodiments of the disclosure, the moving process looks more continuous, so that the user determines intuitively the moment of loosening the key more easily, thereby improving user's experience. The method includes: an instruction for moving a virtual mouse through a key of a control device is received, and a current position of the virtual mouse is obtained; a final position of the virtual mouse after moving is determined according to the current position of the virtual mouse; according to the current position and the final position, an interpolation point quantity in a moving path of the virtual mouse is determined, and a single moving distance of the virtual mouse is calculated; a single moving interval time of the virtual mouse is calculated according to a preset report interval time of the key on the control device and the interpolation point quantity; and the virtual mouse is moved to the final position by utilizing the single moving distance and the single moving interval time.

The display apparatus 200 generally utilizes a browser to run a local webpage of a system UI application, and a plurality of UI applications at a frontend may be run on the same browser. Picture resources show the most on the UI application. The browser also needs to provide a certain picture cache space for the UI application when running the UI application, and a part of picture resources of the UI application is stored in the picture cache space. When the user browses the corresponding picture resource again, the browser may directly load from the picture cache space, which allows a user to save time for waiting picture loading.

A basic flow that the browser loads a picture is: for a picture resource, the browser asynchronously requests a network picture resource through an internal network module; after successfully establishing a link with a server 400, the picture is begun to be loaded; and after successful loading, an memory size occupied by the picture is compared with a size of a remaining memory of the picture cache space initially configured by the browser, if the remaining memory is insufficient to store the picture, the picture stored most early in a current cache space is removed according to a loading time until the remaining memory may store the picture.

While the memory size of the picture cache space configured by the browser as default on the current display apparatus 200 is fixed and small, such as 5 M and 10 M, and as for a large amount picture loading operations of the UI application, a case that pictures saved early may be mass deleted to save the current picture may occur. In this case, if the user browses the earlier picture in the UI application, the browser still needs to retrieve from the server 400 and load, and in this process, the user still needs to waste much time to wait for picture loading. It can be seen that the picture cache space with the fixed size in the current display apparatus 200 necessarily cannot meet a requirement for loading a large number of pictures of the current UI application.

An embodiment of the disclosure provides a method for dynamically managing a picture cache space and a display apparatus 200, so that the cache space may be expanded in a case that the picture cache space of the browser on the display apparatus 200 is insufficient, the picture cache space may cache a large number of picture resources when the browser works, and the browser does not need to frequently delete pictures stored early in the picture cache space. In this way, when a user browses a certain part of picture resources in an application repeatedly, the browser may quickly obtain any one of the part of picture resources from the picture cache space, thereby saving much picture loading time.

As mentioned in the above embodiments, the display apparatus 200 in embodiments of the disclosure has a controller 250. The controller 250 may control the browser on the display apparatus 200 to perform a series of operations, for example, may control the browser to run a certain application, and then run a local webpage of the application to display some picture resources of the application. A UI interface of the application may be regarded as a local webpage on the display apparatus 200.

There may be a plurality of browsers on the display apparatus 200, and the browsers are responsible for running different applications. When selected to be launched by the user, the application requests a browser corresponding to the application for resource loading. The user may select to launch a certain application on the display apparatus 200, the application may be called as a target application, and the browser responsible for running the target application may be called as a target browser.

Figure 40:
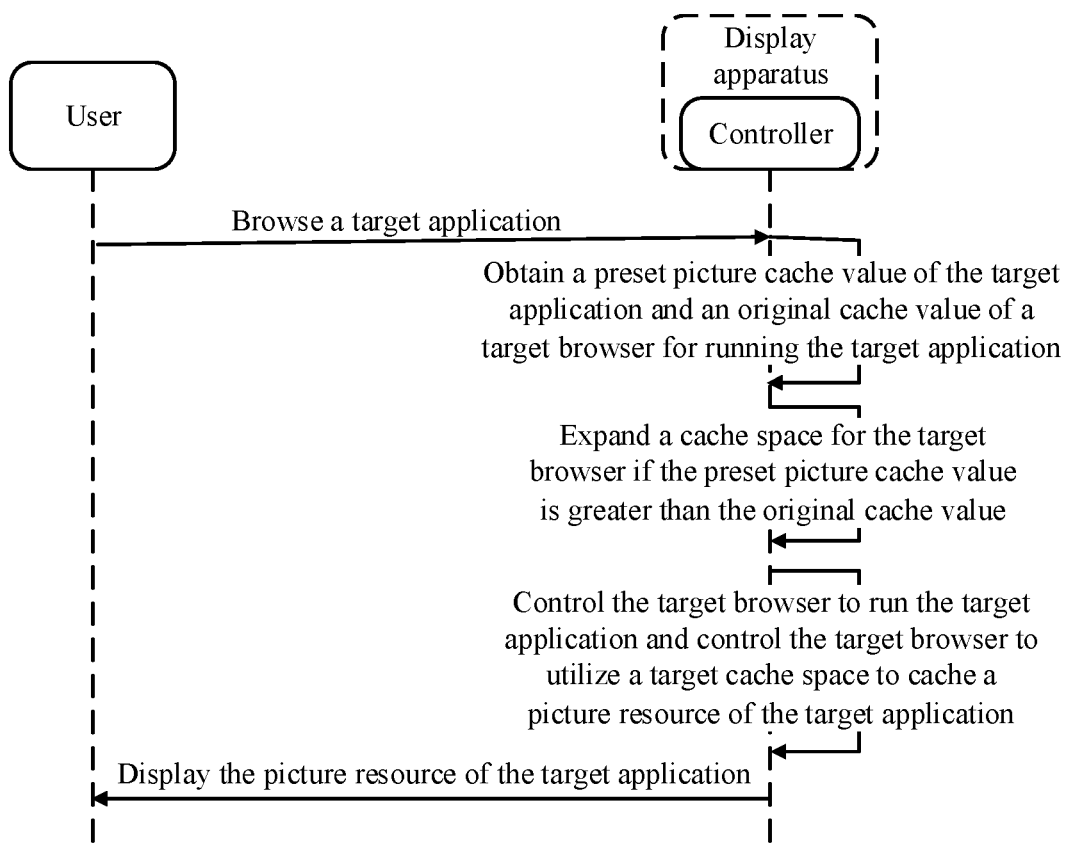
FIG. 40 is an eleventh control flow diagram of a controller 250 according to some embodiments.

FIG. 40 is an eleventh control flow diagram of the controller 250 according to some embodiments.

In embodiments of the disclosure, a display apparatus 200 is provided. A controller 250 controls a target browser to run a target application. A specific control flow of the controller 250 may refer to FIG. 40.

As shown in FIG. 40, the controller 250 may firstly obtain a preset picture cache value of the target application and an original cache value of the target browser for running the target application.

Generally, when designing a target application, an engineer of the target application provider estimates a size of a picture resource possibly required to be cached during running of the target application according to a type of the target application and a display situation of the picture resource in the target application, and the like, and configure a value for caching the picture resource to the target application to serve as a preset picture cache value of the target application, such as 20 M or 30 M, etc.

When a target browser runs the target application, the target browser needs to cache the picture resource of the target application to a cache space for caching a picture provided by the display apparatus 200, the engineer of the target application provider also configures an original cache value for the target browser, for indicating a size of the cache space required to be used when the target browser runs the target application.

As mentioned in the above content, the cache space configured for the target browser in the current display apparatus 200 is fixed. In order to avoid influence on normal operation of a system of the display apparatus 200 due to an excessively large cache space configured for the target browser, a size of the cache space configured for the target browser is generally limited, that is, the original cache value is small, such as only 5 M or 10 M. Compared with the preset picture cache value of the target application, the original cache value is difficult to meet a requirement of loading a large number of picture resources in the target application. For example, a target application may need to cache 20M of picture resources, but the target browser only configures 10 M of cache space, thus the target browser can only cache the 10 M of picture resources at most when running the target application, and the remaining picture resources can only be cached one by one after waiting for deletion of the picture resources previously cached in the cache space. When the picture resource that the user wants to browse again has been deleted, the target browser needs to obtain the current browsing picture resource again from the server 400 and delete earlier part of picture resources in the cache space again, and after the picture resource is loaded on the target application, the target browser caches the picture resource in the cache space again. It can be seen that when the user repeatedly browses the picture resource in the target application, due to the limited cache space configured for the target browser, operations that the certain picture resource is repeatedly obtained from the server 400 and constantly deleted from the cache space may occur, and these operations may consume a certain time.

In order to avoid insufficient cache space, the controller 250 may further expand the cache space for the target browser according to a preset picture cache value. As shown in FIG. 40, the controller 250 firstly detects a relationship between the preset picture cache value of the target application and the original cache value of the target browser. If the preset picture cache value is greater than the original cache value, it means that the cache space currently configured for the target browser is insufficient. In this case, the controller 250 needs to expand the cache space for the target browser, so that a size of a target cache space expanded from the original cache space is the same as the preset picture cache value, thereby ensuring that the target cache space meets the picture cache requirement of the target application, and further ensuring that the picture resource may be quickly loaded from the target cache space when the user uses the target application to browse the picture resource.

While if the preset picture cache value is smaller than or equal to the original cache value, it means the cache space currently configured for the target browser is sufficient. In this case, the controller 250 does not need to expand the cache space any more.

After the cache space is expanded, the size of the target cache space meets the picture cache requirement of the target application. Therefore, as shown in FIG. 40, the controller 250 may continue to control the target browser to run the target application, and control the target browser to utilize the target cache space to cache the picture resource of the target application.

It should be noted that in an initial case, the target cache space does not cache the picture resource browsed by the user on the target application, the target browser obtains the picture resource firstly from the server 400 and then load on the target application, so that the user can firstly watch conveniently. Then, the target browser caches the picture resource into the target cache space, so that the user can load at any time when browsing the picture resource again.

According to the display apparatus 200 in the embodiments of the disclosure, the controller 250 controls the target browser to run the target application, moreover, the controller 250 expands the cache space for the target browser in a case that the preset picture cache value is greater than the original cache value, so that the size of the target cache space can meet the picture resource loading demand of the target application. Further, when the target browser caches the picture resource for the target application, the target cache space may cache a large number of picture resources of the target application. When the user repeatedly browses certain part of picture resources in the target application, the target browser may quickly obtain any one of the part of picture resources from the target cache space, thereby saving much picture loading time.

Figure 41:
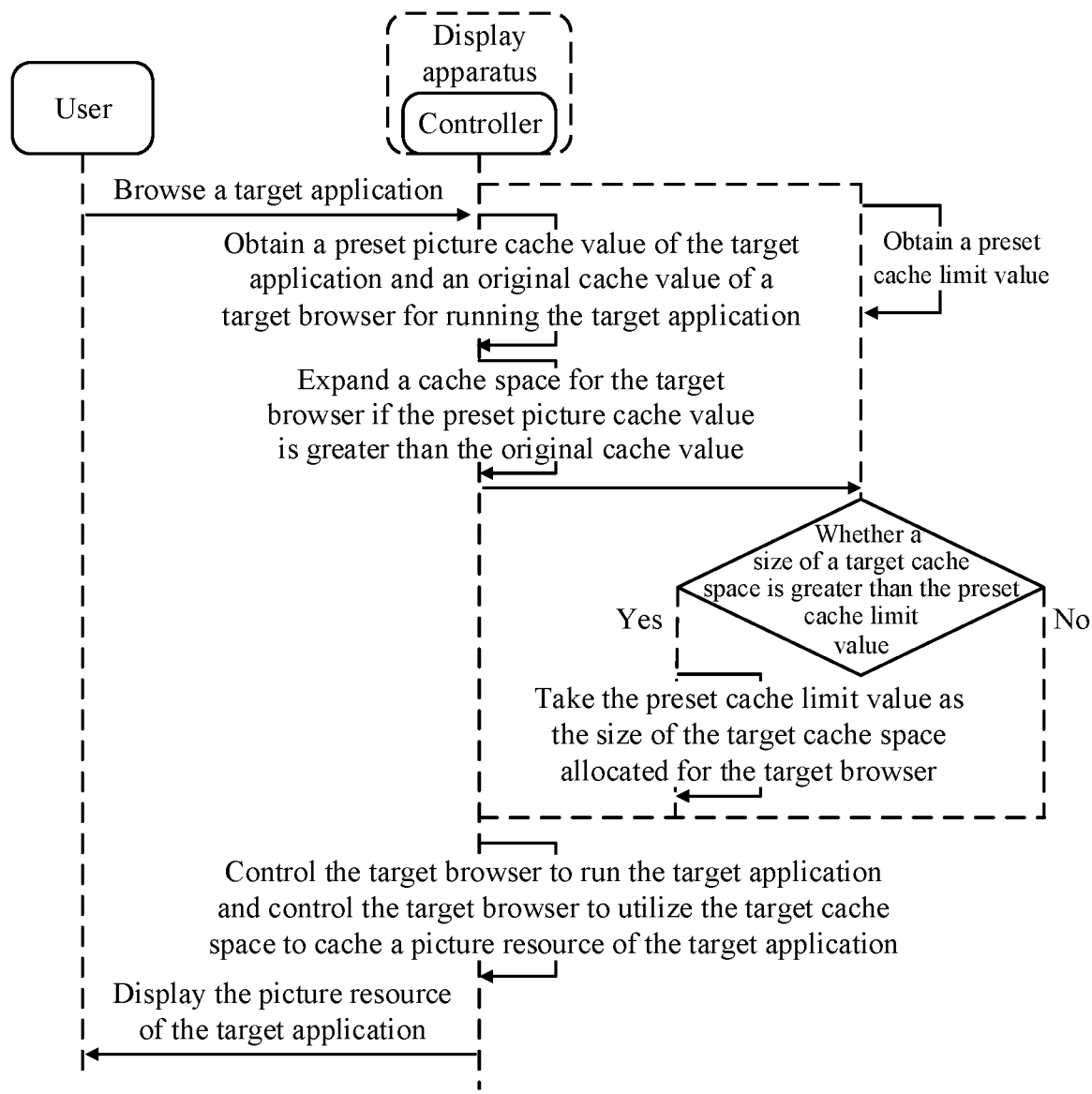
FIG. 41 is a twelfth control flow diagram of a controller 250 according to some embodiments.

FIG. 41 is a twelfth control flow diagram of the controller 250 according to some embodiments.

In some embodiments, in order to prevent the target application from taking an unreasonable picture cache space, the controller 250 further limits the size of the expanded cache space occupied by the target application.

As shown in FIG. 41, the controller 250 firstly obtains a preset cache limit value for limiting the size of the cache space. The preset cache limit value is subjected to a plurality of tests and evaluations, and may be set to be 100 M. The controller 250 expands the cache space for the target browser after confirming that the preset picture cache value of the target application is greater than the original cache value of the target browser. At this time, the controller 250 further needs to detect whether the size of the target cache space after expanding of an original cache space is smaller than the preset cache limit value. If the size of the target cache space is smaller than or equal to the preset cache limit value, it means that the size of the target cache space does not exceed the limitation. In this case, the controller 250 may continue to control the target browser to run the target application, obtain the picture resource currently required to be browsed by the user from the server 400 and then load, and cache the picture resource by utilizing the target cache space.

While if the size of the target cache space is greater than the preset cache limit value, it means that the size of the target cache space after expanding of the original cache space is excessively large. In order to avoid a case that system running memory is reduced and consequently the system cannot normally run due to application of the excessively large cache space, as shown in FIG. 41, the controller 250 needs to take the preset cache limit value as the size of the target cache space allocated for the target browser. Then, the controller 250 continues to control the target browser to run the target application, obtains the picture resource currently required to be browsed by the user from the server 400 and then load, and caches the picture resource by utilizing the target cache space.

The controller 250 may sequentially cache the picture resources of the target application into the target cache space according to the above methods, and the current target cache space may cache many picture resources. When the user repeatedly browses a part of pictures of the target application, the part of picture resources may be completely cached in the target cache space and takes on demand, and the target browser does not need to obtain from the server 400, thereby saving a large amount of time for picture resource loading.

Figure 42:
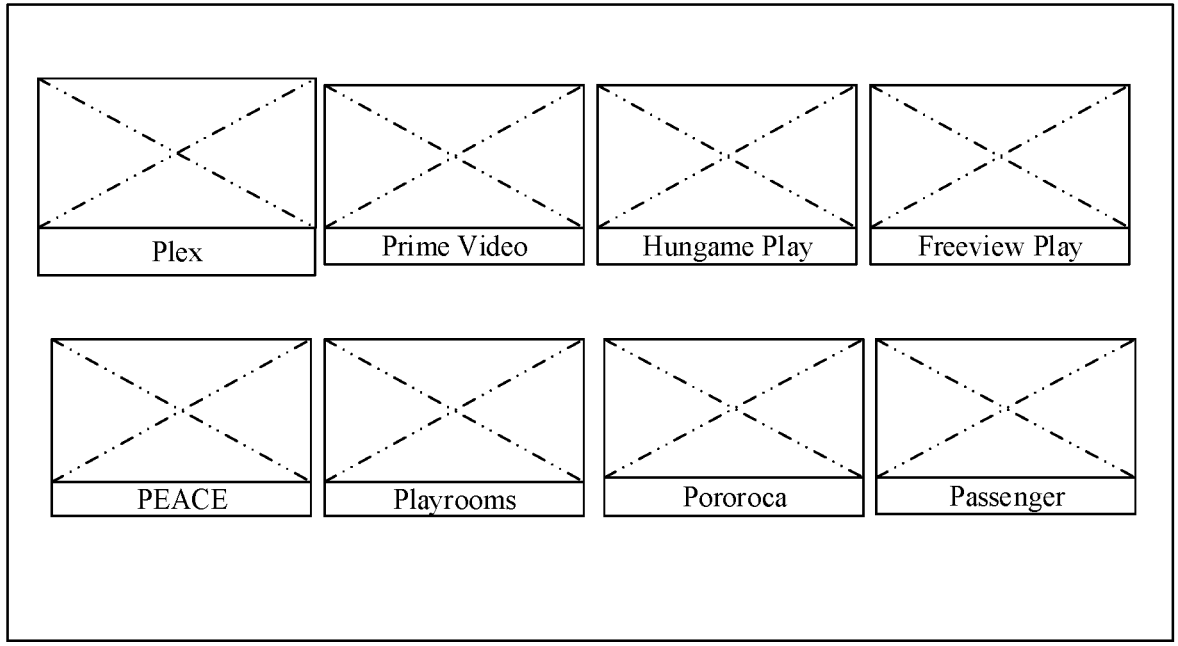
FIG. 42 is a first schematic page diagram of an application C according to some embodiments.
Figure 43:
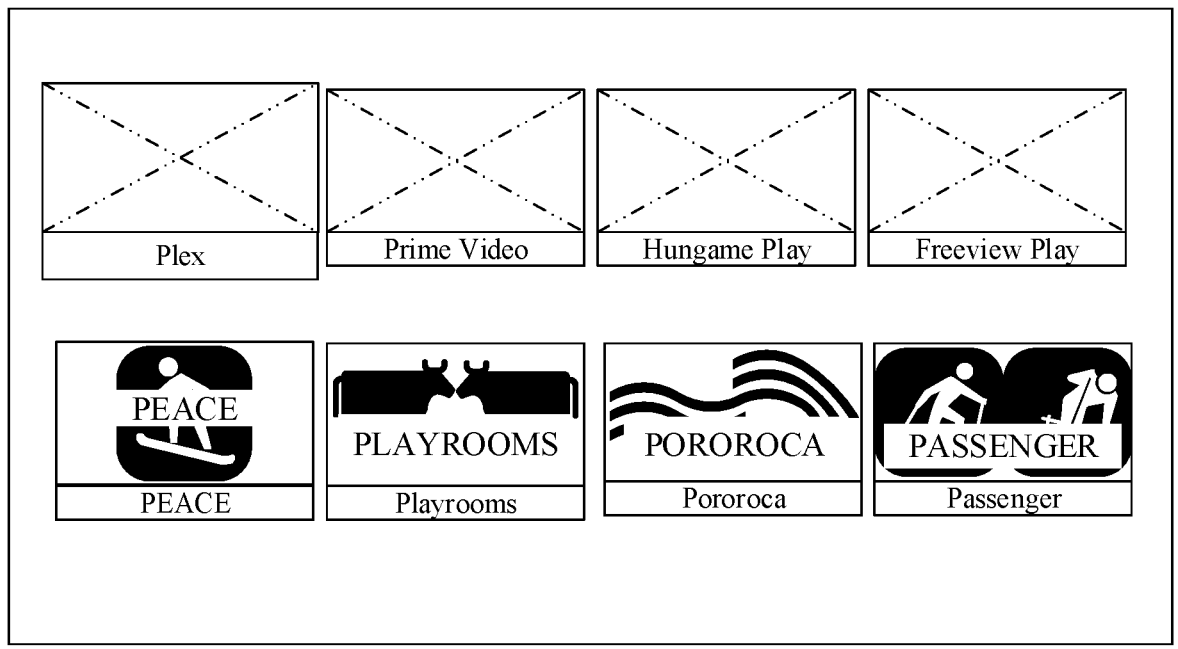
FIG. 43 is a second schematic page diagram of an application C according to some embodiments.
Figure 44:
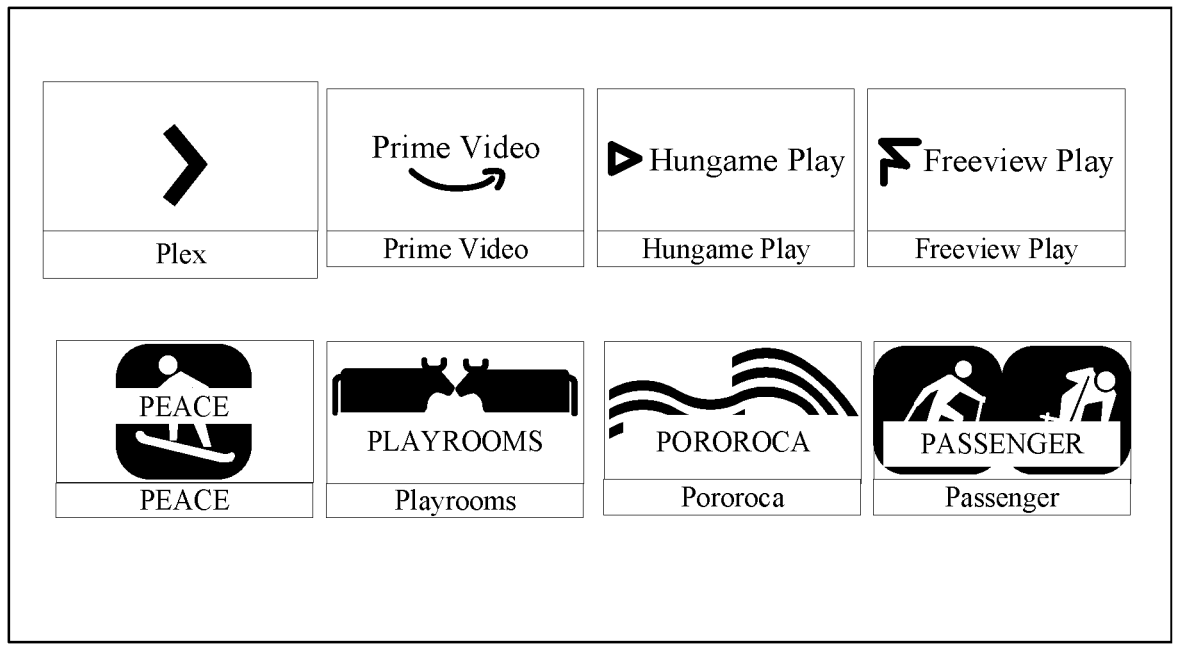
FIG. 44 is a third schematic page diagram of an application C according to some embodiments.

FIG. 42 is a first schematic page diagram of an application C according to some embodiments. FIG. 43 is a second schematic page diagram of the application C according to some embodiments. FIG. 44 is a third schematic page diagram of the application C according to some embodiments.

When the controller 250 defaults to use the original cache space originally configured for the target browser, if the target application operated by the user is the application C, when the target browser loads a certain picture for the first time, the target browser cannot find the picture in the original cache space, and therefore needs to obtain from the server 400, and the picture is immediately rendered and drawn after being successfully downloaded. In a downloading process, the UI interface on the application C uses dot-and-dash reticles to represent a picture content waiting for being loaded. As shown in FIG. 42, if a first picture is a picture that user selects to browse, because it is being loaded, the dot-and-dash reticle is shown at this position. While the remaining pictures need to be loaded when the user selects to browse; or when the user does not select to browse any content, the target browser sequentially loads the remaining pictures after the first picture is loaded, and therefore, at this time, the dot-and-dash reticles are also shown at the positions of other pictures.

After the first picture as shown in FIG. 42 is loaded, the user may continue to browse other pictures, for example, pictures in a second row in FIG. 42. In this case, if the original cache space is insufficient, the picture cached in a first row is deleted to cache the picture at the second row. Then, if the user returns to the first row for browsing, the target browser needs to obtain the pictures in the first row from the server 400 through a network again. As shown in FIG. 43, the loading process also causes that the dot-and-dash reticles are shown at the position of the pictures at a first row for a long time. When an Internet connection is poor, the image loading time is prolonged, leading to the poor user experience.

While in embodiments of the disclosure, the controller 250 may determine whether to expand the cache space for the target browser according to the preset picture cache value of the target application. And after the cache space is expanded for the target browser, the target cache space may cache a large number of picture resources. Therefore, after the user browses the picture resources in the first row and the second row as shown in FIG. 42 and FIG. 43, the target cache space may cache the picture resources in the first row and the second row at the same time. In this way, as shown in FIG. 44, the user browses the pictures in the second row and then skips back to the first row for browsing, and then the target browser may firstly and immediately load the pictures in the first row from the target cache space without obtaining from the server 400 again via network. In this process, the picture loading speed is high, and the pictures with the dot-and-dash reticles are not shown for the user.

Figure 45:
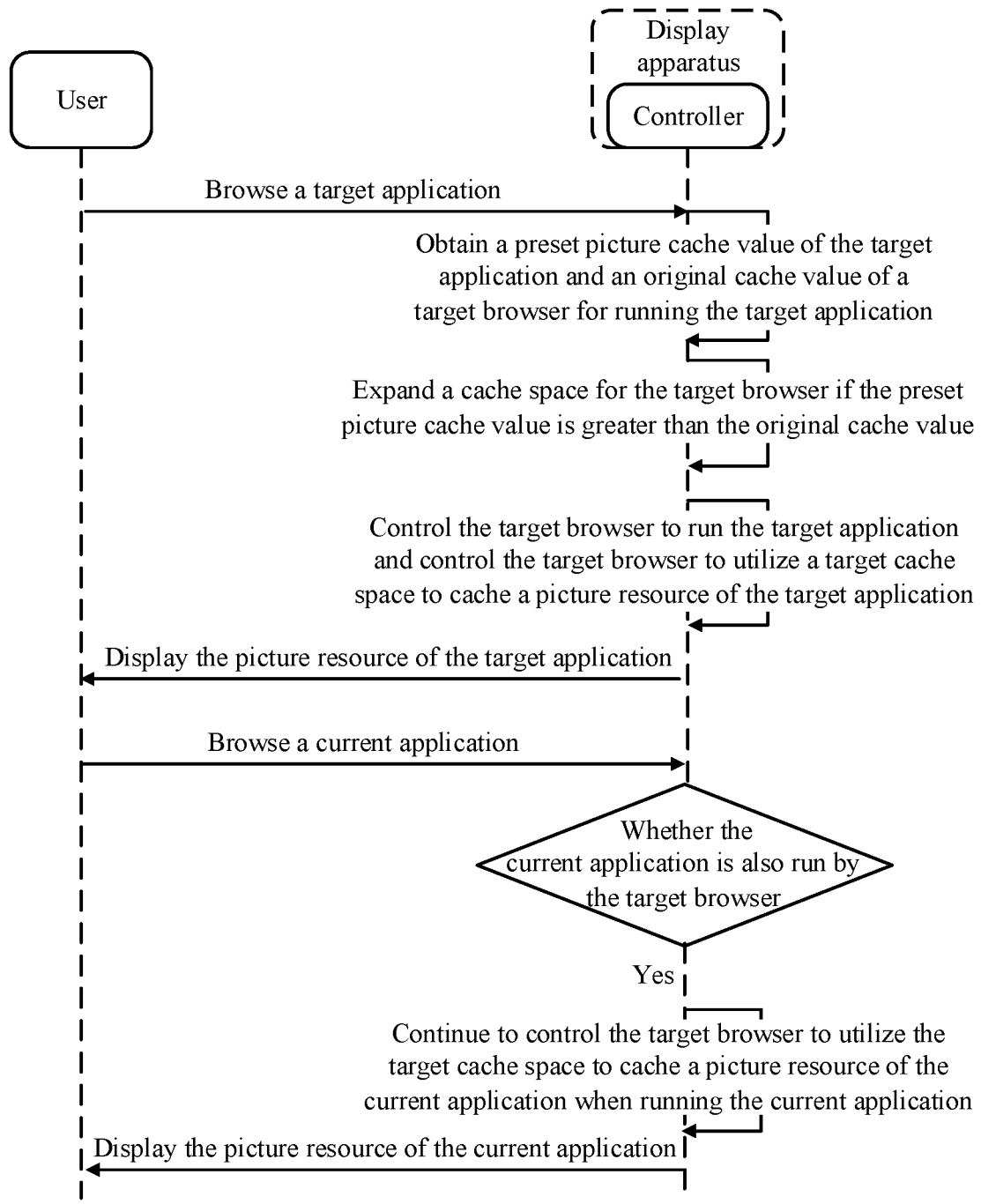
FIG. 45 is a thirteenth control flow diagram of a controller 250 according to some embodiments.

FIG. 45 is a thirteenth control flow diagram of the controller 250 according to some embodiments.

It can be known from the above that there may be a plurality of browsers in the display apparatus 200, and the controller 250 allocates different sizes of cache spaces for caching pictures for different browsers according to configurations of the different browsers. The user may switch from application C to another application D for browsing the picture resources. If the application C and the application D before and after switch are based on the same browser, that is, webpages of the application C and the application D are run by the same browse a, if the browser a has been expanded to the target cache space when running the application C, the current target cache space of the browser a may probably be still sufficient for caching pictures for the application D when the application D after switch is run, then there is no need to expand the cache space for the browser a again, and the target cache space is stilled used. For example, a preset picture cache value of the application C is 50 M, an original cache value of the browser a is 10 M, the size of the target cache space expanded by the controller 250 for the browser a is 50 M, if a preset picture cache value of the application D is 40 M, the size of the current target cache space may meet the cache requirement of the picture resource of the application D, and then when the browser a continues to run the application D, the controller 250 does not need to expand the cache space for the browser a anymore.

Further, in some embodiments, as shown in FIG. 45, the controller 250 may detect whether a current application is also run by the target browser after controlling the target application to exit; and continues to control the target browser to utilize the target cache space to cache picture resources of the current application when running the current application in a case that the current application is also run by the target browser.

Figure 46:
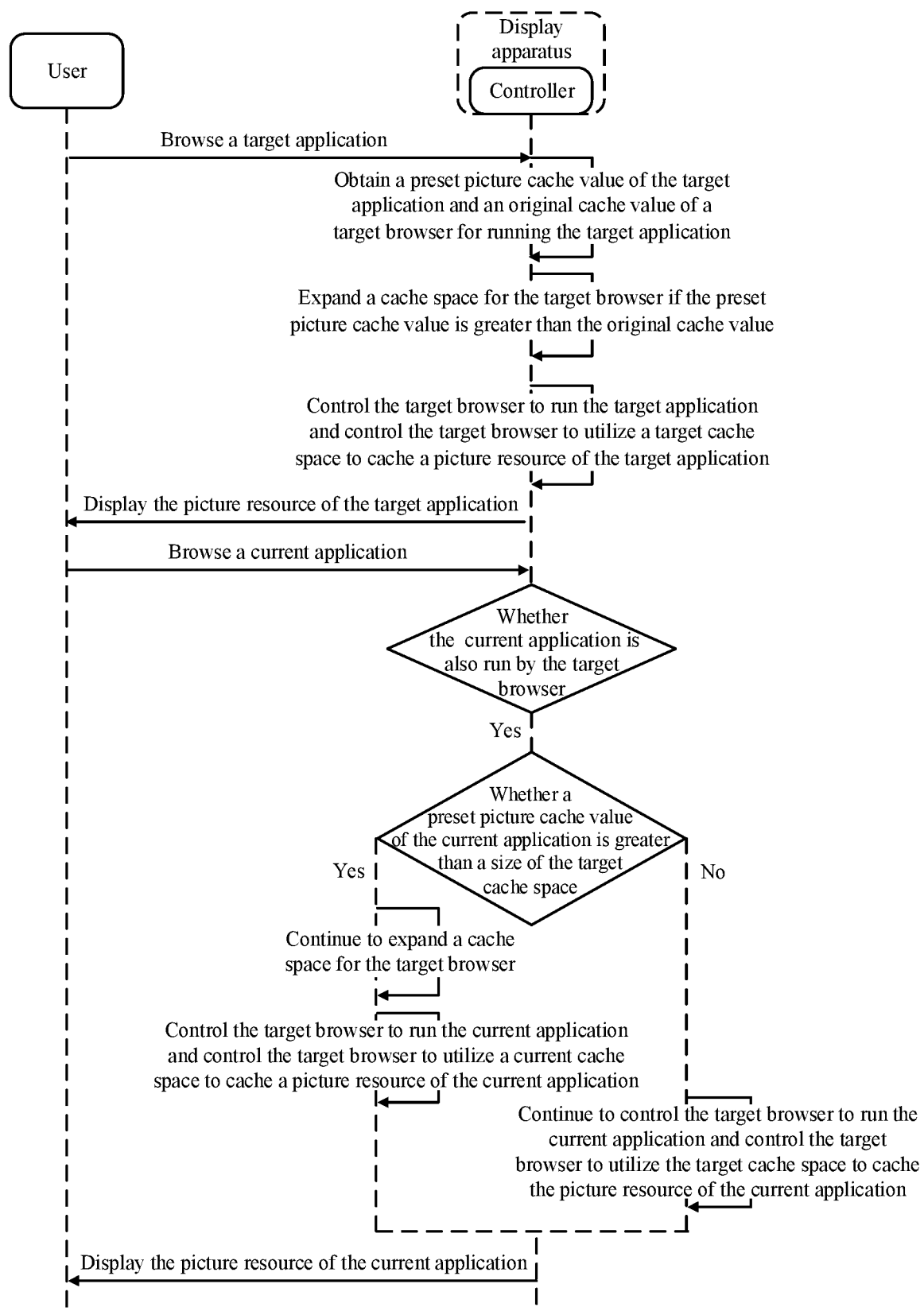
FIG. 46 is a fourteenth control flow diagram of a controller 250 according to some embodiments.

FIG. 46 is a fourteenth control flow diagram of the controller 250 according to some embodiments.

Certainly, in the picture cache process, a case that the size of the target cache space of the browser a cannot meet the picture cache requirement of the application D may also occur. For example, the preset picture cache value of the application C is 50 M, the original cache value of the browser a is 10 M, the size of the target cache space expanded by the controller 250 for the browser a is 50 M, if the preset picture cache value of the application D is 60 M, the size of the current target cache space cannot meet the cache requirement of the picture resource of the application D, and then when the browser a continues to run the application D, the controller 250 needs to expand the cache space for the browser a again.

In this case, the current target cache space of the browser a may still be expanded according to the methods of the above embodiments. In this process, the controller 250 needs to determine between the preset picture cache value of the switched application D and the size of the current target cache space of the browser a.

Further, in some other embodiments, as shown in FIG. 46, the controller 250 determines whether the preset picture cache value of the current application is greater than the size of the target cache space in a case that the current application is also run by the target browser. If the preset picture cache value of the current application is smaller than or equal to the size of the target cache space, it means that the target cache space of the current target browser is sufficient in size. In this case, the controller 250 may continue to control the target browser to run the current application, and control the target browser to utilize the target cache space to cache the picture resource of the current application.

While if the preset picture cache value of the current application is greater than the size of the target cache space, it means that the target cache space of the current target browser is insufficient. In this case, as shown in FIG. 46, the controller 250 needs to continue to expand the cache space for the target browser, so that the size of the current cache space expanded from the target cache space is the same as the preset picture cache value of the current application; and then the controller 250 controls the target browser to run the current application, and controls the target browser to utilize the current cache space to cache the picture resource of the current application.

In addition, in a case that the application D is run, when the controller 250 expands the cache space for the target browser, the size of the current cache space expanded from the target cache space should also meet the limitation for the cache space size by the controller 250. Therefore, the controller 250 further needs to determine whether the size of the current cache space is smaller than the preset cache limit value. If the size of the current cache space expanded from the target cache space is smaller than or equal to the preset cache limit value, it means that the size of the current cache space does not exceed the limitation requirement. In this case, the controller 250 may continue to control the target browser to run the current application, and control the target browser to cache the picture resource of the current application by utilizing the current cache space.

While if the size of the current cache space is greater than the preset cache limit value, it means that the size of the current cache space exceeds the limitation requirement. The controller 250 sets the preset cache limit value as the size of the current cache space, then continues to control the target browser to run the current application, and controls the target browser to cache the picture resource of the current application by utilizing the current cache space.

Figure 47:
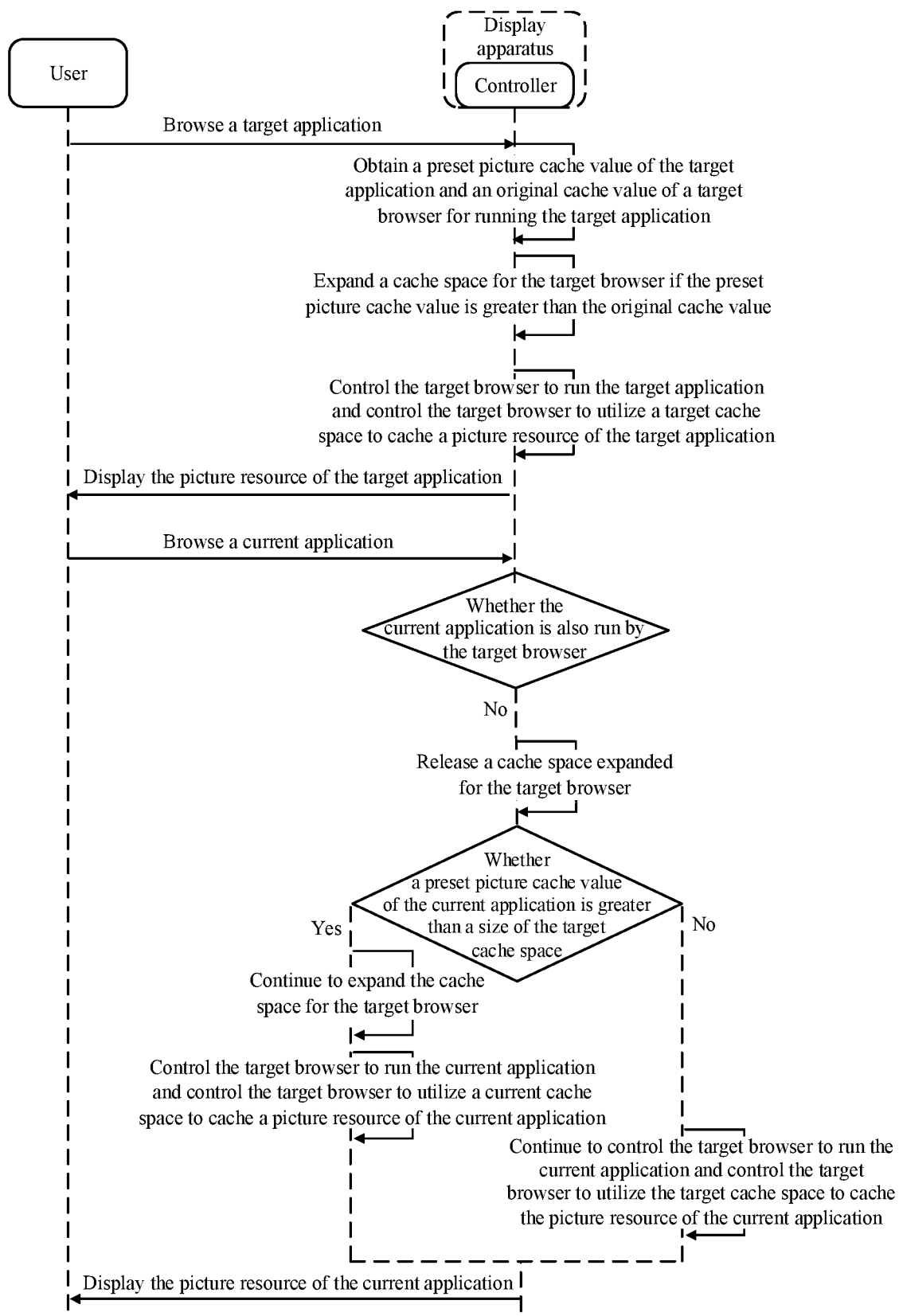
FIG. 47 is a fifteenth control flow diagram of a controller 250 according to some embodiments.

FIG. 47 is a fifteenth control flow diagram of the controller 250 according to some embodiments.

The user may switch from one application E to another application F for browsing the picture resources. If the application E and the application F before and after switch are not based the same browser, that is, a webpage of the application E is run by a browser c, while a webpage of the application F is run by a browser d, after switching, the browser d cannot utilize a cache space previously allocated for the browser c to cache picture resources of the application F, and the controller 250 need to reallocate a new original cache space for the browser d, and expand the cache space for the current browser d in a case that a preset picture cache value of the application F is greater than the original cache value of the browser d.

Further, in some embodiments, as shown in FIG. 47, the controller 250 may determine whether a current application is also run by the target browser after controlling the target application to exit; and release a cache space expanded for the target browser in a case that the current application is not run by the target browser. Then a relationship between the preset picture cache value of the current application and the original cache value of the current browser for running the current application is determined. If the preset picture cache value of the current application is greater than the original cache value of the current browser, it means that the target cache space of the current target browser cannot meet the picture cache requirement of the current application. In this case, the controller 250 needs to continue to expand the cache space for the current browser; and then control the current browser to run the current application, and control the current browser to utilize the expanded cache space to cache the picture resource of the current application.

While if the preset picture cache value of the current application is smaller than or equal to the original cache value of the current browser, it means that the original cache space of the current browser can meet the picture cache requirement of the current application. In this case, the controller 250 does not need to expand the cache space for the current browser. The controller 250 may directly control the current browser to utilize the original cache space to cache the picture resource of the current application.

Figure 48:
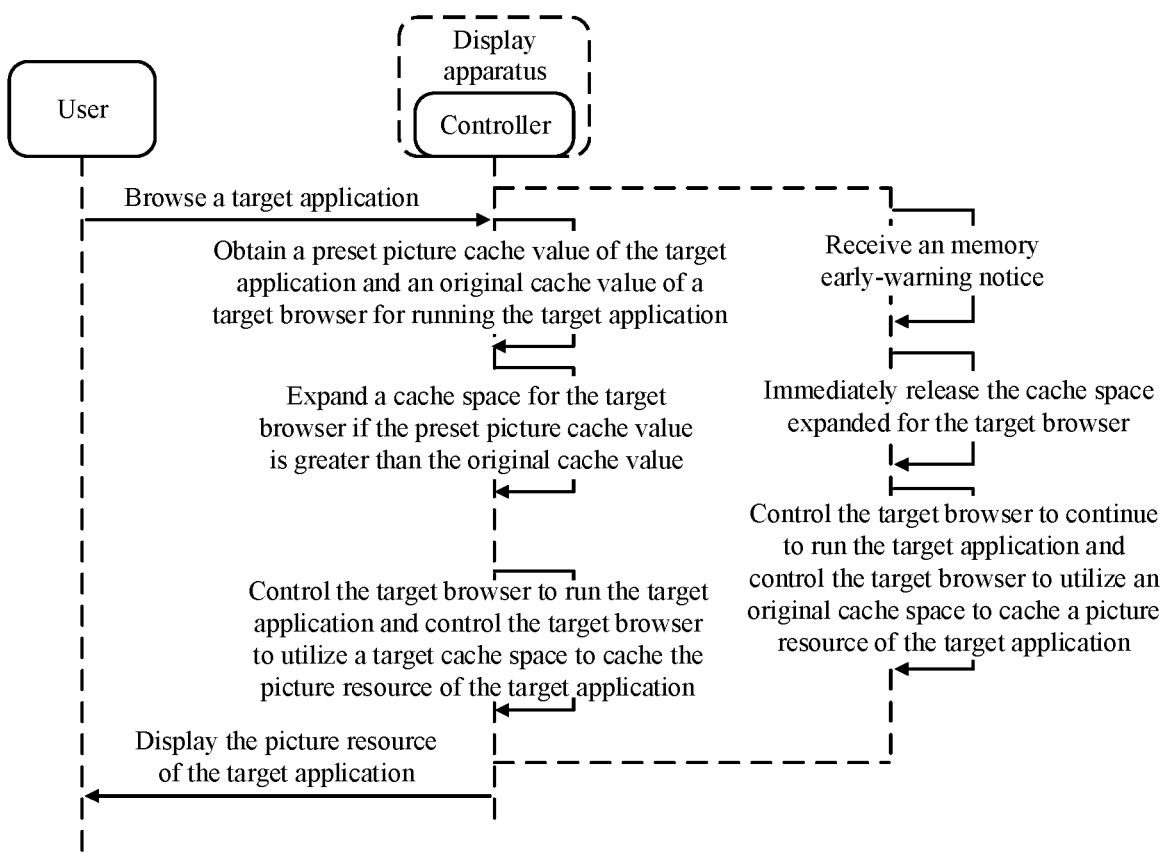
FIG. 48 is a sixteenth control flow diagram of a controller 250 according to some embodiments.

FIG. 48 is a sixteenth control flow diagram of the controller 250 according to some embodiments.

The controller 250 also needs to consider influence of an expansion operation on the system of the display apparatus 200 while expanding the cache space for the browser. In the display apparatus 200, a storage space is fixed, if the browser occupies an excessive memory space to cache the picture resource, a running memory of the system of the display apparatus 200 is also reduced. If the running memory is insufficient, system running is instable. Therefore, in some embodiments, the controller 250 releases the occupied cache space in a case that the system has a memory pressure, to protect the system memory and maintain the system stability.

As shown in FIG. 48, the controller 250 needs to detect whether a memory early-warning notice issued by the system of the display apparatus 200 is received in real time; immediately release the cache space expanded for the target browser in a case that the memory early-warning notice is received; and then control the target browser to continue to run the target application, and control the target browser to utilize the original cache space of the target browser to cache the picture resource of the target application.

In addition, if the user exits the target application and selects to launch a next application (namely, current application), then the controller 250 also needs to detect whether the memory early-warning notice is received in real time when controlling the current browser to run the current application.

The controller 250 of the display apparatus controls the target browser to run the target application, moreover, the controller 250 may expand the cache space for the target browser in a case that the preset picture cache value is greater than the original cache value, so that the size of the target cache space can meet the picture resource loading demand of the target application. Further, when the target browser caches the picture resource for the target application, the target cache space may cache a large number of picture resources in the target application. When the user repeatedly browses some picture resources in the target application, the target browser may quickly obtain any one of said some picture resources from the target cache space, thereby saving much picture loading time.

Figure 49:
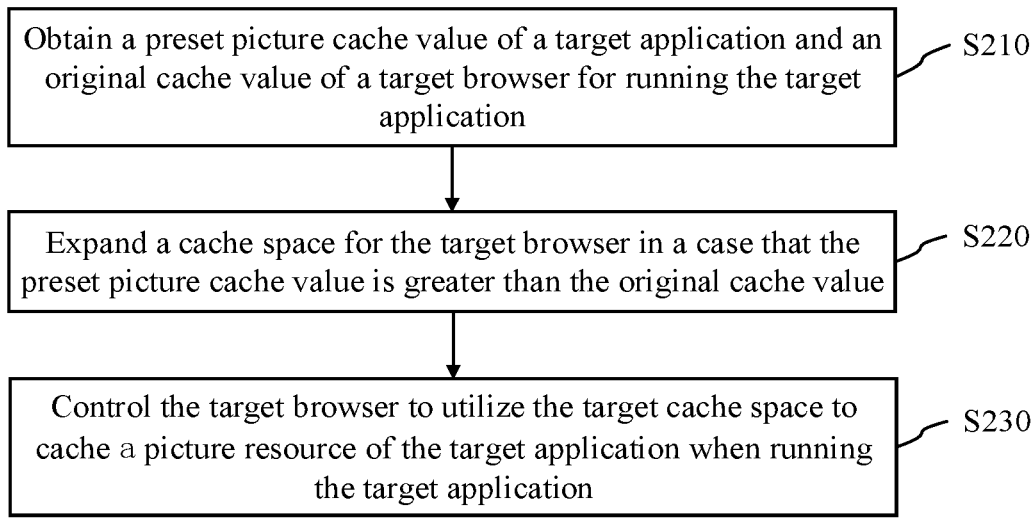
FIG. 49 is a flow diagram of a method for dynamically processing picture cache space according to some embodiments.

FIG. 49 is a flow diagram of a method for dynamically processing a picture cache space according to some embodiments.

An embodiment of the disclosure further provides a method for dynamically processing a picture cache space. The method may be applied to a control module such as the controller 250 capable of achieving a control function mentioned above. As shown in FIG. 49, the method may include following steps.

Step S210, a preset picture cache value of a target application and an original cache value of a target browser for running the target application are obtained.

The preset picture cache value is configured to indicate a size of a picture resource required to be cached during running of the target application, and the original cache value is configured to indicate a size of a cache space used when the target browser runs the target application.

Step S220, in a case that the preset picture cache value is greater than the original cache value, the cache space is expanded for the target browser, so that a size of a target cache space expanded from an original cache space is the same as the preset picture cache value.

Step S230, the target browser is controlled to utilize the target cache space to cache the picture resource of the target application when running the target application.

In some embodiments, the method further includes: a preset cache limit value configured to limit the size of the cache space is obtained; in a case that the preset picture cache value is greater than the original cache value and the cache space is expanded for the target browser, whether the size of the target cache space is smaller than the preset cache limit value is determined; and in a case that the size of the target cache space is smaller than or equal to the preset cache limit value, the target browser is controlled to utilize the target cache space to cache the picture resource of the target application when running the target application.

In some embodiments, the method further includes: in a case that the size of the target cache space is greater than the preset cache limit value, the size of the target cache space is set to the preset cache limit value; and the target browser is controlled to utilize the target cache space to cache the picture resource of the target application when running the target application.

In some embodiments, the method further includes: whether a current application is also run by the target browser is detected after controlling the target application to exit; and in a case that the current application is also run by the target browser, the target browser is continued to be controlled to utilize the target cache space to cache the picture resource of the current application when running the current application.

In some other embodiments, the method further includes: in a case that the current application is also run by the target browser, whether the preset picture cache value of the current application is greater than the size of the target cache space is determined; and in a case that the preset picture cache value of the current application is smaller than or equal to the size of the target cache space, the target browser is continued to be controlled to utilize the target cache space to cache the picture resource of the current application when running the current application.

In some embodiments, the method further includes: in a case that the preset picture cache value of the current application is greater than the size of the target cache space, the cache space is continued to be expanded for the target browser; and in a case that a size of a current cache space expanded from the target cache space is smaller than or equal to the preset cache limit value, the target browser is controlled to utilize the current cache space to cache the picture resource of the current application when running the target application.

In some embodiments, the method further includes: in a case that current application is not run by the target browser, a cache space expanded for the target browser is released; in a case that the preset picture cache value of the current application is greater than an original cache value of a current browser for running the current application, a cache space is expanded for the current browser; and the current browser is controlled to utilize the expanded cache space to cache the picture resource of the current application when running the current application.

In some embodiments, the method further includes: whether a memory early-warning notice issued by a system of the display apparatus is received is determined in real time; the cache space expanded for the target browser is immediately released in a case that the memory early-warning notice is received; and the target browser is controlled to utilize the original cache space of the target browser to cache the picture resource of the target application when running the target application.

Because the method for dynamically processing the picture cache space in embodiments of the disclosure may be applied to the controller 250 in the above embodiments, other contents related to the method for dynamically processing the picture cache space in embodiments of the disclosure may refer to the above embodiments.

What is claimed is:

1. A display apparatus, comprising:
a display, configured to present an image interface, wherein the image interface comprises a render layer and a display layer superimposed; and
a controller, configured to:
obtain a target video resource and one or more recommended video resources associated with the target video resource; and
control the display layer to present the target video resource and output audio of the target video resource; and control the render layer to present the one or more recommended video resources simultaneously,
wherein:
the image interface includes at least one video preview area, and
the display layer is controlled capable of being displayed in a video preview area of the at least one video preview area to output video and audio of the target video resource, while the render layer is controlled capable of being displayed in full screen to output a dynamic video content without audio content of one of the one or more recommended video resources, and
wherein the controller is further configured to:
detect a position of a focus frame on the display in response to controlling the display layer to present the target video resource in full screen and outputting the audio of the target video resource; and
in response to the focus frame being located in a target video preview area of the at least one video preview area, control the render layer to present in the target video preview area a dynamic video content of one recommended video resource of the one or more recommended video resources corresponding to the target video preview area without outputting an audio content of the one recommended video resource; and control the render layer to present simultaneously in each of the at least one video preview area other than the target video preview area a frame of static image content of each corresponding recommended video resource of the one or more recommended video resources other than the one recommended video resource corresponding to the target video preview area, wherein the one recommended video resource corresponding to the target video preview area and the each corresponding recommended video resource other than the one recommended video resource corresponding to the target video preview area are presented on the target video resource in a superimposed mode.

2. The display apparatus according to claim 1, wherein the controller is further configured to:
in response to the focus frame being not located in any of the at least one video preview area, control the render layer to present a frame of static image content in a first recommended video resource in a first video preview area, wherein the first recommended video resource is a recommended video resource in the one or more recommended video resources, the first video preview area is a video preview area in the at least one video preview area.

3. The display apparatus according to claim 2, wherein the controller is further configured to:
in response to the focus frame being located in the target video preview area, detect whether a user inputs a confirmation command; and
in response to the user inputting the confirmation command, control the display layer to present the second recommended video resource in the target video preview area in full screen and outputting audio of the second recommended video resource; and control the render layer to present a recommended video resource associated with the second recommended video resource in full screen in a video preview area simultaneously.

4. The display apparatus according to claim 2, wherein the controller is further configured to:
in response to the focus frame being located in the target video preview area, detect whether a user inputs a confirmation command; and
in response to the user inputting the confirmation command, control the render layer to present the second recommended video resource in the target video preview area in full screen and output the audio of the second recommended video resource; and control the display layer to present a dynamic video content of a recommended video resource associated with the second recommended video resource in a current video preview area without outputting an audio content, and control the render layer to continue to display the frame of static image content in the third recommended video resource in the third video preview area simultaneously.

5. A method for playing a video resource in a display apparatus, comprising:
obtaining a target video resource and one or more recommended video resources associated with the target video resource;
controlling a display layer of an image interface on the display apparatus to present the target video resource and output audio of the target video resource; and controlling a render layer of the image interface to present the one or more recommended video resources simultaneously, wherein the render layer and the display layer are superimposed on the image interface, the image interface includes at least one video preview area, and the display layer is controlled capable of being displayed in a video preview area of the at least one video preview area to output video and audio of the target video resource, while the render layer is controlled capable of being displayed in full screen to output a dynamic video content without audio content of one of the one or more recommended video resources;
detecting a position of a focus frame on the display in response to controlling the display layer to present the target video resource in full screen and outputting the audio of the target video resource; and
in response to the focus frame being located in a target video preview area of the at least one video preview area, controlling the render layer to present in the target video preview area a dynamic video content of one recommended video resource of the one or more recommended video resources corresponding to the target video preview area without outputting an audio content of the one recommended video resource; and controlling the render layer to present simultaneously in each of the at least one video preview area other than the target video preview area a frame of static image content of each corresponding recommended video resource of the one or more recommended video resources other than the one recommended video resource corresponding to the target video preview area, wherein the one recommended video resource corresponding to the target video preview area and the each corresponding recommended video resource other than the one recommended video resource corresponding to the target video preview area are presented on the target video resource in a superimposed mode.

6. The method according to claim 5, further comprising:
in response to the focus frame being not located in any of the at least one video preview area, controlling the render layer to present a frame of static image content in a first recommended video resource in a first video preview area, wherein the first recommended video resource is a recommended video resource in the one or more recommended video resources, the first video preview area is a video preview area in the at least one video preview area.

7. The method according to claim 6, further comprising:
in response to the focus frame being located in the target video preview area, detecting whether a user inputs a confirmation command; and
in response to the user inputting the confirmation command, controlling the display layer to present the second recommended video resource in the target video preview area in full screen and outputting audio of the second recommended video resource; and control the render layer to present a recommended video resource associated with the second recommended video resource in full screen in a video preview area simultaneously.

8. The method according to claim 6, further comprising:
in response to the focus frame being located in the target video preview area, detecting whether a user inputs a confirmation command; and
in response to the user inputting the confirmation command, controlling the render layer to present the second recommended video resource in the target video preview area in full screen and output the audio of the second recommended video resource; and control the display layer to present a dynamic video content of a recommended video resource associated with the second recommended video resource in a current video preview area without outputting an audio content, and control the render layer to continue to display the frame of static image content in the third recommended video resource in the third video preview area simultaneously.

9. A non-transitory computer storage medium storing computer executable instructions, wherein the computer executable instructions are configured to cause a computer to perform operations comprising:
obtaining a target video resource and one or more recommended video resources associated with the target video resource;
controlling a display layer of an image interface on a display apparatus to present the target video resource and output audio of the target video resource; and controlling a render layer of the image interface to present the one or more recommended video resources simultaneously, wherein the render layer and the display layer are superimposed on the image interface, the image interface includes at least one video preview area, and the display layer is controlled capable of being displayed in a video preview area of the at least one video preview area to output video and audio of the target video resource, while the render layer is controlled capable of being displayed in full screen to output a dynamic video content without audio content of one of the one or more recommended video resources;
detecting a position of a focus frame on the display in response to controlling the display layer to present the target video resource in full screen and outputting the audio of the target video resource; and
in response to the focus frame being located in a target video preview area of the at least one video preview area, controlling the render layer to present in the target video preview area a dynamic video content of one recommended video resource of the one or more recommended video resources corresponding to the target video preview area without outputting an audio content of the one recommended video resource; and controlling the render layer to present simultaneously in each of the at least one video preview area other than the target video preview area a frame of static image content of each corresponding recommended video resource of the one or more recommended video resources other than the one recommended video resource corresponding to the target video preview area, wherein the one recommended video resource corresponding to the target video preview area and the each corresponding recommended video resource other than the one recommended video resource corresponding to the target video preview area are presented on the target video resource in a superimposed mode.

10. The storage medium according to claim 9, the operations further comprising:
in response to the focus frame being not located in any of the at least one video preview area, controlling the render layer to present a frame of static image content in a first recommended video resource in a first video preview area, wherein the first recommended video resource is a recommended video resource in the one or more recommended video resources, the first video preview area is a video preview area in the at least one video preview area.

11. The storage medium according to claim 10, the operations further comprising:
in response to the focus frame being located in the target video preview area, detecting whether a user inputs a confirmation command; and
in response to the user inputting the confirmation command, controlling the display layer to present the second recommended video resource in the target video preview area in full screen and outputting audio of the second recommended video resource; and control the render layer to present a recommended video resource associated with the second recommended video resource in full screen in a video preview area simultaneously.

12. The storage medium according to claim 10, the operations further comprising:
in response to the focus frame being located in the target video preview area, detecting whether a user inputs a confirmation command; and
in response to the user inputting the confirmation command, controlling the render layer to present the second recommended video resource in the target video preview area in full screen and output the audio of the second recommended video resource; and control the display layer to present a dynamic video content of a recommended video resource associated with the second recommended video resource in a current video preview area without outputting an audio content, and control the render layer to continue to display the frame of static image content in the third recommended video resource in the third video preview area simultaneously.

* * * * *